United States Patent
Ching

(10) Patent No.: US 10,565,240 B2
(45) Date of Patent: *Feb. 18, 2020

(54) SYSTEMS AND METHODS FOR DOCUMENT ANALYTICS

(71) Applicant: APLIX RESEARCH, INC., Gaithersburg, MD (US)

(72) Inventor: Philip Wai-Sin Ching, North Potomac, MD (US)

(73) Assignee: APLIX RESEARCH, INC., Gaithersburg, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/266,059

(22) Filed: Feb. 2, 2019

(65) Prior Publication Data

US 2019/0171658 A1 Jun. 6, 2019

Related U.S. Application Data

(63) Continuation of application No. 15/920,177, filed on Mar. 13, 2018, now Pat. No. 10,198,500, which is a continuation of application No. 14/329,121, filed on Jul. 11, 2014, now Pat. No. 9,916,383.

(60) Provisional application No. 61/957,806, filed on Jul. 12, 2013.

(51) Int. Cl.
*G06F 16/31* (2019.01)
*G06F 16/93* (2019.01)

(52) U.S. Cl.
CPC ........... *G06F 16/316* (2019.01); *G06F 16/93* (2019.01)

(58) Field of Classification Search
None
See application file for complete search history.

(56) References Cited

U.S. PATENT DOCUMENTS

| | | |
|---|---|---|
| 7,346,604 B1 | 3/2008 | Bharat et al. |
| 7,392,471 B1 | 6/2008 | Ford et al. |
| 8,429,184 B2 | 4/2013 | Ismalon |
| 8,468,146 B2 | 6/2013 | Bhose et al. |
| 8,543,574 B2 | 9/2013 | Ke et al. |
| 8,892,547 B2 | 11/2014 | Lundberg |
| 9,916,383 B1 | 3/2018 | Ching |
| 10,198,500 B2 | 2/2019 | Ching |

*Primary Examiner* — James Trujillo
*Assistant Examiner* — Cheryl M Shechtman
(74) *Attorney, Agent, or Firm* — Doster Greene, LLC

(57) ABSTRACT

A system and method dynamically analyzes documents to determine the relevancy of a document relatively quickly and efficiently. Potentially relevant documents can be determined using a search string and then converted into corresponding document data structures for analysis. Keywords can be used to identify documents of interest from the document data structures. Tools are provided to assess the relevancy of documents, including tools to determine the frequency of keywords in the documents, to compare documents, and to contrast documents. Algorithms are provided that use prior searches to determine sets of relevant documents. Adaptive search methods are provided that refine searching during analysis to reduce a number of documents that are not sufficiently relevant. A dynamic relevancy matrix can be generated that provides access to keyword frequency and associated keyword frequency for a plurality of documents.

16 Claims, 53 Drawing Sheets

Figure 4:
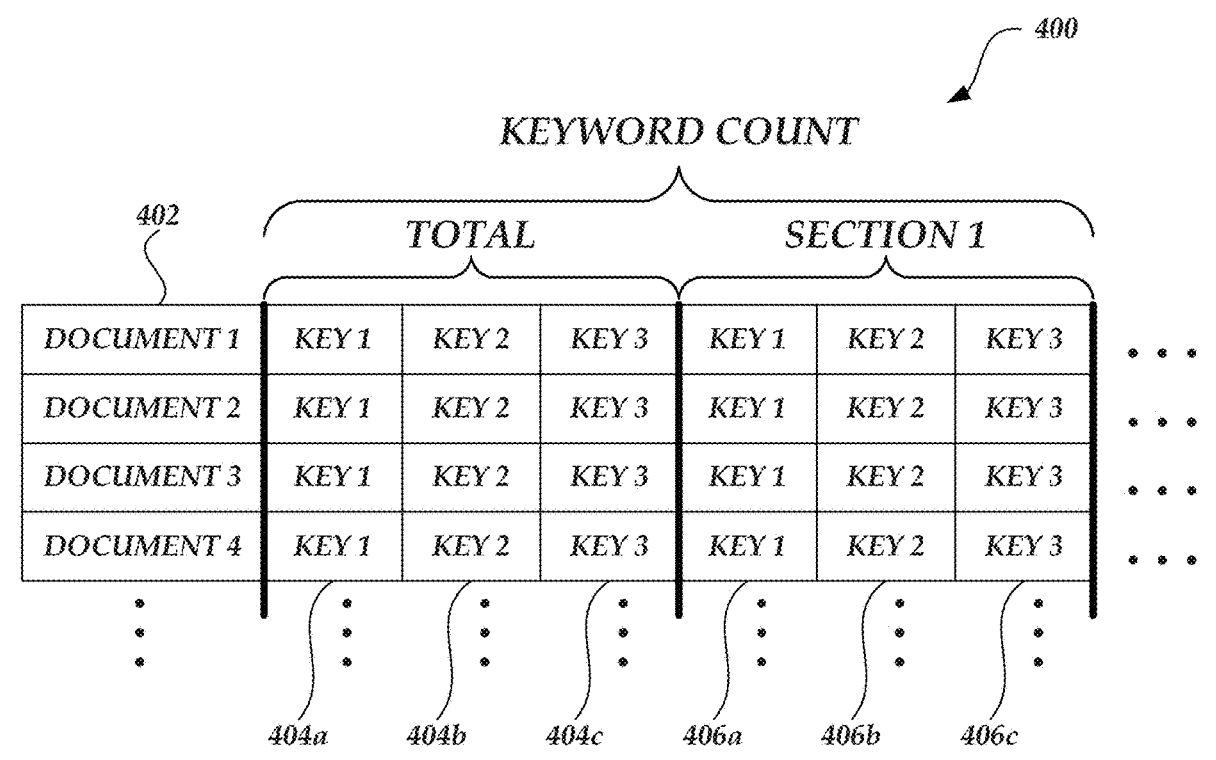

KEYWORD COUNT

| 402 | TOTAL | | | SECTION 1 | | | |
|---|---|---|---|---|---|---|---|
| DOCUMENT 1 | KEY 1 | KEY 2 | KEY 3 | KEY 1 | KEY 2 | KEY 3 | . . . |
| DOCUMENT 2 | KEY 1 | KEY 2 | KEY 3 | KEY 1 | KEY 2 | KEY 3 | . . . |
| DOCUMENT 3 | KEY 1 | KEY 2 | KEY 3 | KEY 1 | KEY 2 | KEY 3 | . . . |
| DOCUMENT 4 | KEY 1 | KEY 2 | KEY 3 | KEY 1 | KEY 2 | KEY 3 | . . . |

DOCUMENT 1

- SECTION -

Lorem ipsum dolor sit amet, consectetur adipiscing elit. Nunc ac diam lacinia, ultricies augue id, congue velit. Duis tincidunt elit a suscipit blandit. Suspendisse eleifend, ante vel sollicitudin placerat, neque purus consectetur justo, ut tristique ligula justo vel mauris. Sed eget sagittis nisl, et sollicitudin nunc. Maecenas vel nulla a lectus sollicitudin sodales. Integer eu consequat velit, ut mollis purus. Quisque massa tellus, viverra non lorem pulvinar, venenatis ullamcorper lorem. Donec vitae sodales nulla.

*602a*

DOCUMENT 2

- SECTION -

In vehicula tortor sed felis iaculis, sed dictum lacus pharetra. Aenean rhoncus nec nulla a accumsan. Cras nec risus ut dui congue tempor. Nunc tempor, neque ac venenatis tempus, nunc nisl dapibus libero, eget rhoncus lacus augue ut mi. Ut hendrerit massa fringilla nisl mollis, eu molestie nunc placerat. Vivamus et mi at augue eleifend malesuada. Aenean dignissim posuere justo a viverra. In dignissim nisi orci, id varius turpis tempor eget. Duis quis nisi cursus, gravida neque.

*602b*

DOCUMENT 3

- SECTION -

Vestibulum sed dignissim orci. Suspendisse nec fringilla quam. Fusce posuere semper ligula, sed consequat dolor ultricies in. Morbi ullamcorper risus consectetur, aliquet viverra id, venenatis urna. Donec eget molestie sem. In at enim justo. Nulla facilisi. Fusce at porta augue. Cras quis augue vel sapien accumsan dictum. Vestibulum ante ipsum primis in faucibus orci luctus et ultrices posuere cubilia Curae; Pellentesque habitant morbi tristique senectus et netus et malesuada fames ac turpis egestas.

DOCUMENT 1

In vehicula tortor sed felis iaculis, sed dictum lacus pharetra. Aenean rhoncus nec nulla a accumsan. Cras nec risus ut dui congue tempor. Nunc tempor, neque ac venenatis tempus, nunc nisl dapibus libero, eget rhoncus lacus augue ut mi. Ut hendrerit massa fringilla nisl mollis, eu molestie nunc placerat. Vivamus et mi at augue eleifend malesuada. Aenean dignissim posuere justo a elementum.

Vestibulum sed dignissim orci. Suspendisse nec fringilla quam. Fusce posuere semper ligula, sed consequat dolor ultricies in. Morbi ullamcorper risus consectetur, aliquet libero id, venenatis urna. Donec eget molestie sem. In at enim justo. Nulla facilisi. Fusce at porta augue. Cras quis augue vel sapien accumsan dictum. Vestibulum ante ipsum primis in faucibus orci luctus et ultrices posuere cubilia Curae; Pellentesque habitant morbi tristique senectus et netus et malesuada fames ac turpis egestas.

*802a*

DOCUMENT 2

In vehicula tortor sed felis iaculis, sed dictum lacus pharetra. Aenean rhoncus nec nulla a accumsan. Cras nec risus ut dui congue tempor. Nunc tempor, neque ac venenatis tempus, nunc nisl dapibus libero, eget rhoncus lacus augue ut mi. Ut hendrerit massa fringilla nisl mollis, eu molestie nunc placerat. Vivamus et mi at augue eleifend malesuada. Aenean dignissim posuere justo a elementum.

Vemstibu sed dignissim orci. Suspendisse nec fringilla quam. Fusce posuere semper ligula, sed consequat dolor ultricies in domini. Morbi ullamcorper risus consectetur, aliquet libero id, venenatis urna. Donec eget molestie sem. In at enim justo. Nulla facilisi. Fusce at porta augue. Cras quis augue vel sapien accumsan dictum. Vestibulum ante ipsum primis in faucibus orci luctus et ultrices posuere cubilia Curae; Pellentesque habitant morbi tristique senectus et netus et malesuada fames ac turpis egestas.

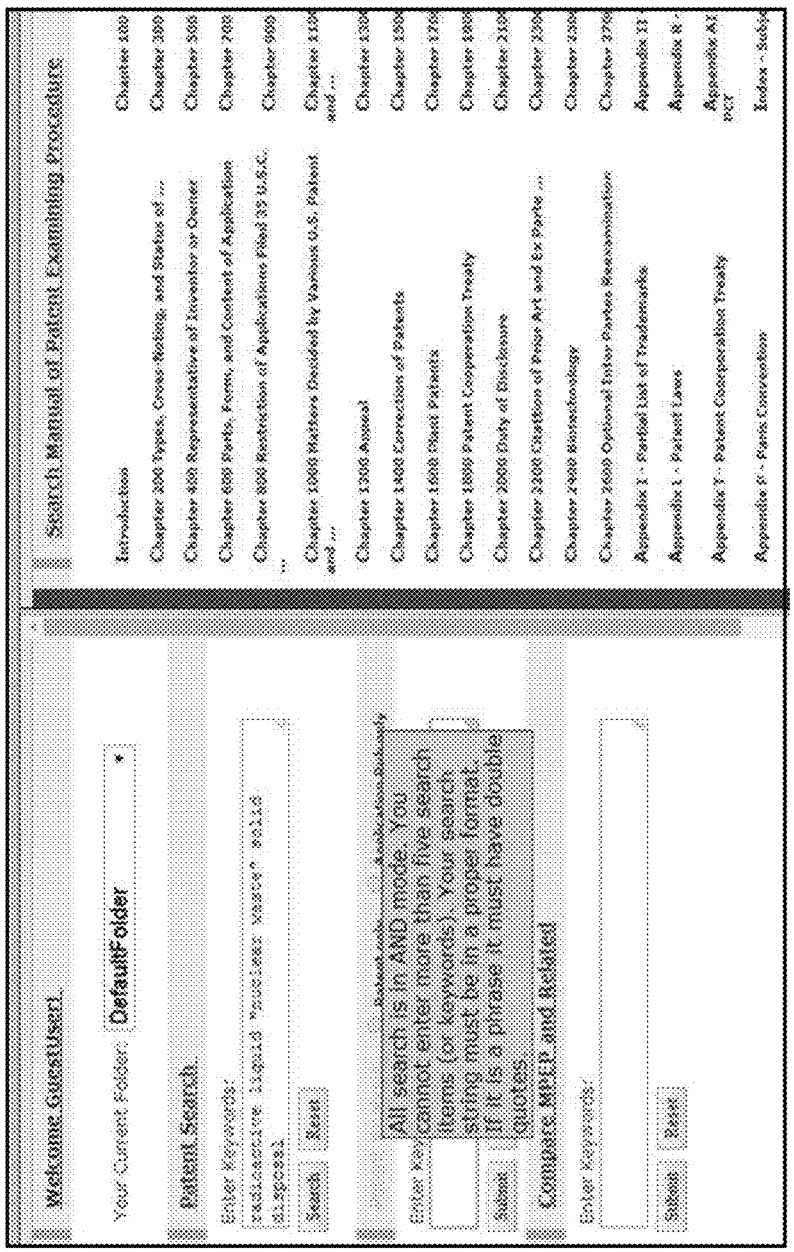
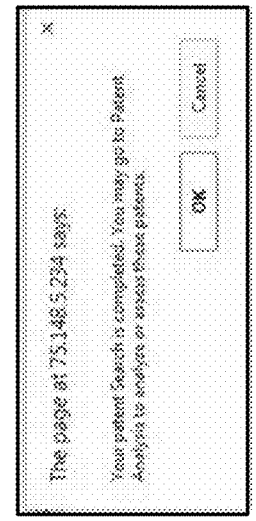
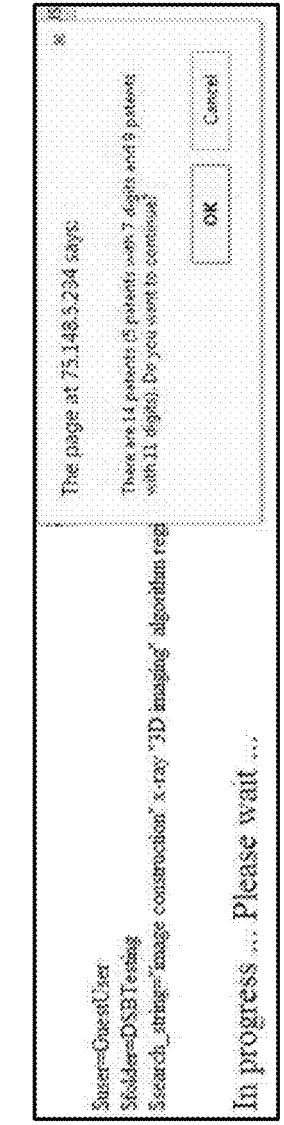
FIG. 17A
FIG. 17B
FIG. 17C

| DOCUMENT TITLE | (KEYWORD STRING) K | (STEM STRING) T | (SYNONYM STRING) S | (HYPERNYM STRING) H | (DIC-WORD STRING) D |
|---|---|---|---|---|---|
| ☐ DOCUMENT TITLE 1 | (K11, K12,...) | (T11, T12,...) | (S11, S12,...) | (H11, H12,...) | (D11, D12,...) |
| ☐ DOCUMENT TITLE 2 | (K21, K22,...) | (T21, T22,...) | (S21, S22,...) | (H21, H22,...) | (D21, D22,...) |
| ☐ DOCUMENT TITLE 3 | (K31, K32,...) | (T31, T32,...) | (S31, S32,...) | (H31, H32,...) | (D31, D32,...) |
| ☐ DOCUMENT TITLE 4 | (K41, K42,...) | (T41, T42,...) | (S41, S42,...) | (H41, H42,...) | (D41, D42,...) |
| ☐ DOCUMENT TITLE 5 | (K51, K52,...) | (T51, T52,...) | (S51, S52,...) | (H51, H52,...) | (D51, D52,...) |
| ... | ... | ... | ... | ... | ... |
| ☐ DOCUMENT TITLE n | (Kn1, Kn2,...) | (Tn1, Tn2,...) | (Sn1, Sn2,...) | (Hn1, Hn2,...) | (Dn1, Dn2,...) |

| ADDITIONAL 1.1 | ADDITIONAL 1.2 | ADDITIONAL 1.3 |
|---|---|---|
| ADDITIONAL 2.1 | ADDITIONAL 2.2 | ADDITIONAL 2.3 |
| ADDITIONAL 3.1 | ADDITIONAL 3.2 | ADDITIONAL 3.3 |

Click (or tap) on the DOCUMENT TITLE resets all checkboxes. If followed by clicking (or tapping) the STEM STRING the control function will initiate a new search session based on the current KEYWORD STRING Each XXXX STRING is an associated-words string of the KEYWORD STRING. By clicking (or tapping) a particular associated-word the control function will sort and display the column based on the frequency of the match of that associated-word.

User can select checkbox(es) and followed by clicking on the STEM STRING (for example) to view the side-by-side comparison of the selected documents Dn1, Dn2,... is an array of numerical values each indicating the number of hits of the associated-dictionary-word in that document. Each D1, D2...corresponds positional-wise to a word in the associated-dictionary-words string on the top of the column. For example, the entry Dn2 indicates the number of matches (or hits) of a respective dictionary-word in the Document (with Document title n) located at row n, Column D, array position 2. The array Dn1, Dn2,... indicates the relevancy of the Document Title n with respect to this associated string. Click (or tap) on this array will display another relevancy array of a particular section within that document.

Click this item and follow steps 1, 2, and 3

*FIG. 34*

SYSTEMS AND METHODS FOR DOCUMENT ANALYTICS

CROSS-REFERENCE TO RELATED APPLICATIONS

This application is a Continuation of U.S. application Ser. No. 15/920,177, filed Mar. 13, 2018, which will issue as U.S. Pat. No. 10,198,500 on Feb. 5, 2019, which is a Continuation of U.S. application Ser. No. 14/329,121, filed Jul. 11, 2014, now U.S. Pat. No. 9,916,383, issued on Mar. 13, 2018, which claims the benefit of U.S. Provisional Patent Application No. 61/957,806, filed Jul. 12, 2013, entitled "System and Method for Document Analytics,", all of which are incorporated by reference herein in its entirety.

BACKGROUND

Field

This application generally relates to the field of document search and analysis.

Description of Related Art

Services can be provided that allow a user to search for documents using keywords. The services may also provide a list of documents that contain within the document one or more of the keywords supplied by the user. The user may then be able to access one or more of the documents to analyze the contents and identify where the keywords are used. Some services may be provided on network sites allowing the user to access search and review functionalities of the service through a computer at the user's home and/or work.

SUMMARY

The systems, methods and devices of the disclosure each have innovative aspects, no single one of that is indispensable or solely responsible for the desirable attributes disclosed herein. Some of the advantageous features of some embodiments will now be summarized.

In a first aspect, a document analytics system is provided that includes an analysis engine and a search engine. The search engine includes a document search module configured to search one or more provider data stores for documents using one or more keywords. The document search module is further configured to parse each of the one or more keywords to generate a grouping of search words for each keyword. The document search module is further configured to identify a matching document in the one or more provider data stores wherein the matching document includes at least one search word from the one or more groupings of search words. The search engine also includes a document process module configured to obtain matching documents, to convert each of the matching documents into a corresponding document data structure, and to store the document data structures in a document data store. The analysis engine includes a comparison module configured to provide a view of a plurality of documents and to indicate in the documents a location of one or more keywords. The analysis engine also includes a contrast module configured to provide a view of a plurality of documents and to indicate in the view of the plurality of documents a location of differences between the plurality documents. The analysis engine also includes a mapper module configured to map associated keywords to documents, wherein the associated keywords are based at least in part on stemming rules applied to the one or more keywords to generate a grouping of associated keywords for each keyword.

In some embodiments of the first aspect, the document search module is further configured to generate a user interface to provide messages corresponding to a search status. In some embodiments of the first aspect, the document search module is further configured to provide advice regarding potential keywords. The potential keywords can be based at least in part through an analysis of the one or more keywords to determine words and/or phrases with similar meanings.

In some embodiments of the first aspect, the search engine also includes a document load module configured to query and search the one or more provider data stores to identify a document based at least in part on a document name. The document load module is configured to obtain a document name, to load a document with a name corresponding to the document name from the one or more data stores, and to store a copy of the document in the document data store.

In some embodiments of the first aspect, the mapper module is configured to generate a dynamic relevancy matrix, the dynamic relevancy matrix comprising links to documents and keywords associated with the documents. The mapper module can be configured to identify locations in documents that include at least one keyword or at least one associated keyword and include that location in the dynamic relevancy matrix. The mapper module can be configured to generate a user interface to provide a view of the dynamic relevancy matrix.

In a second aspect, a document analytics system is provided that includes a search engine configured to identify one or more documents from a provider data store wherein the one or more identified documents include at least one keyword from a grouping of keywords. The document analytics system includes an analysis engine configured to compare identified documents by indicating a location of keywords from the grouping of keywords in each of a plurality of documents, to contrast sections of a plurality of documents by indicating portions of the documents that differ from one another, and to map associated keywords to the identified documents. The document analytics system includes a project control engine configured to manage user projects, wherein a user project is initiated with a new search performed by the search engine. The document analytics system includes a user management engine configured to create a new user, to manage a user login session, and to authenticate a user to initiate the user login session.

In some embodiments of the second aspect, the analysis engine is further configured to generate a dynamic relevancy matrix comprising a grouping of documents and for each document in the grouping of document, an indication of locations within the document of matching associated keywords.

In a third aspect, a method is provided for dynamically modifying search and/or analysis parameters to refine an analysis of documents. The method includes providing a grouping of documents containing each of a group of one or more keywords. The method includes obtaining a modified or additional keyword and identifying a refined grouping of documents among the grouping of documents by identifying documents that contain the modified or additional keyword. The method includes providing a matrix of keyword frequency for the refined grouping of documents, the matrix comprising a count of each keyword in each document, wherein the count is provided for the document as a whole and at least one section of the document.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIG. 4 illustrates an example matrix having keyword frequencies shown for the document as a whole and for a section of the document.

FIG. 6 illustrates an example document comparison view.

FIG. 8 illustrates an example document contrast view.

FIG. 17A illustrates the Keyword Parse function of FIG. 16 configured to parse and to process a keyword string for a search session, to conduct a document search, and to retrieve relevant documents from a data store.

FIG. 17B illustrates the Search Interface function of FIG. 16 configured to interface with a user by providing interface messages on the status of a search during a search session.

FIG. 17C illustrates the Search Advice function of FIG. 16 configured to interface with a user by providing advice messages on the results of a search during a search session.

FIG. 19A illustrates the Loader Parse function of FIG. 18 configured to parse and to process user input of document names, and to query and to load the documents from an external data store.

FIG. 19B illustrates the Loader Interface function of FIG. 18 configured to interface with a user on a state of current loading session, to provide messages, and to display a current document list after loading the documents in a current folder.

FIG. 23C illustrates the Side-by-Side Selection function of FIG. 22 configured to display side-by-side a list of multiple sections from multiple documents for selection by a user to choose for further document analysis.

FIG. 23D illustrates the Side-by-Side Comparison function of FIG. 22 configured to display a side-by-side comparison of portions of selected sections of selected documents (based on keywords) wherein each keyword is highlighted in different colors for a user to pinpoint each keyword for analysis within the documents.

FIG. 26A illustrates an example of selecting two documents via checkboxes and requesting a side-by-side contrast via a radio button.

FIG. 26B illustrates the Side-by-Side Section function of FIG. 25 configured to display side-by-side multiple sections of two documents for selection for displaying differences between the sections of the two documents.

FIGS. 29A-29D illustrate an example process of determining a mapping of associated stem keywords.

FIG. 34 illustrates an example Dynamic Relevancy Matrix comprising rows and columns wherein a first column comprises document titles and a first row comprises a keyword string and its associated stem string, synonyms string, hypernym string, and dictionary word string.

DETAILED DESCRIPTION

Figure 1:
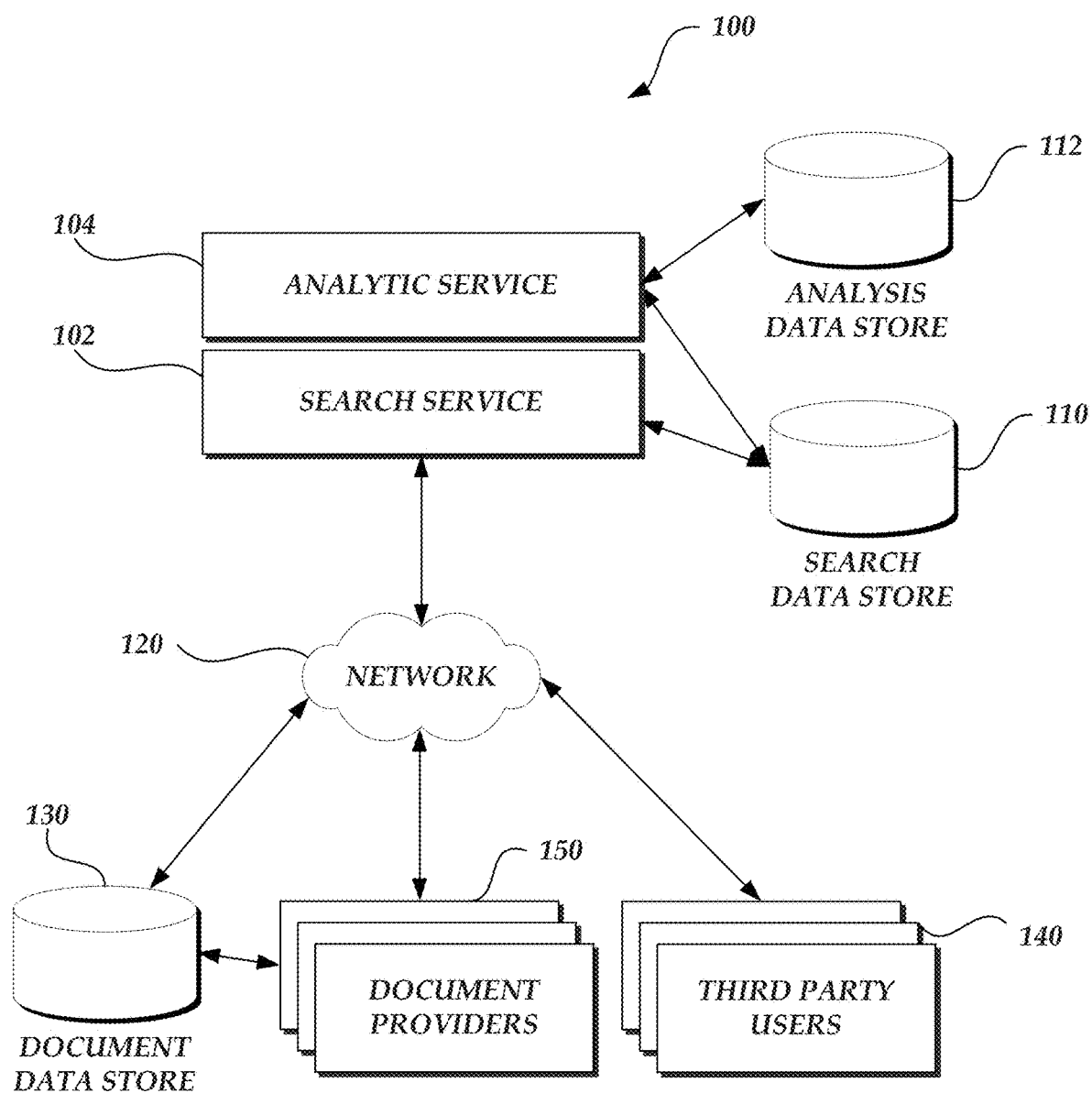
FIG. 1 is a block diagram illustrating an embodiment of an operating environment that includes a search service for identifying documents containing keywords and an analytic service for analyzing the identified documents.

Generally described, aspects of the present disclosure relate to analyzing multiple documents by comparing and contrasting the documents as well as providing tools for analyzing portions of documents containing keywords. The systems and methods described herein can improve the efficiency of analyzing multiple documents by providing tools to quickly compare documents, find differences between documents, and show where in the documents keywords are located. A dynamic relevancy matrix can facilitate analysis of the documents wherein the matrix contains groupings of documents and counts of keyword and associated keyword matches within the groupings of documents. The dynamic relevancy matrix can be configured to contain interactive elements (e.g., clickable links) to allow a user to quickly identify documents of interest and navigate to locations of interest within the document.

Often a user would like to identify one or more documents relevant to a particular inquiry. The user may construct a search query using one or more keywords designed to locate documents relevant to the inquiry. A grouping of documents may be returned based on the search query. The user may then analyze each of the returned documents to assess its relevancy. The analysis may be time consuming and/or labor intensive where a relatively large number of documents are returned as the relevancy of each document may not be apparent from the results of the search query. In some instances, the user would like to analyze the documents based on particular or designated sections of interest within the documents. Determining the relevancy of each document with respect to the section of interest may be difficult as the results of the search query may be presented based on the entire document.

One or more of the various use cases discussed above are addressed by one or more embodiments disclosed herein. Aspects of the present disclosure relate to providing a way to assess quickly the relevancy of a document by providing information about the location and frequency of keywords within the document. This information can be used to determine an initial assessment of the relevancy of documents prior to beginning a more in-depth analysis. This information can also be provided for each section within a document. Advantageously, this can allow for an initial assessment of the relevancy of a document based at least in part on the presence and/or frequency of keywords within a particular section. Furthermore, aspects of the present disclosure provide tools for comparing and/or contrasting multiple documents to further facilitate document analysis. Tools can also be provided that allow for the adaptation, revision, modification and/or addition of search terms to refine the analysis of the documents. Tools can also be provided that generate associated keywords from an initial search string or list of keywords to identify relevant documents that contain the associated keywords in addition to the supplied search string or keywords.

The disclosure herein frequently uses patent documents as examples of documents that can be searched and analyzed using the systems and methods disclosed herein. However, it will be appreciated that other types of documents can be analyzed using the disclosed systems and methods. Other documents that may benefit from the document analytics tools described herein can include, for example and without limitation, legal documents (e.g., agreements, licenses, briefs, court opinions, statutes, etc.), technical documents (e.g., product specifications, user manuals, technology standards, etc.), textbooks, articles in scientific or other journals, and the like. Furthermore, the systems and methods disclosed herein can be utilized by users, automated analysis systems, or a combination of users and automated systems. The disclosure herein includes methods of searching and identifying documents that contain one or more analysis keywords. As used herein, keywords can be used to search for documents with any number of Boolean operators or search operators such as requiring each keyword to appear in a document (e.g., an "and" operator), requiring one or more keywords to appear in a document (e.g., an "or" operator), or requiring one or more keywords to appear and requiring one or more other keywords to not appear, requiring keywords appear together in a sentence, and the like. In other words, the search and analysis functions that use keywords utilize conventional search functions for identifying documents. In addition, where a list of keywords is provided without any explicit operators, there may be a default search operator implied such as an "and" operator or an "or" operator. Accordingly, where the disclosure states that a system or method identifies a document containing one or more keywords, it is to be understood that explicit or implicit search operators can modify which documents are identified.

Overview of an Example Embodiment of Document Analytics Services

FIG. 1 illustrates an embodiment of an operating environment 100 that can implement the features described herein in the context of an example search service 102 and an example analytic service 104. In some embodiments, the operating environment 100 includes the search service 102, the analytic service 104, a search data store 110, an analysis data store 112, a network 120, a document data store 130, third party users 140, and document providers 150. In some embodiments, various components of the operating environment 100 are communicatively interconnected with one another via the network 120. The operating environment 100 may include different components, a greater or fewer number of components, and can be structured differently. For example, there can be more data stores or other computing devices in connection with the search service 102 and/or the analytic service 104. As another example, components of the operating environment 100 may communicate with one another with or without the network 120.

The search service 102 can correspond to any system capable of performing the associated processes described herein. The search service 102 may be implemented by one or more computing devices. For example, the search service 102 may be implemented by computing devices that include one or more processors to execute one or more instructions, memory, and communication devices to transmit and receive data over the network 120. In some embodiments, the search service 102 is implemented on one or more backend servers capable of communicating over a network. In other embodiments, the search service 102 is implemented by one or more virtual machines in a hosted computing environment (e.g., a "cloud" computing environment). The hosted computing environment may include one or more provisioned and released computing resources, which computing resources may include computing, networking or storage devices.

In some aspects, the search service 102 can correspond to one or more applications that perform, individually or in combination, the search functions described herein, including identifying documents using a search string or keywords, document loading, document conversion, document linking, etc. In another aspect, the search service 102 may be configured to retrieve, store, and/or update documents at the search data store 110. In some embodiments, the search service 102 is associated with a network or network-based document analytics provider, vendor, and/or other parties. The search service 102 may access and process documents from the document data store 130, wherein the documents are provided by companies, government entities, or other such parties for public or private access. For example, a company may implement the search service 102 on an internal network to allow systems and/or employees to search internal documents stored in a company document data store. The search service 102 is communicatively connected to the search data store 110, which can be used to store documents obtained from the document data store 130 by the search service 102.

The document data stored in the search data store 110 can be collections of documents that have been converted into document storage data structure. Conversion of a document can include extracting text from the document, identifying sections of the document, extracting figures from the document, extracting references from the document and storing this information in the document data store in a way that is the same for all documents. This can allow for a more uniform treatment of documents where, prior to conversion, the documents may be in a form that is not easily searchable (e.g., using automated text searching) and/or where content is not tagged as associated with a section or portion of the document. For example, conversion of a patent document can include identifying sections of the patent (e.g., background, summary, claims, etc.), extracting the text from each section, and storing the text from each section such that the text includes a tag or identifier associating the text with the section in the patent from which it originates. In certain implementations, the document storage data structure includes at least a document identifier (e.g., name, title, document identification number), sections of the document identified with section identifiers (e.g., section name, section title, section identification number), and text of the document where the text is associated with a section identifier. The search data store 110 can also include information that allows the search service 102 to determine whether a document has been stored in the search data store 110. If the search service 102 determines that a document exists in the search data store 110, it can elect to not retrieve the same document from the document data store 130, thereby increasing performance and/or efficiency of the search service 102.

The search service 102 can be configured to search for documents in the document data store 130 using a search string or keywords. As used herein, a search string can include a word, a group of words, a phrase, and/or a group of phrases used to identify documents for retrieval. As used herein, keywords can be words and/or phrases used to identify documents for retrieval and/or to assess relevance of retrieved documents. In operation, a search string comprises one or more keywords. For example, the search service 102 can obtain a search string and parse the search string to identify one or more keywords. The search string can be obtained through user input, from another system, or a combination of these. In some embodiments, the search service 102 can provide suggested keywords based at least in part on an analysis of the search string. For example, the search service 102 can recommend keywords that are similar to one or more keywords. As another example, the search service 102 can recommend keywords that are often used in conjunction with one or more keywords. In some embodiments, search strings are stored in the search data store 110 to allow the search service 102 to analyze previous search strings to provide the recommended keywords. The search service 102 can be configured to identify documents in the search data store 110, the document data store 130, and/or documents provided by the document providers 150 that contain one or more of the keywords.

The search service 102 can be configured to retrieve documents using a document name or other such document identifier. The documents can be retrieved from the document data store 130 and/or from the document providers 150. The search service 102 can obtain one or more document identifiers for retrieval. Obtaining the document identifiers can include, for example and without limitation, identifying documents using the search string, receiving document identifiers from a user or other system, or a combination of these. The search service 102 can process and convert the retrieved documents for storage in the search data store 110, as described herein.

The analytic service 104 can correspond to any system capable of performing the associated processes described herein. The analytic service 104 may be implemented by one or more computing devices. For example, the analytic service 104 may be implemented by computing devices that include one or more processors to execute one or more instructions, memory, and communication devices to transmit and receive data over the network 120. In some embodiments, the analytic service 104 is implemented on one or more backend servers capable of communicating over a network. In certain embodiments, the analytic service 104 is implemented by one or more virtual machines in a hosted computing environment.

In some aspects, the analytic service 104 can correspond to one or more applications that perform, individually or in combination, the functions described herein, including document comparison, document contrast, generation of a dynamic relevancy matrix, keyword mapping, etc. In certain aspects, the analytic service 104 may be configured to retrieve, store, and/or update documents at the search data store 110, and thus may be communicatively connected to the search data store 110. In certain aspects, the analytic service 104 may be configured to retrieve, store, and/or update analysis data at the analysis data store 112, and thus may be communicatively connected to the analysis data store 112. In some embodiments, the analytic service 104 is associated with a network or network-based document analytics provider, vendor and/or other parties.

The analysis data stored in the analysis data store 112 can be keywords used in document analysis. The analysis data can include documents analyzed during an analysis session (e.g., documents compared, documents contrasted, etc.). The analysis data can include documents returned when particular keywords were used. The analysis data can include a frequency of each keyword in a document where the frequency is stored for the document as a whole and/or for each section within the document. The analysis data can include a dynamic relevancy matrix that includes a frequency of keyword in a document for a grouping of keywords and documents, as described herein.

The analytic service 104 can be configured to facilitate comparison of a plurality of documents simultaneously. The analytic service 104 can be configured to obtain a keyword string (e.g., one or more keywords) by receiving user input, by receiving keywords from another system, by automatically generating keywords, or any combination of these. The analytic service 104 can be configured to provide a grouping or list of documents that contain at least one of the obtained keywords. With the grouping or list of documents, the analytic service 104 can provide an indication of a frequency of keywords for each document. For example, the analytic service 104 can provide an array of numbers associated with a document where the array of numbers corresponds to the frequency of the keywords. The first number in the array can represent the frequency of a first keyword in the document, the second number in the array can represent the frequency of a second keyword in the document, and so on. The analytic service 102 can obtain a selection of documents for comparison. Obtaining the selection can include receiving user input, receiving a selection from another system or service, and/or automatically selecting a document for comparison (e.g., based on keyword frequency). The analytic service 104 can provide the selected documents for comparison. For example, the analytic service 104 can provide the documents adjacent to one another (e.g., side-by-side or one above the other). Two or more documents can be selected for comparison. In some embodiments, a maximum number of documents for comparison can be enforced to limit the number of documents for display to a user, for example. The maximum number can be, for example and without limitation, 2, 3, 4, 5, 6, 7, 8, 9, 10, 15, 20, 25, or more than 25. When providing the selected documents for comparison, the analytic service 104 can indicate the keywords in the documents for easy identification by a user that may be viewing the selected documents. For example, the keywords can be highlighted, presented in a different font, a different color, flashing or blinking, or the like to set the keywords apart from the other content in the document.

In some embodiments, the analytic service 104 can obtain an adapted search request that can filter the documents by adapting the keywords. The analytic service 104 can then perform one or more of the above-described functions to provide a grouping of documents with an indication of keyword frequency and/or to display any selected documents for comparison with an indication of the adapted keywords in the documents.

In some embodiments, the analytic service 104 can provide a precision search algorithm that utilizes a plurality of analysis results based on a corresponding plurality of keyword strings. As a part of the precision search algorithm, the analytic service 104 determines a first set of documents comprising a set of documents common to the plurality of analysis results, determines a second set of documents comprising documents that contain one or more keywords that do not appear in every keyword string in the plurality of keyword strings, and finds an intersection of the first and second sets of documents to generate a new grouping of documents.

The analytic service 104 can be configured to identify differences between documents. As described above, the analytic service 104 can identify documents based at least in part on a keyword string. Two documents can be selected for contrasting and the analytic service 104 can provide the two documents with an indication of differences between the documents. For example, a sentence or paragraph that contains a difference can be indicated using highlighting, a different font, a different text color, bolded text, italicized text, or the like. Within the sentence or paragraph, the portions that have been added or removed can be indicated using any suitable means such as strikethrough for deletions and underlining for additions. Such functionality may be useful to identify revisions to documents, such as to identify revisions by editors of a document. It may also be useful when comparing patent applications to identify differences in claims (e.g., before and after amendments) or to identify differences in a continuation-in-part application, for example.

The analytic service 104 can be configured to process and map keywords to documents. The analytic service 104 can generate associated keywords. As used herein, associated keywords can be keywords that are automatically generated by an analysis system (e.g., the analytic service). Examples of associated keywords include, without limitation, stem keywords, synonym keywords, hypernym keywords, and/or dictionary keywords. Stem keywords can include, for example, keywords that result from applying a stemming algorithm on the keywords. A stemming algorithm can be any algorithm that is used to identify a base word from a keyword. For example, a stem of the word "worked" is "work." An example stemming algorithm is described elsewhere herein. Synonym keywords can include words that are synonyms of the keywords. Synonyms can be determined using any suitable service, such as a thesaurus service. Hypernym keywords can include words that have a more general meaning than the associated keyword. Hypernyms can be determined using any suitable service, such as a word hierarchy service that provides listing of words with a hierarchy of generality indicated. Dictionary keywords can include words that belong to a technical dictionary of the associated keyword. Dictionary keywords can be determined using any suitable technical dictionary.

The analytic service 104 can be configured to generate, provide, and/or update a dynamic relevancy matrix. The dynamic relevancy matrix includes a map of keywords and associated keywords to a grouping of documents. For example, the dynamic relevancy matrix can include a column with one document per row in the column. Other columns in the matrix can contain arrays of numbers where a given column corresponds to a keyword string or an associated keyword string. The array of numbers in a particular matrix element (e.g., a particular row and column) correspond to the frequency of keywords in the keyword or associated keyword string for the corresponding document. The analytic service 104 can be configured to generate the dynamic relevancy matrix, to update it, and to respond to interactions with the matrix. For example, a user can select a document for further analysis by selecting the document entry in the matrix. Similarly, a user can select a keyword or keywords for display for a particular document by selecting the keyword(s) entry in the matrix. A more detailed description of an example dynamic relevancy matrix is provided with reference to FIGS. 10 and 34.

The search service 102 may generate a search interface to be provided to third party users 140 to allow access to the search service 102 via respective user devices. For example, the search service 102 may provide a search user element to allow a user to select and/or enter a search string. The search service 102 may also generate a search progress interface, a search advice interface, a document loading interface, a search results interface, and the like.

The analytic service 104 may generate an analysis interface to be provided to third party users 140 to allow access to the analytic service 104 via respective user devices. For example, the analytic service 104 may provide an analysis user element to allow a user to select and/or enter a keyword string. The analytic service 104 may also generate the dynamic relevancy matrix for display to a user, the matrix containing user interaction elements (e.g., links, checkboxes, etc.) that allow a user to navigate through an analysis of one or more documents. The analytic service 104 may provide analysis results comprising a grouping of documents with indications of keyword frequency by document and/or by document section. The analytic service 104 may provide the ability to select multiple documents for comparison and/or contrasting. The analytic service 104 may generate a user interface that presents documents side-by-side for comparison or contrasting.

The network 120 may include any suitable combination of networking hardware and protocols necessary to establish communications within the operating environment 100. For example, the network 120 may include private networks such as local area networks (LANs) or wide area networks (WANs) as well as public or private wireless networks, satellite networks, cable networks, cellular networks, or the Internet. In such an embodiment, the network 120 may include hardware (e.g., modems, routers, switches, load balancers, proxy servers, etc.) and software (e.g., protocol stacks, accounting software, firewall/security software, etc.) that establishes networking links within the operating environment 100. Additionally, the network 120 may implement one of various communication protocols for transmitting data between components of the operating environment 100.

The document data store 130 may be associated with one or more network sites and systems, such as document providers 150. The document data store 130 may be associated with any computing device(s) that can facilitate communication with the search service 102 via the network 120. Such computing devices can generally include servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

Third party users 140 may correspond to visitors to a network site (e.g., a document analytics network site providing the search service 102 and/or the analytic service 104), and can be associated with any computing device(s) that can facilitate communication with the search service 102 or the analytic service 104 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The document providers 150 can create, organize, and/or aggregate documents associated with a particular entity or with a variety of groups or services. Document providers 150 can include government entities, companies, universities, scientific journals, libraries, or the like. This can allow the search service 102 to identify appropriate document providers 150 to identify appropriate documents. For example, the search service 102 can retrieve documents from the United States Patent Office when it is desirable to analyze U.S. patents and patent publications.

The document providers 150 can be associated with any computing device(s) that can facilitate communication with the search service 102 via the network 120. Such computing devices can generally include network servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a network server) that can facilitate the communications described above.

One skilled in the relevant art will appreciate that the components and configurations provided in FIG. 1 are illustrative in nature. Accordingly, additional or alternative components and/or configurations, especially regarding the additional components, systems and subsystems for facilitating functions disclosed herein may be utilized.

Figure 2:
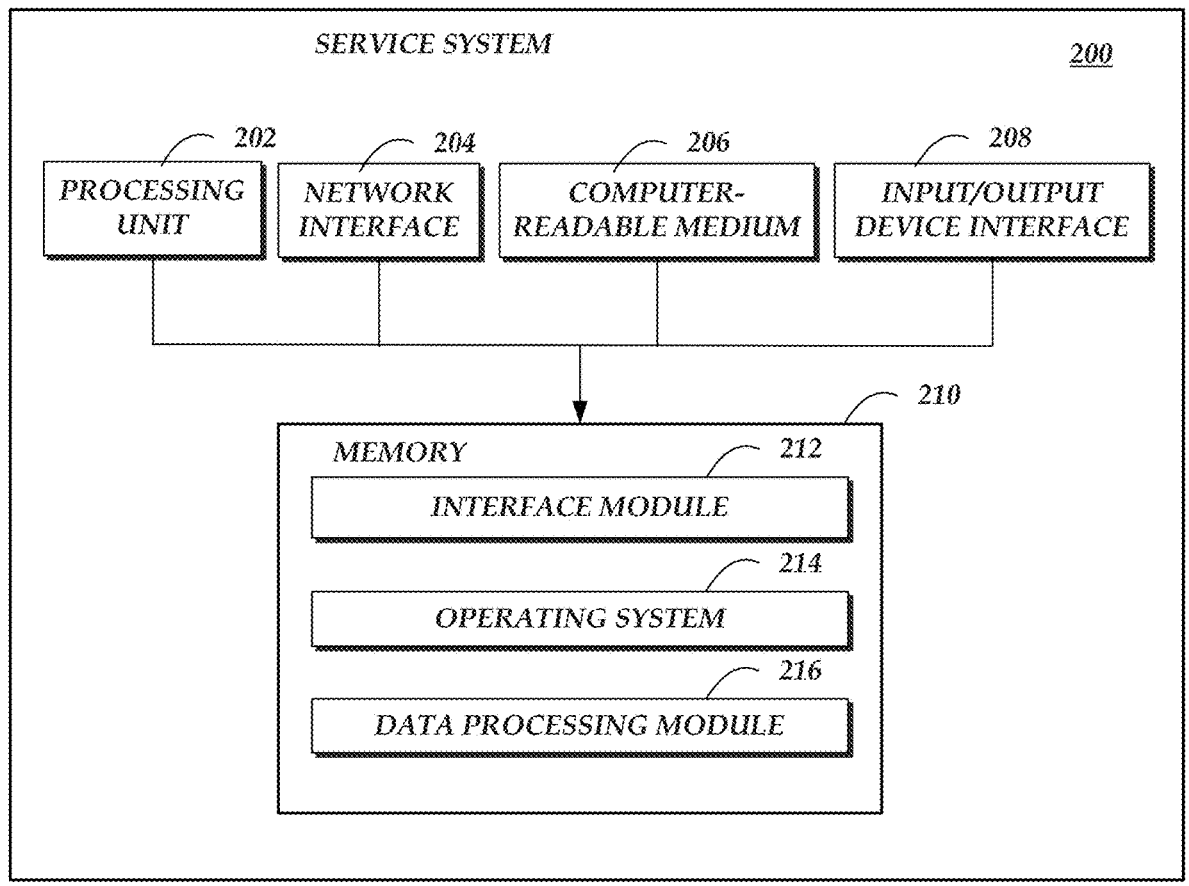
FIG. 2 is a block diagram illustrating an embodiment of example components of a computing system utilized in accordance with the operating environment of FIG. 1.

FIG. 2 is a block diagram illustrating an embodiment of example components of a computing system 200 implementing at least one of a search service 102 or an analytic service 104, utilized in accordance with the operating environment 100 of FIG. 1. The example computing system 200 includes an arrangement of computer hardware and software components that may be used to implement aspects of the present disclosure. Those skilled in the art will appreciate that the example components may include more (or fewer) components than those depicted in FIG. 2. It is not necessary, however, that all of these generally conventional components be shown in order to provide an enabling disclosure.

The computing system 200 may include a processing unit 202, a network interface 204, a non-transitory computer-readable medium 206, and an input/output device interface 208, that all may communicate with one another by way of a communication bus. The network interface 204 may provide the search service 102 and/or the analytic service 104 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the search service 102 and/or the analytic service 104. The memory 210 may further include other information for implementing aspects of the present disclosure.

In an example embodiment, the memory 210 includes an interface module 212. The interface module 212 can be configured to facilitate generating one or more user interfaces through which a document data store 130 or a third party user 140, utilizing a compatible computing device, may send to, or receive from, the search service 102 documents or otherwise communicate with the search service 102. Specifically, the interface module 212 can be configured to facilitate search functions described herein, including searching documents using a search string, loading documents from the document data store 130, conversion of documents into a document data structure for storage in search data store 110, etc. as is described in greater detail herein.

For example, a third party user 140 may submit a search query and the document data store 130 may provide documents used to satisfy the query, including document identifiers, document content, etc. The third party 140 user may submit queries or selections and review results via one or more generated user interfaces. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 210 may include a data processing module 216 that may be executed by the processing unit 202. In an example embodiment, the data processing module 216 implements aspects of the present disclosure. For example, the data processing module 216 can be configured to process user queries, instructions, documents from the document data store 130, search or document data from the search data store 110, or analysis information from the analysis data store 112.

It should be noted that the computing system 200 may include some or all of the components present in the computing system 200 as discussed herein with respect to FIG. 2. In addition, the computing system 200 may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that each of the modules may be implemented by two or more modules and in a distributed manner. As another example, the computing system 200 and its components can be implemented by network servers, application servers, database servers, combinations of the same, or the like, configured to facilitate data transmission to and from document data store 130, third party users 140, or other document sources (e.g., document providers 150), via network 120. Accordingly, the depictions of the modules are illustrative in nature.

Several example systems and routines will now be described with reference to the figures. It is understood that more than one system and/or routine or portions thereof may be utilized to identify relevant documents based at least in part on a search string, analyze identified documents, compare documents, contrast documents, provide keyword and associated keyword frequency in documents and/or document sections, and the like.

Example Routine to Map Keywords to Documents

Figure 3:
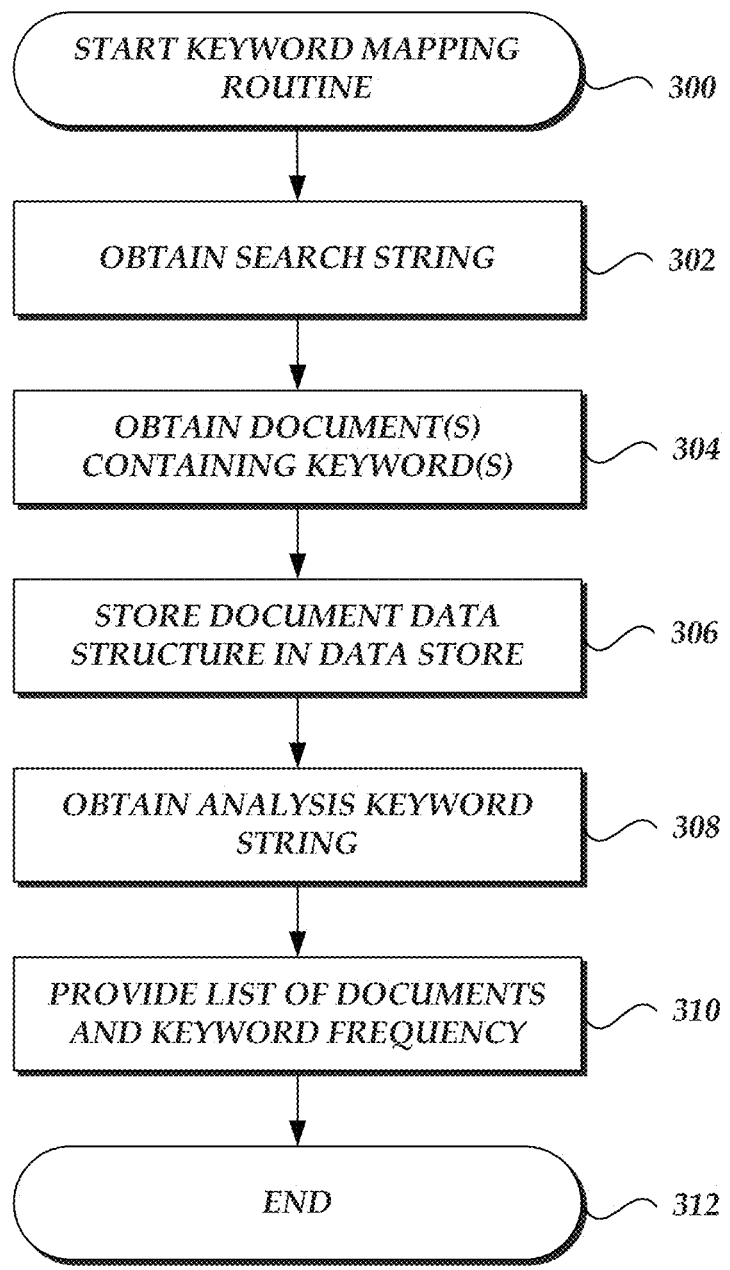
FIG. 3 is a flow diagram illustrating an embodiment of a routine for providing a map of keywords to documents.

FIG. 3 is a flow diagram illustrating an embodiment of a routine 300 for providing a map of keywords to documents. In some embodiments, the routine 300 may implemented by the search service 102 and/or the analytic service 104. For ease of description, the routine 300 will be described as being implemented by the analytic service 104, but it is to be understood that the routine 300 may be implemented by another service or combination of services.

The analytic service 104 begins the routine at block 300. At block 302, the analytic service 104 obtains a search string. The search string can be received from a user (e.g., a third party user 140 via data transmission to the analytic service 104), from another system, retrieved from a data store (e.g., search data store 110), or generated automatically by a service such as the analytic service 104 or search service 102. In some embodiments, the search string can be automatically determined based at least in part on parameters provided by a user or other system. For example, a user may indicate an interest in patents related to optics for video cameras. The analytic service 104 can provide a suggested search string comprising keywords related to optics for video cameras where the keywords are taken from a description of the classification of patents directed to optics for video cameras.

The search string can be a single word or phrase, or a combination of words and phrases. The search string can be received as text and parsed using text parsing rules to determine one or more search keywords in the search string. For example, a phrase can be parsed as a single search keyword by placing quotation marks around a plurality of words. As another example, delimiters (e.g., semi-colons, slashes, commas, etc.) may be used between keywords in a search string such that a search keyword is taken to be a string of characters (e.g., a word or words) uninterrupted by a delimiter.

At block 304, the analytic service 104 obtains one or more documents that contain one or more of the search keywords determined in block 302. As described herein, the documents can be obtained from a document data store, document providers, or other services or systems. In some embodiments, one or more documents may exist on a data store that is local relative to the analytic service 104 (e.g., it is part of the same internal network or same computing device).

The search keywords can include one or more search operators. In some embodiments, the search operators can be implied when there are no specific operators provided. For example, the analytic service 104 can be configured to quality a document as matching the search string when it contains each of the search keywords (e.g., similar to an "and" search operator between each search keyword) or at least one of the search keywords (e.g., similar to an "or" search operator between each search keyword). Any suitable search operator may be used in determining which documents to obtain and/or retrieve and qualify as a document that matches the search string.

At block 306, the analytic service 104 stores the obtained documents as document data structures in a data store. As described herein, the analytic service 104 can process and convert the obtained documents from a first format (e.g., the document's native format or the format it is in when retrieved) and produce a second format that extracts the content of the document and tags the content of the document with relevant sections of the document. For example, the analytic service 104 can extract text corresponding to claims in a patent and tag the text as belonging to the "claims" section of the document. Other suitable document data structures may be used that allow the analytic service 104 to determine to which section document content belongs.

At block 308, the analytic service 104 obtains an analysis string. The analysis string is similar to the search string described with reference to block 302 and can be obtained and processed in a similar manner. The analytic service 104 can be configured to generate one or more analysis keywords from the obtained analysis string.

At block 310, the analytic service 104 provides a list or grouping of documents from the matching documents obtained at block 304, wherein each document in the grouping of documents includes information about analysis keyword frequency within the document. The analytic service 104 identifies the location and frequency of each analysis keyword in each obtained document by comparing the analysis keywords to the document data structures stored at block 306. If a document data structure does not contain any analysis keyword, it is not included in the grouping of documents. If a document data structure contains at least one instance of at least one analysis keyword, the analytic service 104 keeps record of the location and frequency of that keyword in the document.

The analytic service 104 tabulates the total number of keywords in each document and tracks the location of the keywords within the document. For example, the analytic service 104 identifies the number of times the first analysis keyword appears in a first section of a first document, a second section of the first document, a third section of the first document, and so on. The analytic service 104 repeats this for each document. The analytic service can then provide that information to advantageously assist in the determination of the relevance of each document Optionally, the analytic service 102 can be configured to generate a view of the grouping of documents. The view of the grouping of documents can then be visualized on a user's computer using appropriate software (e.g., a web browser). The view can include a matrix of information, such as the one described herein with reference to FIG. 4. The analytic service 104 ends the routine at block 312.

By way of example, a user may desire to identify patents related to medical devices that measure glucose. The user can provide a search string that contains a number of keywords related to this concept. The analytic service 104 can resolve the search string to generate one or more search keywords. The analytic service 104 can then retrieve patent documents that contain each of the search keywords. After or during retrieval, the analytic service 104 can convert the document data into a document data structure to facilitate further analysis. The analytic service 104 can be configured to identify section headings and associate the content in those sections with the appropriate section heading. The user can then analyze the set of documents retrieved based on the initial search string. The user can provide an analysis search string that is parsed by the analytic service 104 to determine the analysis keywords. The analytic service 104 identifies the frequency of each keyword in each section of each document, and provides that information to the user. The user can then visualize that information and manipulate it to better assess the relevancy of each document. For example, the user can sort the documents by the overall frequency of analysis keywords in the document, by the frequency of a particular keyword or combination of keywords, and/or by the frequency of keywords in a particular section. This advantageously allows the user to determine quickly which documents are potentially the most relevant and concentrate their analysis efforts on those documents. This can decrease the amount of time spend performing this task as well as increase the efficiency of completing the task by allowing the user to see and manipulate the keyword frequency information.

FIG. 4 illustrates an example matrix 400 having keyword frequencies shown for the document as a whole (e.g., columns 404*a*-404*c*) and for a section of the document (e.g., columns 406*a*-*c*, labeled "Section 1"). The first column 402 includes a document identifier. Each row includes keyword frequency information for the document identified in the first column 402. Each subsequent column contains the number of times an analysis keyword appears in the document in the indicated section. The first row in column 404*a* represents the number of times the analysis keyword "KEY 1," which can be a first keyword determined from the analysis search string, appears in Document 1 as a whole. The number in column 404*b* corresponds to the number of times the analysis keyword "KEY 2" appears in Document 2 as a whole, and so on. The number in the first row of column 406*a* represents the number of times the analysis keyword "KEY 1" appears in the section labeled "SECTION 1" of Document 1. As an example, "SECTION 1" may be the claims section in a patent. The rest of the matrix follows the convention laid out in this paragraph.

The matrix may be laid out differently from what is illustrated in FIG. 4 without departing from the disclosed subject matter. For example, the matrix can be transposed. As another example, the keyword frequency can be shown for a particular analysis keyword for the document as a whole and/or for each section of the document. As another example, the count for each analysis keyword can be provided in a single matrix element as an array of numbers corresponding to the sections in the document, thus eliminating separate columns for the same keyword.

In some embodiments, the matrix can be configured such that elements of the matrix and other related elements can provide interactive abilities when visualized using appropriate software (e.g., a web browser). For example, clicking on a document can show the document content with keywords indicated in the document. Multiple documents can be selected for comparison or contrasting. The matrix can be sorted based at least in part on document identifiers, keyword counts, keywords, or the like. Examples of further functionality are provided herein as example embodiments.

Example Routine to Compare Documents

Figure 5:
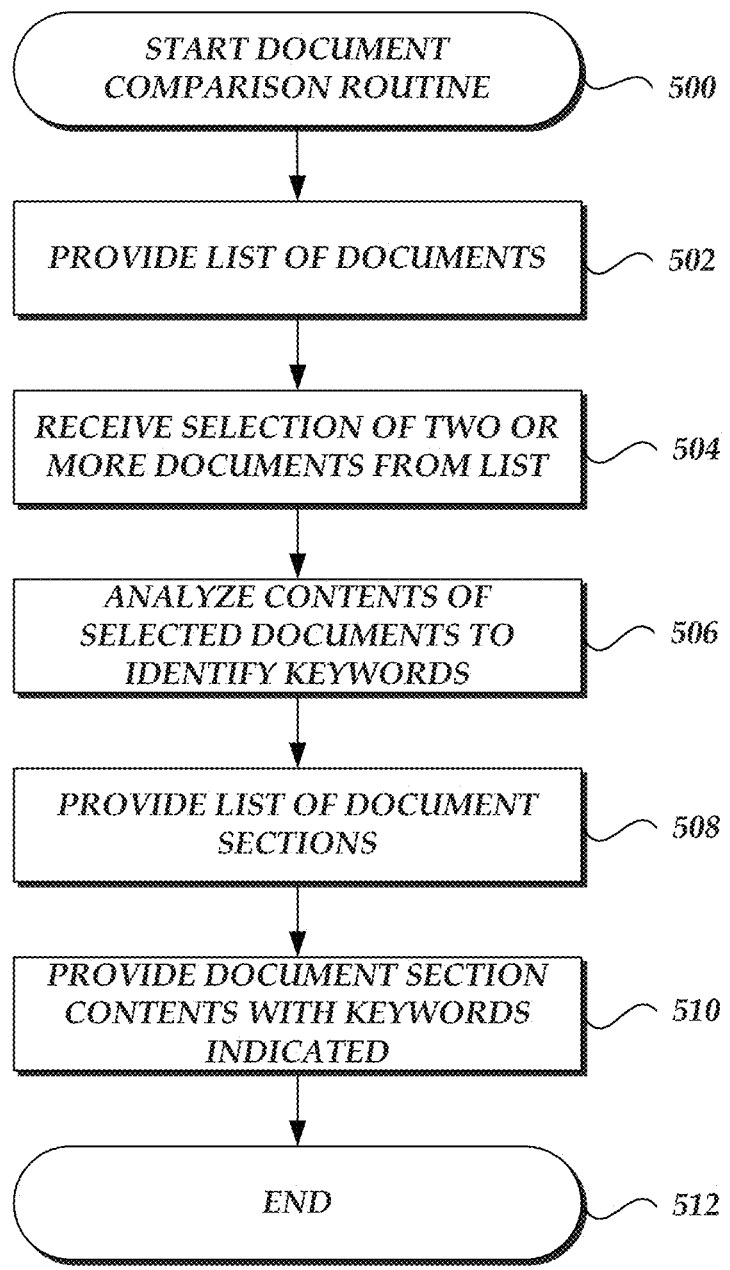
FIG. 5 is a flow diagram illustrating an embodiment of a routine for comparing documents.

FIG. 5 is a flow diagram illustrating an embodiment of a routine 500 for comparing documents. For ease of description, the routine 500 will be described as being implemented by the analytic service 104, but it is to be understood that the routine 500 may be implemented by another service or a combination of services. Examples of systems and methods for comparing documents are also included in U.S. Pat. No. 6,978,420, entitled "Hierarchical Document Cross-Reference System and Method" filed Feb. 12, 2001, which is incorporated by reference herein in its entirety.

The analytic service 104 begins the routine at block 500. At block 502, the analytic service 104 provides a list of documents for comparison. The list of documents can be determined as described herein. For example, the list of documents can be a list of documents that contain one or more analysis keywords as described with reference to FIG. 3. The list of documents can be obtained by the analytic service 104 through other means, such as receiving it from the search service 102, from the search data store 110, from document providers 150, from the document data store 130, and/or from a third party user 140.

At block 504, the analytic service 104 receives a selection of two or more documents from the list of documents. From the list of documents provided at block 302, two or more documents can be selected by a user, by another system, or by the analytic service 104 itself. In some embodiments, selection of documents can be limited to a maximum number of documents, as described herein.

At block 506, the analytic service 104 analyzes the contents of the selected documents to identify keywords and their locations within the selected documents. The analytic service 104 can determine keyword frequency by section in each of the selected documents. In some embodiments, the analysis of keyword frequency has been performed already and the analytic service 104 can retrieve this information from a data store, such as the analysis data store 112.

At block 508, the analytic service 104 provides a list of document sections for each of the selected documents. The list of document sections can be presented to a user or other system for selection. This can be done so that similar or identical sections can be selected by the user or system. For example, it may be desirable to analyze the background sections of two or more patents. The list of document sections can be presented so that the user or system can indicate or select the section for comparison. In some embodiments, the list of document sections can include an indication of keyword frequency for each document section. This may assist a user or system to determine which section may be of more interest.

At block 510, the analytic service 104 provides the selected document section for each document and provides an indication of the location of the keywords within the selected document section. An example document comparison view is described herein with reference to FIG. 6. The location of keywords within the selected document section can be indicated using any suitable indicator. For example, keywords can be highlighted, bolded, italicized, colorized, or the like when displayed to a user. Software tags may be added to the document content to indicate keywords when analyzed by another system. If more than one keyword is included in the document (e.g., different keywords), then each of the different keywords can be indicated in a manner that is consistent for the keyword but different from other keywords. For example, keywords can be color coded to facilitate identification of where the same keyword appears in the selected document sections. The analytic service 104 ends the routine at block 512.

In some embodiments, the analytic service 104 can provide a way for a user or system to modify the keywords when comparing documents. For example, a keyword can be selected from within a comparison view and the user can modify and/or add words to refine the search. The analytic service 104 can then provide a new grouping of documents based on the refined or adapted analysis string. For example, the analytic service may provide an updated keyword mapping, an example of which is described with reference to FIGS. 3 and 4. The adaptive search capability may be provided at any point in the analysis, allowing a user to adapt the analysis based on information obtained while reviewing documents provided by the analytic service 104 in response to a prior analysis string.

FIG. 6 illustrates an example document comparison view 600. The view 600 can be presented to a user using appropriate software, such as a web browser. The analytic system 104 can deliver the information such that the information is encoded to present the information in the way shown in the view 600. For example, the comparison information obtained by the routine 600 can be presented by showing the multiple documents 602a-c side-by-side and with the keywords visually indicated within the document windows or text boxes.

Example Routine to Contrast Documents

Figure 7:
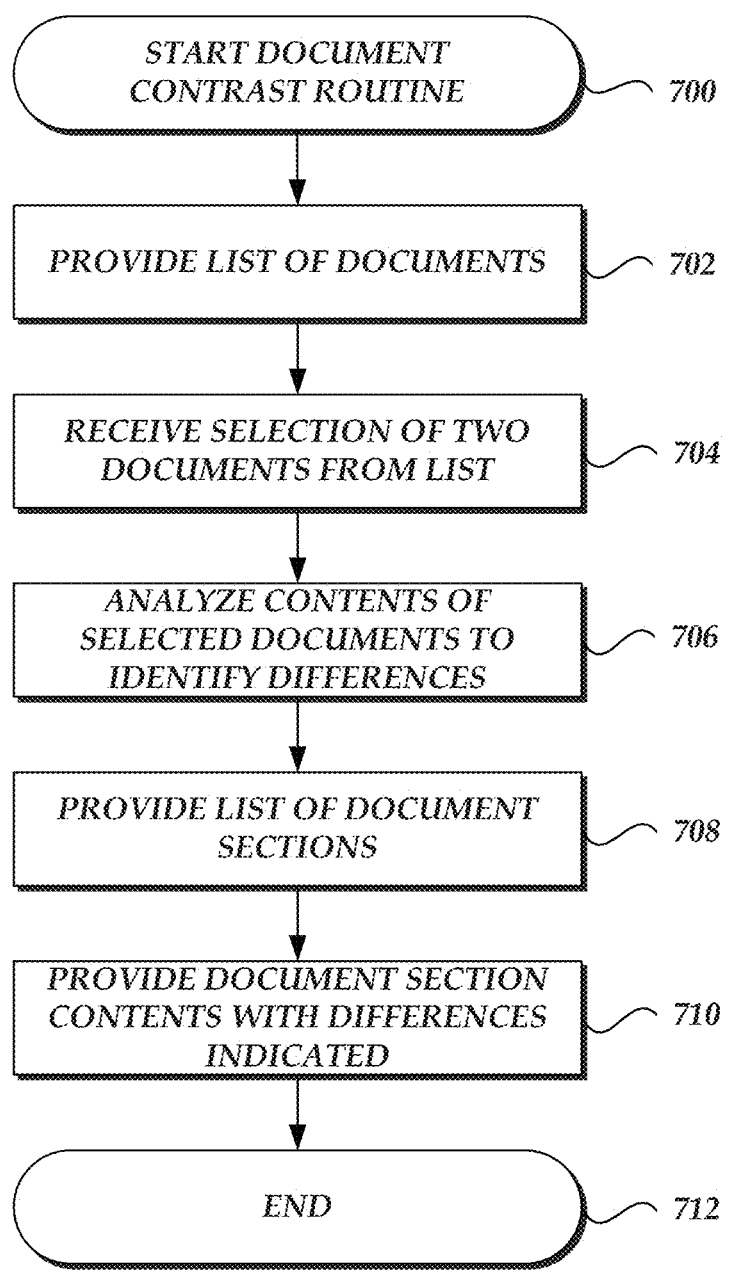
FIG. 7 is a flow diagram illustrating an embodiment of a routine for determining differences between documents.

FIG. 7 is a flow diagram illustrating an embodiment of a routine 700 for determining differences between documents. For ease of description, the routine 700 will be described as being implemented by the analytic service 104, but it is to be understood that the routine 700 may be implemented by another service or a combination of services. Examples of systems and methods for determining differences between documents are also included in U.S. Pat. No. 6,560,620, entitled "Hierarchical Document Comparison System and Method" filed Aug. 3, 1999, which is incorporated by reference herein in its entirety.

The analytic service 104 begins the routine at block 700. At block 702, similar to the routine 600 described herein, the analytic service 104 provides a list of documents. At block 704, the analytic service 104 receives a selection of two documents from the list. This step is similar to the step described at block 604. Here, the selection is limited to two documents. This is done so that the analytic service 104 can provide an indication of document differences between the two documents. Additional documents may make it difficult to indicate and/or understand what differences are being indicated (e.g., it may be ambiguous as to which document differences are being indicated).

At block 706, the analytic service 104 analyzes the selected documents to identify differences between the documents. In some embodiments, the analysis keywords are not used in this step to determine document differences. The analytic service 104 can take a first document as the standard document and determine differences in the second document relative to the first.

At block 708, the analytic service 104 provides a list of document sections as described with reference to block 608 in the routine 600. At block 710, the analytic service 104 provides the contents of the selected document sections and indicates where differences occur in the documents. An example of a document contrast view 800 provided by the analytic service 104 is described herein with reference to FIG. 8. The analytic service 104 can indicate in which sentence, paragraph, or other logical structure differences occur, to guide a user or system to the relevant portions of the selected section. Within the indicated logical structure, the differences can also be indicated using any suitable format, such as underlining and strikethrough text. The analytic service 104 ends the routine at block 712.

FIG. 8 illustrates an example document contrast view 800. The analytic service 104 provides a text box with the content of the first and second documents 802a, 802b side-by-side to facilitate identification of differences between the documents. The analytic service 104 may also indicate the logical structure that contains the differences, such as through providing the logical structure with different visual characteristics (e.g., color, font size, background, etc.) In addition, the analytic service can indicate what type of change is indicated by underlining additions and striking through deletions, for example. This can advantageously allow a user to determine quickly differences between documents such as where amendments have been made to documents.

Example Routine to Generate a Dynamic Relevancy Matrix

Figure 9:
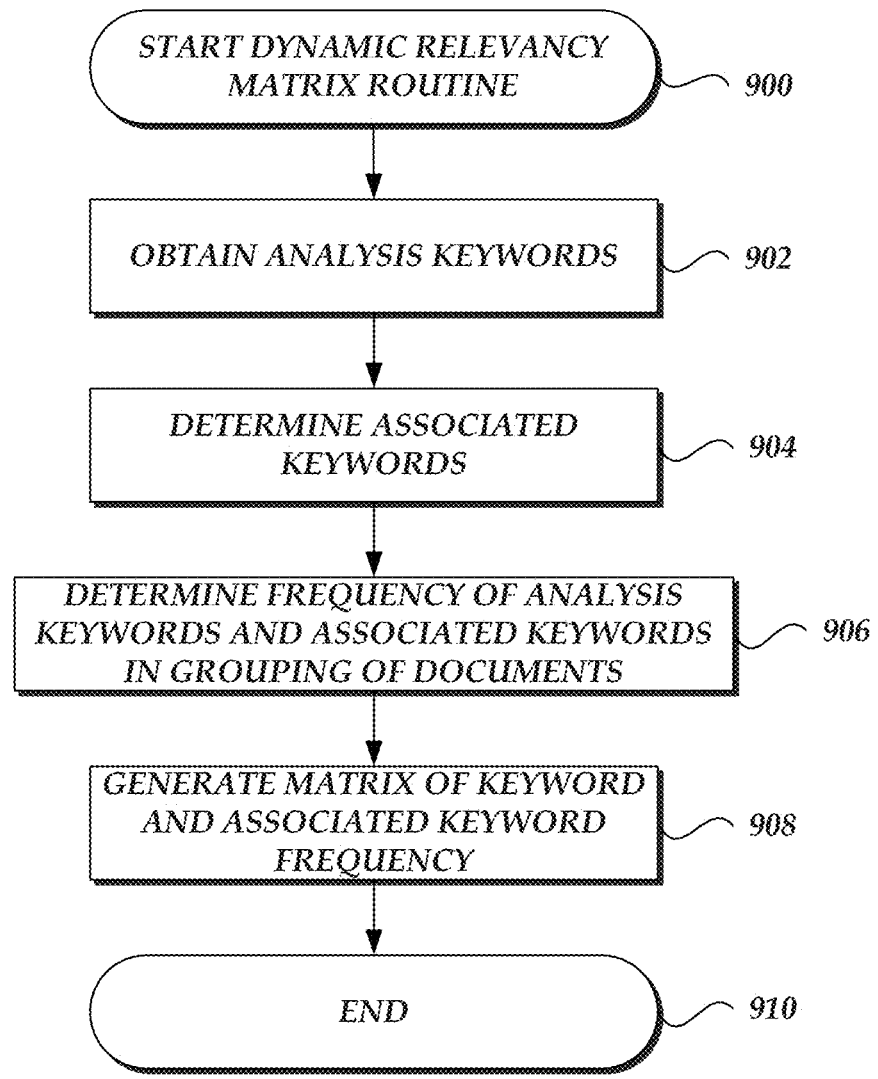
FIG. 9 is a flow diagram illustrating an embodiment of a routine for determining a dynamic relevancy matrix.

FIG. 9 is a flow diagram illustrating an embodiment of a routine 900 for determining a dynamic relevancy matrix. For ease of description, the routine 900 will be described as being implemented by the analytic service 104, but it is to be understood that the routine 900 may be implemented by another service or a combination of services. The dynamic relevancy matrix can provide a number of advantages as it provides a multi-level or multi-dimensional instance of information provided by a document analytics system in a single data structure. This enables a number of capabilities to a user of such a data analytics system. For example, the dynamic relevancy matrix enables a user to visualize the relevance of documents based at least in part on keywords and associated keywords. The dynamic relevancy matrix enables a system to determine which keywords and/or associated keywords are used most frequently and in which sections of the relevant documents. The dynamic relevancy matrix enables a user to assess document relevance and initiate a document comparison or contrast from a single view or instance of the matrix. The dynamic relevancy matrix enables a user to view keyword and associated keyword frequency by section through interaction with the matrix.

The analytic service 104 begins the routine at block 900. At block 902, the analytic service 104 obtains one or more analysis keywords. The analysis keywords can be obtained through any of the methods described herein. For example, a user can provide an analysis string or list of analysis keywords, analysis keywords can be retrieved from a data store, another system can provide analysis keywords, or the analysis keywords can be obtained through a combination of these methods or the like.

At block 904, the analytic service 104 determines associated keywords based at least in part on the obtained analysis keywords. Associated keywords include, for example and without limitation, stem keywords, synonym keywords, hypernym keywords, and/or dictionary keywords. To determine a stem keyword, any of a number of algorithms may be employed to determine a core or root word for the analysis keyword. For example, the analysis keyword can be processed to obtain a stem keyword using the following algorithm. If the analysis keyword is 2 or fewer characters, ignore it. If the analysis keyword is between 3 and 4 characters, the stem keyword is the analysis keyword with the last character removed. If the analysis keyword is 5 or more characters, then the stem keyword is the analysis keyword with the last two characters removed. If the analysis keyword ends with one of a pre-determined character sequence, then the sequence is removed to form the stem keyword. The character sequences may include, for example and without limitation, "ing," "tion," "sion," "ed," "ly," "es," and/or "le."

For the synonym keywords, hypernym keywords, and/or dictionary keywords, external references and/or systems may be utilized to determine the keywords. In some embodiments, one or more associated keyword can be generated for each analysis keyword. In some embodiments, an analysis keyword can have no associated keywords.

In some embodiments, the analytic service 104 can be configured to provide suggested keywords to include as associated keywords. The suggested keywords can comprise a list of keywords that are similar to the keywords. In certain implementations, the analytic service 104 can compute stem words for each keyword and for each computed stem word, analyze the documents in the document analysis pool to identify a list of words that contain the stem word. For example, if a keyword is "imager," a stem word may be determined to be "imag." Searching the documents in the analysis pool for words that contain the stem word may result in a list of words such as "image," "imaging," "images," "imagers," "re-image," and the like. The analytic service can provide these words as suggested keywords. In certain implementations, the analytic service 104 can determine a potential list of associated keywords from the keywords. Using the potential list of keywords, the analytic service 104 can identify which words from the list are contained in at least one document in the document analysis pool. The analytic service 104 can then provide those words as suggested keywords. The analytic service 104 can also provide the suggested keywords in connection with other functionality described herein such as the search advice functionality, the adaptive search functionality, and the like.

At block 906, the analytic service 104 determines, for each document in the grouping of documents, the frequency of each analysis keyword and each associated keyword in the document. As described herein, the analytic service 104 compares the various keywords to the content of the documents and tracks the frequency and location of keywords. In some embodiments, the grouping of documents is provided by a user, an external system, another service, or a combination of these. In some embodiments, the grouping of documents is provided as a result of a search query. In some embodiments, the grouping of documents is provided as a result of an analysis query. In some embodiments, the grouping of documents is provided as a result of an adapted search or analysis, as described herein.

At block 908, the analytic service 104 generates a matrix of keyword and associated keyword frequency, or the dynamic relevancy matrix. The dynamic relevancy matrix includes information about the document, the frequency of each keyword in the document, and the location of each keyword in the document. The dynamic relevancy matrix can be provided in a manner that provides functionality to a user or system accessing or interacting with the matrix. For example, the matrix can include a way to select one or more documents in the matrix. This selection can be used to initiate a comparison routine or a contrast routine, as described herein. As another example, the matrix can include links in the matrix elements that allows a user or system to sort the matrix by keyword frequency, by keyword, by document identifier, and the like. The links can also be configured to provide a user or system access to the document content, to additional information about the frequency of keywords in the document, or the like. The matrix itself may also provide a way to initiate a new analysis, resulting in a re-initialization of the matrix. In some embodiments, the matrix can be used to toggle between providing information about a document as a whole and providing information on a section-by-section basis within the document. Examples of a dynamic relevancy matrix are described with reference to FIGS. 10 and 34. The analytic service 104 ends the routine at block 910.

Figure 10:
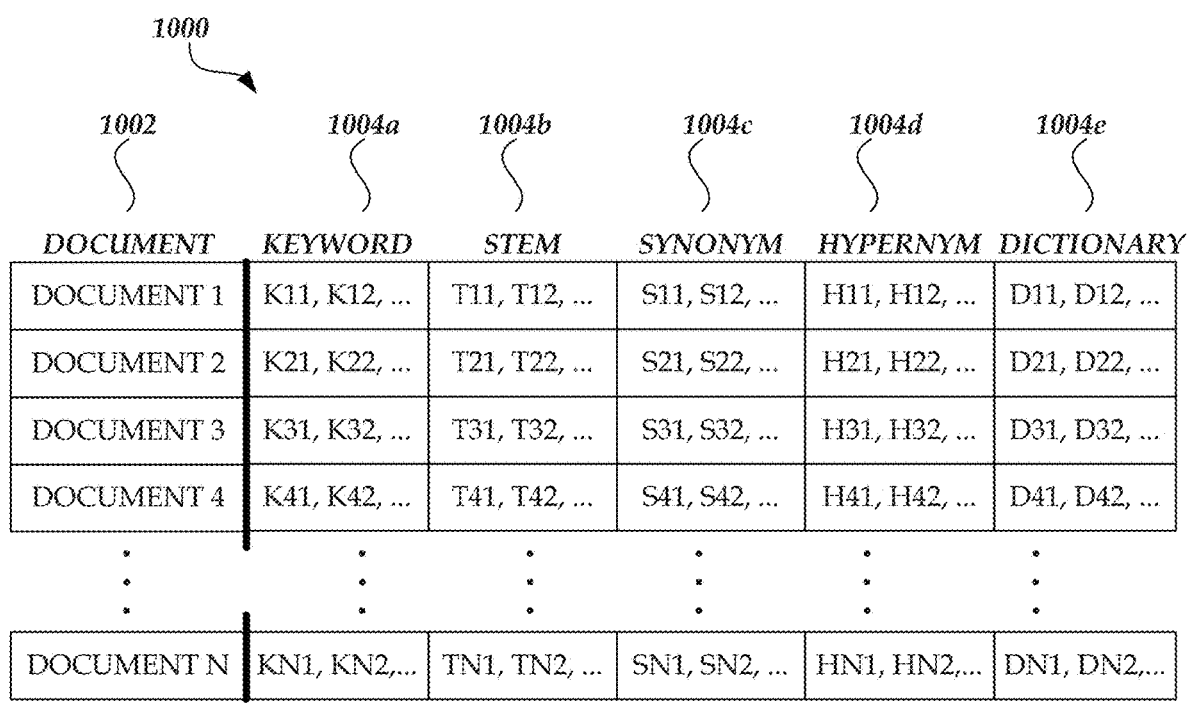
FIG. 10 illustrates an example dynamic relevancy matrix.

FIG. 10 illustrates an example dynamic relevancy matrix 1000. The matrix 1000 includes a first column 1002 that contains document identifiers for the grouping of documents. The second column 1004*a* contains information about the frequency of one or more analysis keywords in a particular document, the frequency corresponding to the frequency of the keyword in the entire document. The third through sixth columns 1004*b*-1004*e* respectively correspond to the frequency of associated keywords (stem keywords, synonym keywords, hypernym keywords, and dictionary keywords) for particular documents. In the keyword portion of the matrix, each matrix element is a numerical array where each number in the array corresponds to a frequency of a keyword in a document. For example, for Document 3 in the third row, the matrix element in that row and in the first column 1004*a* includes an array of numbers, each number representing a frequency of an analysis keyword in the document. For example, if there are four analysis keywords, then the first number in the array represents the frequency of the first analysis keyword in Document 3, the second number in the array represents the frequency of the second analysis keyword in Document 3, and so on. This applies to the associated keywords as well. As described herein, the associated keywords may not have a one-to-one correspondence with the analysis keywords. For example, there may be four analysis keywords and seven synonym keywords. In some embodiments, the keywords are displayed in an order so that the numbers in the array can be quickly referenced with the keyword list to determine which number corresponds to which keyword.

In some embodiments, the dynamic relevancy matrix includes interactive elements that allow a user or system to sort the matrix by keyword frequency. For example, the matrix can include column headers that, when clicked, initiate a sort command on the data in that column. In such embodiments, a first row of the array can include column headers that provide additional functionality such as, for example and without limitation, selecting or de-selecting all documents, sorting the matrix by keyword, refining keywords, suggesting additional keywords, or any combination of these of the like. In some embodiments, interacting with a matrix element can provide additional information about the data in that element. For example, clicking on an associated keyword array can expand that selection to show frequency for those associated keywords by document section. In some embodiments, interacting with the document identifier can cause the dynamic relevancy matrix to display sections of the document with keyword or associated keyword mappings, as described with reference to FIGS. 3 and 4. In some embodiments, the matrix element with the document identifiers includes a checkbox to allow a user or system to select multiple documents. These documents can then be presented in a comparison or contrast view, as described herein with reference to FIGS. 6 and 8.

In some embodiments, the dynamic relevancy matrix can be configured to provide a way to visualize and/or interact with the analysis functions and results described herein. For example, the dynamic relevancy matrix can be configured to display matches for keywords for a grouping of documents. The dynamic relevancy matrix can be configured to allow selection of two or more documents for side-by-side comparison, as described herein. Similarly, the dynamic relevancy matrix can be configured to allow selection of two documents for side-by-side contrasting to show differences between the documents. The dynamic relevancy matrix can be configured to allow a person to refine the analysis keywords (e.g., by clicking on a column header for the keyword column 1004a), after which a new dynamic relevancy matrix is generated with the refined analysis keywords. The dynamic relevancy matrix can be configured to allow a person to see analysis results on a section-by-section basis for a particular document.

In some embodiments, the dynamic relevancy matrix can be provided and/or displayed with documents returned after running analysis routines described herein. For example, the dynamic relevancy matrix can include results from the precision search routine 1100, described herein with reference to FIG. 11. For example, the dynamic relevancy matrix can include results from a refined, adaptive, or adjusted search, as described herein. For example, the dynamic relevancy matrix can include results from a keyword mapping routine 300, described herein with reference to FIG. 3.

Example Routine to Provide Precision Search Results

Figure 11:
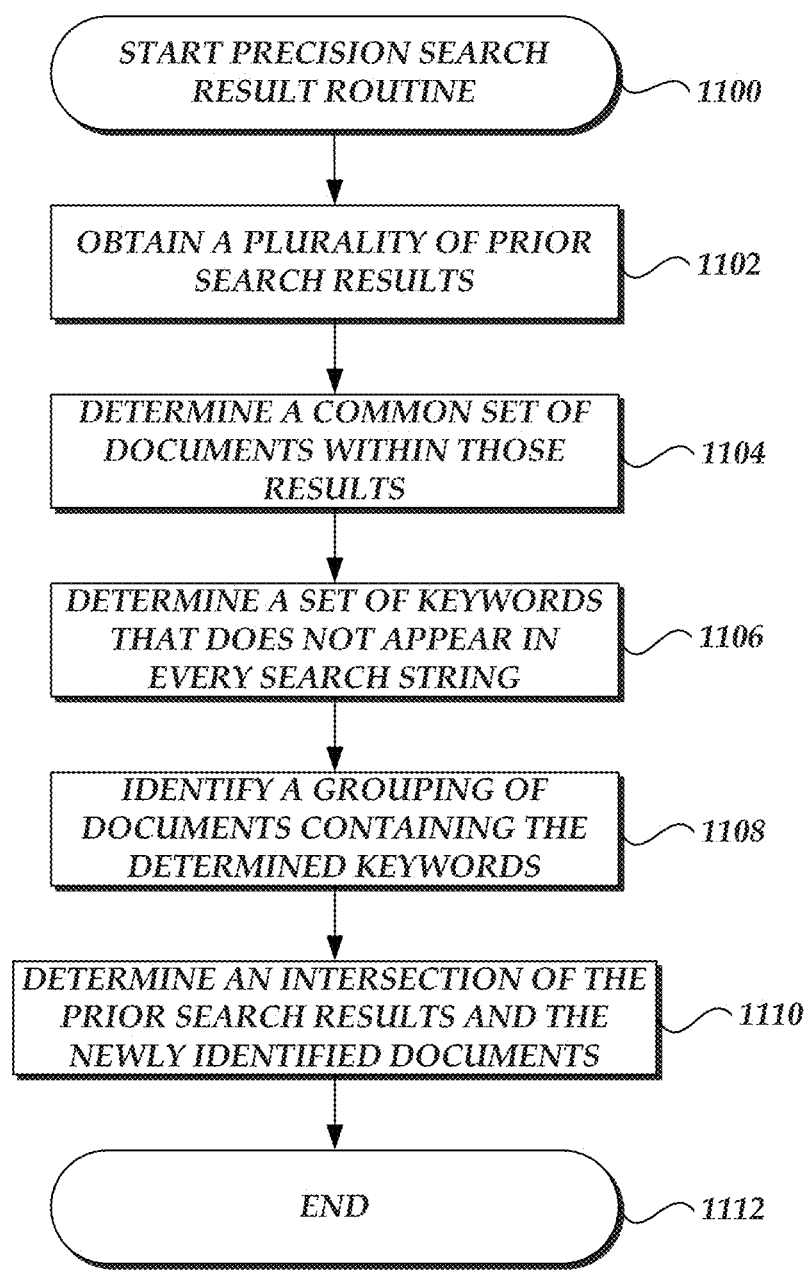
FIG. 11 is a flow diagram illustrating an embodiment of a routine for identifying a set of documents using a precision search algorithm.

FIG. 11 is a flow diagram illustrating an embodiment of a routine 1100 for identifying a set of documents using a precision search algorithm. For ease of description, the routine 1100 will be described as being implemented by the analytic service 104, but it is to be understood that the routine 1100 may be implemented by another service or a combination of services.

The analytic service 104 begins the routine at block 1100. At block 1102, the analytic service 104 obtains a plurality of prior search results. A prior search result includes the search string used to generate the search result as well as a listing of documents that were identified using the search string.

At block 1104, the analytic service 104 determines a common set of documents within the prior search results. The common set of documents can be determined by taking an intersection of the sets of documents returned in each of the prior searches. In particular, the common set, S, can be determined as:

$$S = S1 \cap S2 \cap S3 \ldots \cap SN$$

where Sn (n=1 ... N) are the N previous search results.

At block 1106, the analytic service 104 determines a set of keywords that do not appear in every search string (where the search strings are those strings used to generate the document sets Sn). For example, where s1, s2, . . . , sN are the N search strings used to produce the respective document sets S1 to SN, the targeted search string is constructed as follows:

$$I = s1 \cap s2 \cap s3 \ldots \cap sN$$

$$U = s1 \cup s2 \cup s3 \ldots \cup sN$$

$$D = U - I$$

where the targeted search string D contains keywords that are in U but not in I.

At block 1108, the analytic service 104 uses the targeted search string, D, to perform a search to identify a grouping of documents containing one or more keywords in the targeted search string, D. At block 1110, the analytic service 104 finds an intersection of the grouping of documents obtained using the targeted search string, D, and the common set, S. This grouping of documents represents the documents returned using the precision search algorithm. The analytic service 104 ends the routine at block 1112.

Example Data Analytics System

Figure 12:
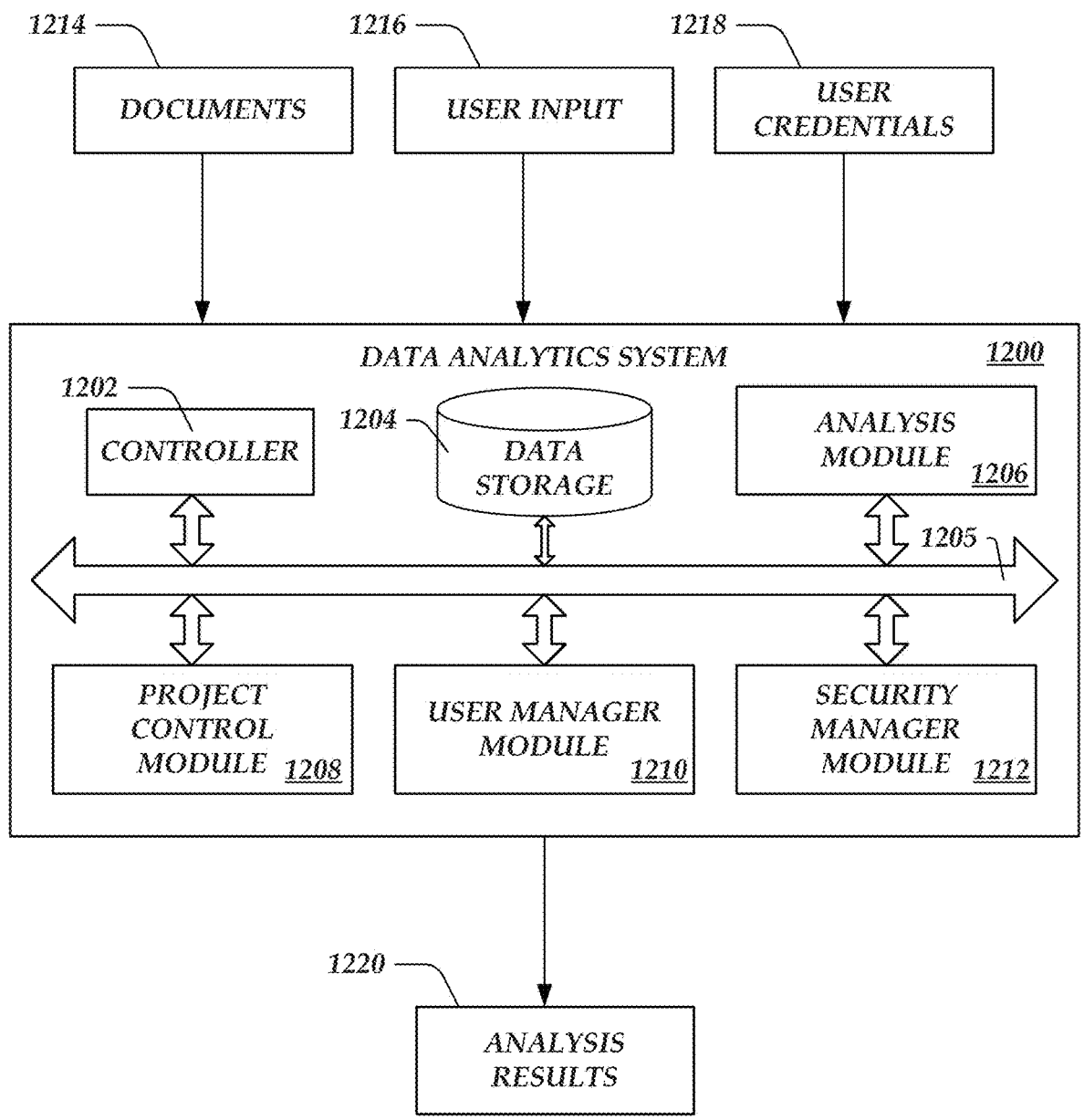
FIG. 12 illustrates a block diagram for an embodiment of a data analytics system configured to identify documents from keywords and provide information related to document relevancy based on analysis keywords.

FIG. 12 illustrates a block diagram for an embodiment of a data analytics system 1200 configured to identify documents from keywords and provide information related to document relevancy based on analysis keywords. The data analytics system 1200 can include hardware, software, and/or firmware components used to parse keywords, retrieve documents, analyze document contents, and generate information corresponding to keyword frequency in the documents, similarities of documents, and/or differences between documents. The data analytics system 1200 can be configured to receive information from data stores, user inputs, and other systems to assist users and other systems to assess document relevance to increase the efficiency and efficacy of document analysis. The data analytics system 1200 can include an analysis module 1206, a project control module 1208, a user manager module 1210, a security manager module 1212, a controller 1202, and data storage 1204. Components of the data analytics system 1200 can communicate with one another, with external systems, and with internal and external data stores over communication bus 1205. The data analytics system 1200 can employ any method described herein for analyzing documents, such as the routines 300, 500, 700, 900, and 1100 described herein with reference to FIGS. 3, 5, 7, 9, and 11, respectively. Examples of systems and methods that can be used by the data analytics system 1200 to manage document data and information, projects, users, and the like are provided in U.S. Pat. No. 8,543,620, entitled "System and Method for Independent Verification and Validation" and filed May 19, 2011, which is incorporated by reference herein in its entirety.

The data analytics system 1200 includes the analysis module 1206. The analysis module 1206 can be configured to perform any of the routines described herein as being performed by the analytics service 104. The analysis module 1206 can be configured to receive user input 1216 to access, modify, and/or add analysis parameters. The analysis module 1206 can be configured to store analysis parameters (e.g., keywords), analysis results, and/or user preferences in the data storage 1204. The analysis module 1206 can be used by the data analytics system 1200 to identify relevant documents and assess the relevance based at least in part on keyword frequency, where the frequency can be determined using document sections. The analysis results 1220 provided at least in part by the analysis module 1206 can include document comparisons, document contrasts, dynamic relevancy matrices, and the like.

The data analytics system 1200 includes the project control module 1208. The project control module 1208 can be configured to manage different search and analysis sessions. For example, each search string can initialize a new project so that a user can return to prior analyses without performing additional searches and/or document retrievals. This can save on computing resources and make document analysis faster and more efficient. For example, the results of an initial search can be stored in a project folder. When returning to an analysis, a user can open the corresponding project folder to access the documents retrieved from the initial search. In some embodiments, the project control module 1208 can allow a user to select a number of documents in a first project folder and move the documents to a new or different project folder. This can allow the user to manually refine the document analysis pool by moving documents considered to be more relevant to a new or existing project folder. The project control module 1208 can load documents 1214 from the search data store 110 and/or analysis information from the analysis data store 112. The project control module 1208 can be configured to respond to user input to select a project for loading into the data analytics system 1200.

The data analytics system 1200 includes the user manager module 1210. The user manager module 1210 can be configured to manage user credentials 1218 to limit access to projects and/or limit access to the data analytics system 1200. The user manager module 1210 can receive user credentials 1218 and determine whether the user is authorized to access the data analytics system 1200. In addition, the user manager module 1210 can determine which projects are accessible to the user based at least in part on the user credentials 1218.

The data analytics system 1200 includes the security manager module 1212. The security manager module 1212 can be configured to encrypt data, secure the computing environment from software exploits or malicious attempts to comprise secure information, and the like. The security manager module 1212 can be configured to encrypt documents, search strings, analysis results 1220, and the like to ensure that authorized users can access information but limit or prevent unauthorized access to the same information.

The data analytics system 1200 includes a controller 1202. The controller 1202 can include one or more hardware processors and can be used by any of the other components, such as the analysis module 1206, the project control module 1208, the user manager module 1210, and/or the security manager module 1212 to process information. As used herein, the term "processor" refers broadly to any suitable device, logical block, module, circuit, or combination of elements for executing instructions. The controller 1202 can be any conventional general purpose single- or multi-chip microprocessor. In addition, the controller 1202 can be any special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA), programmable logic controller (PLC), single loop controller (SLC), or other programmable logic device, discrete gate or transistor logic, discrete hardware components, circuitry, or any combination thereof designed to perform the functions described herein. A general purpose processor, such as controller 1202, can be a conventional microprocessor, but the controller 1202 can also be any conventional processor, controller, microcontroller, or state machine. Controller 1202 can also be implemented as a combination of computing devices, e.g., a combination of a DSP and a microprocessor, a plurality of microprocessors, one or more microprocessors in conjunction with a DSP core, one or more PLCs, a PLC with a conventional microprocessor, or any other such configuration.

The data analytics system 1200 includes data storage 1204. Data storage 1204 can be coupled to the other components of the data analytics system 1200, such as the controller 1202, the analysis module 1206, the project control module 1208, the user manager module 1210 and/or the security manager module 1212. Data storage 1204 can refer to non-transitory electronic circuitry that allows information, typically computer data, to be stored and retrieved. Data storage 1204 can refer to external devices or systems, for example, disk drives, optical drives, or solid state drives. Data storage 1204 can also refer to fast semiconductor storage (chips), for example, Random Access Memory (RAM) or various forms of Read Only Memory (ROM), which are directly connected to the one or more processors of the data analytics system 1200. Other types of memory include bubble memory and core memory.

Example Embodiments

Acquiring accurate information in time is a compelling task that impacts competitive advantages in society. Described herein are systems and methods for document search, download, store, conversion, and analysis.

Systems and methods for information management are described herein. In particular, systems and methods are provided that simplify the complex process of searching, storing, and analyzing information contained in documents. In some embodiments, a system can be provided that includes a number of components that facilitate and improve a user's ability to search, store, and analyze documents. The system utilizes network technology, web client and server technology, and search engine technology.

The system can be configured to use an adaptive search method to identify relevant documents, the documents being stored locally or remotely relative to a user system or an analysis system, for example. The system can apply a dynamic relevancy matrix to identify relevant documents. The system can apply an adaptive filtering technique to compare, contrast, and synthesize relevant paragraphs, sentences, phrases, and/or words in multiple documents. The system can include a user management module to interface with a user and to authenticate and to authorize the user based on user credentials. The system can include a security module to maintain and/or establish the privacy, integrity, and confidentiality of the user documents. The security module can be configured to increase or ensure user privacy in a public search environment. The system can include a data store or database management module to interface with different data stores or databases.

In some embodiments, a user can use a computing device to connect to the system that comprises a server computer accessible over a network. Once connected, the user can acquire and derive analytical information to make an informed decision with respect to a particular task or discipline of work. In such instances, the systems and methods described herein can increase the productivity of a user by facilitating document comparison, document contrasting, and identification of keywords within the document. In some embodiments, document analysis can be improved by providing such information for particular sections of documents.

Figure 13:
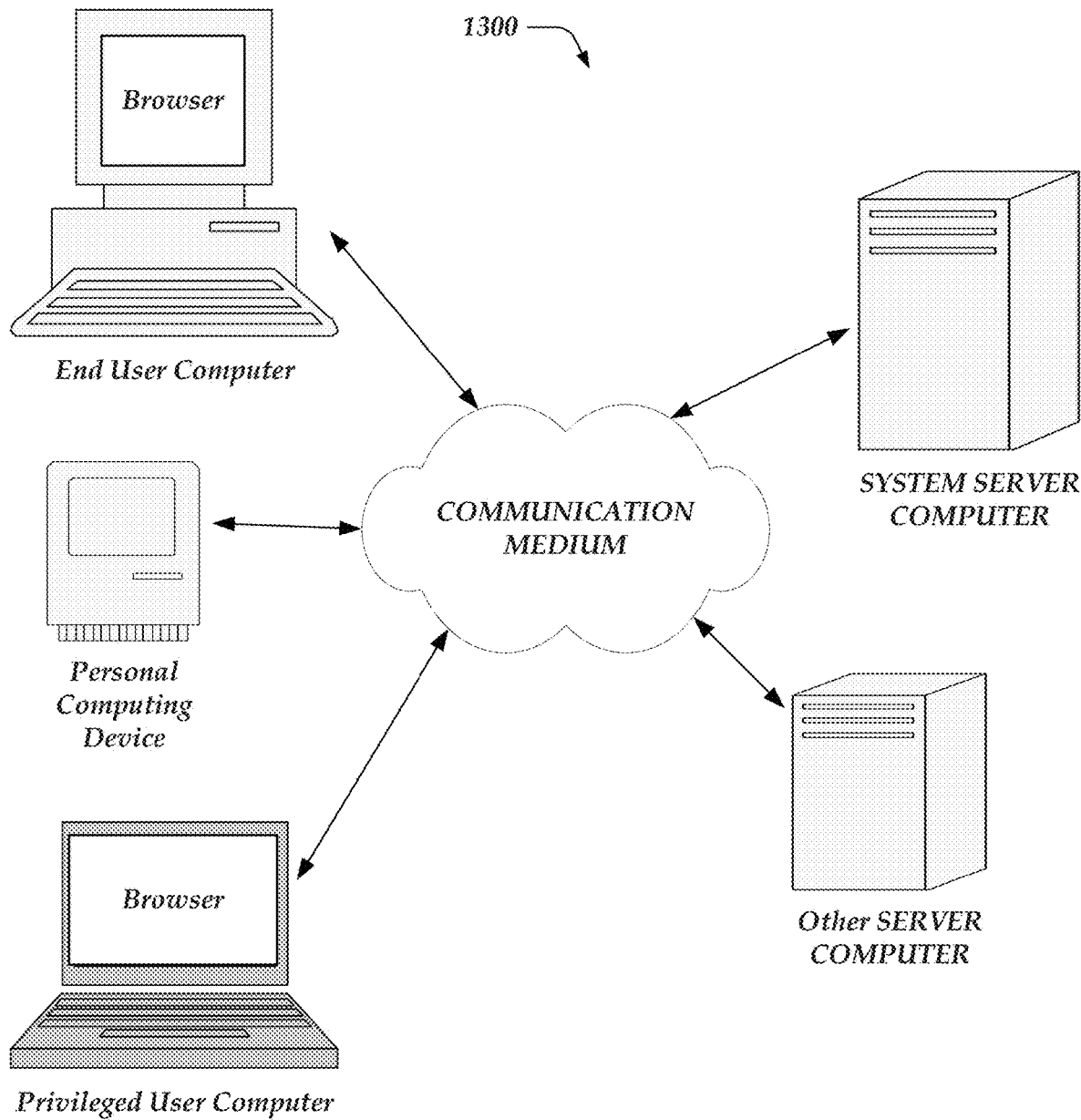
FIG. 13 illustrates a block diagram of an example document analysis system.

To facilitate document analytics, the systems and methods described herein use computer, network communication, and web-based technologies to link multiple documents based at least in part on a search and/or analysis string. The systems and methods can be configured to identify multiple documents by synchronizing relevant portions (e.g., sections, paragraphs, sentences) from multiple documents for analysis. FIG. 13 illustrates a block diagram of an example system 1300.

Figure 14:
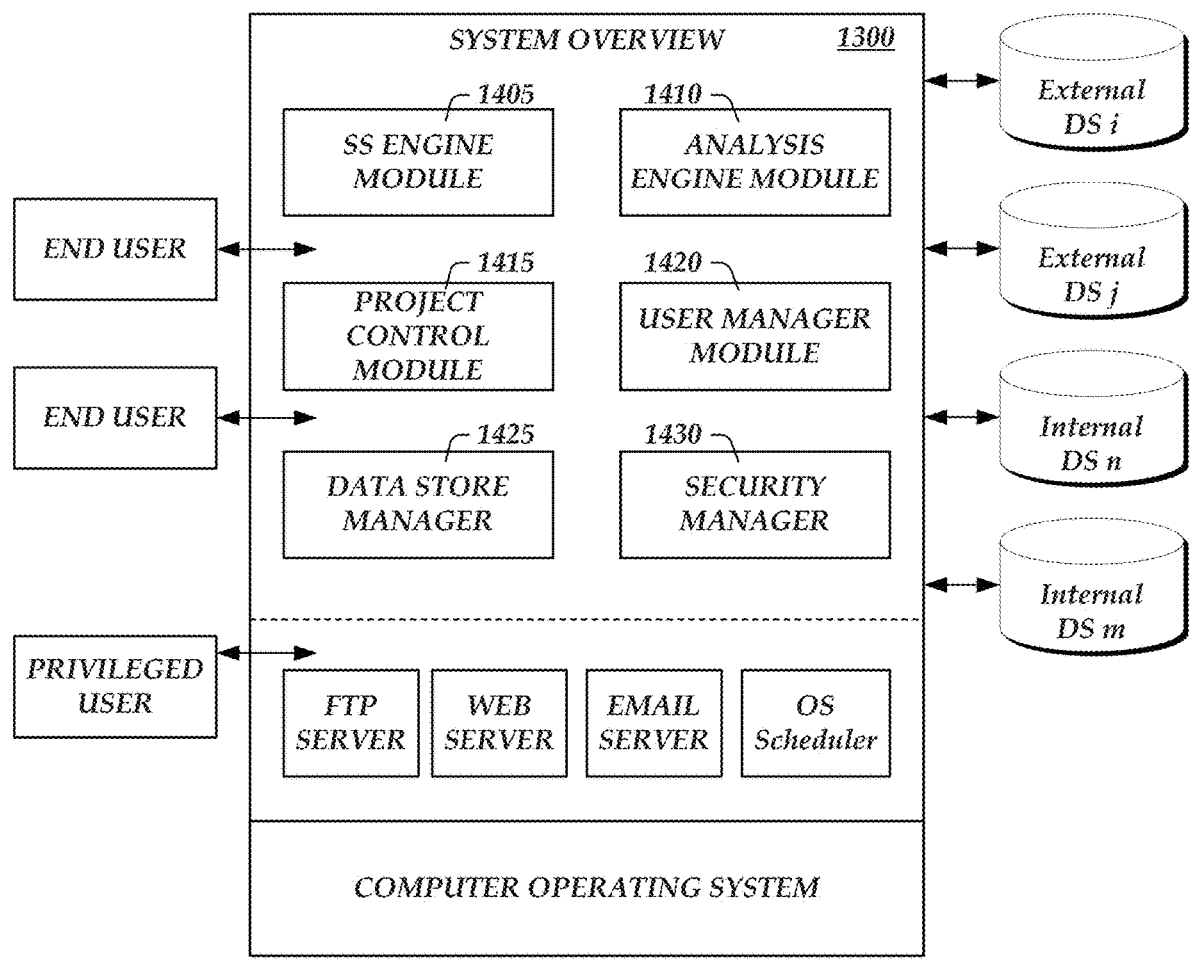
FIG. 14 illustrates a functional diagram of the document analysis system of FIG. 13.

The system 1300 can include a number modules configured to implement various functional aspects of the system 1300. FIG. 14 illustrates a block diagram of example modules.

Figure 15:
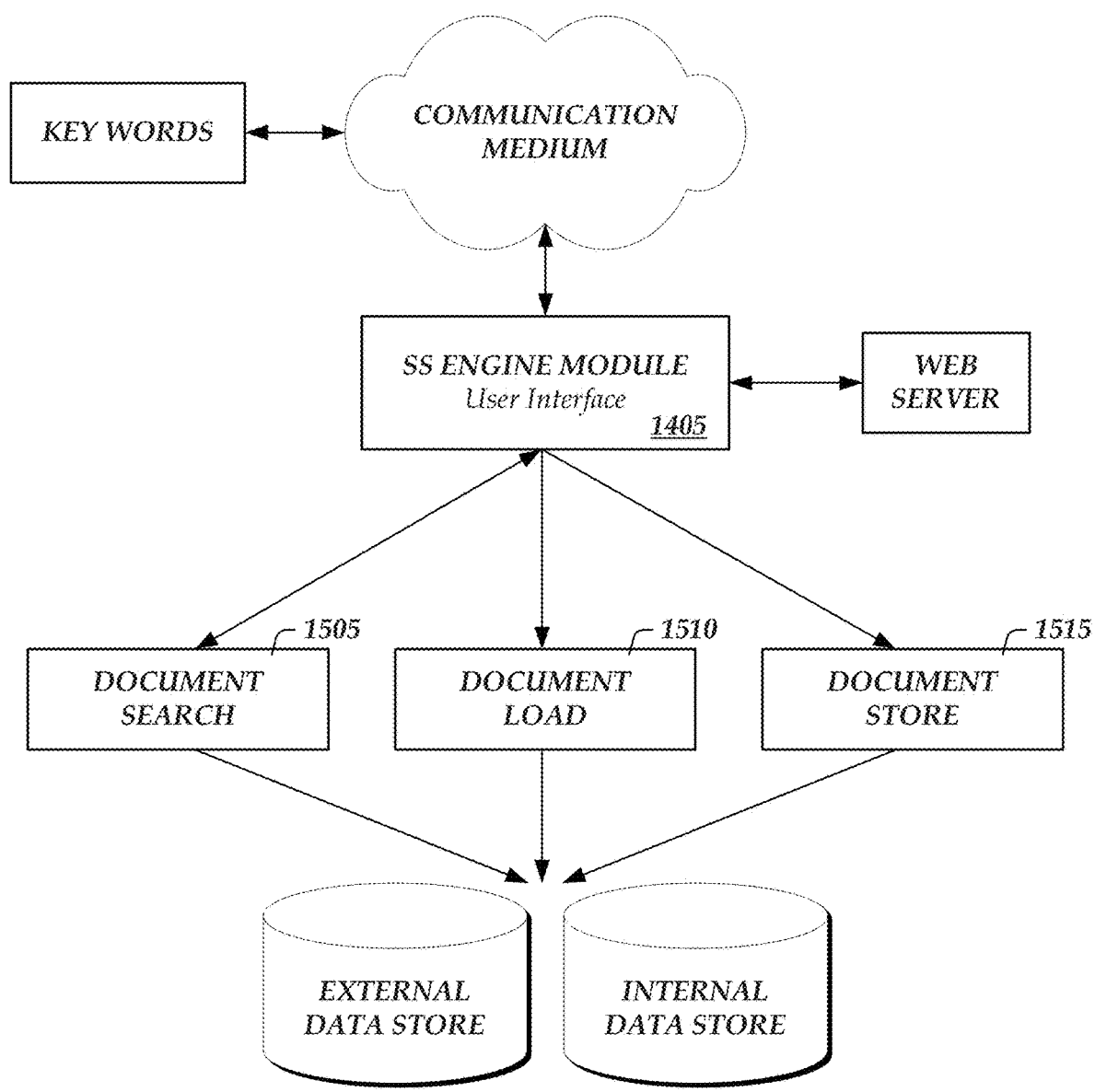
FIG. 15 illustrates modules of the document analysis system including a SS Engine module that comprises several sub-modules including Document Search, Document Load, and Document Store modules.

The system 1300 includes an SS Engine module 1405 that is configured to search documents in an external data store or database, wherein external can mean that it is not within a local network (e.g., a local area network or LAN) of the system 1300, that it is accessed over a network connection, that it is maintained by an entity other than the one providing the system 1300, or any combination of these or the like. The SS Engine module 1405 can include sub-modules that include a Document Search module 1505, a Document Load module 1510, and a Document Store module 1515, as illustrated in FIG. 15.

Figure 16:
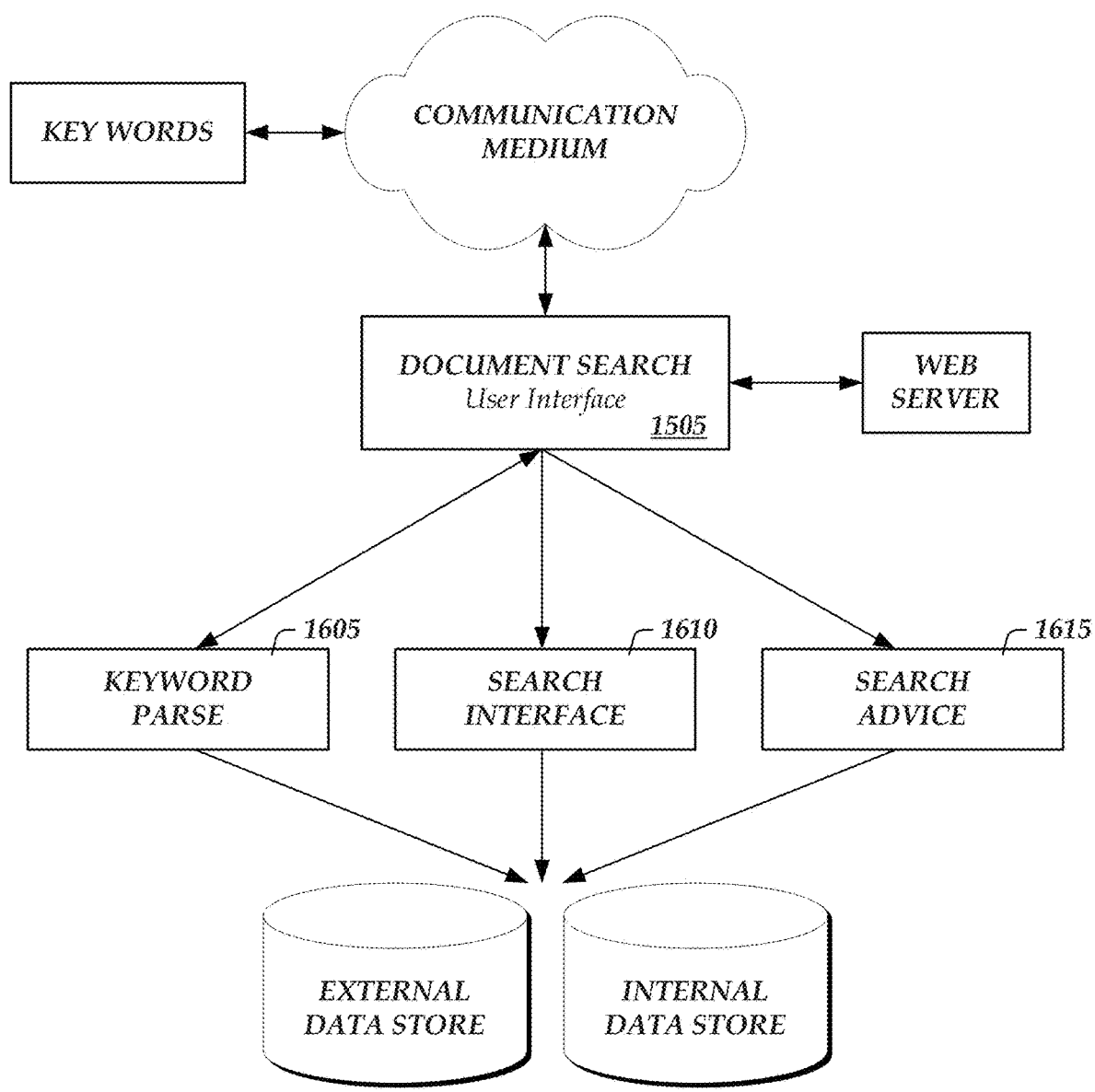
FIG. 16 illustrates the Document Search module of FIG. 15 that searches documents in data stores based at least in part on keywords (or associated keywords), the module including Keyword Parse, Search Interface and Search Advice functions.

The SS Engine module 1405 includes the Document Search module 1505 that can be configured to search documents in an external data store based at least in part on a combination of keywords (or combination of associated keywords). The Document Search module 1505 can include a Keyword Parse function 1605, a Search Interface function 1610, and a Search Advice function 1615, as illustrated in FIG. 16.

The Document Search module 1505 includes the Keyword Parse function 1605 that can be configured to parse and process a user input keyword string for a search session and conducts a search for the documents. The Keyword Parse function 1605 can be configured to download the relevant documents from an external data store, an example of which is illustrated in FIG. 17.

The Document Search module 1505 includes the Search Interface function 1610 that can be configured to interface with the user by providing interface messages related to the result of the search session, an example of which is illustrated in FIG. 17B.

The Document Search module 1505 includes the Search Advice function 1615 that can be configured to interface with a user via advice messages, an example of which is illustrated in FIG. 17C.

Figure 18:
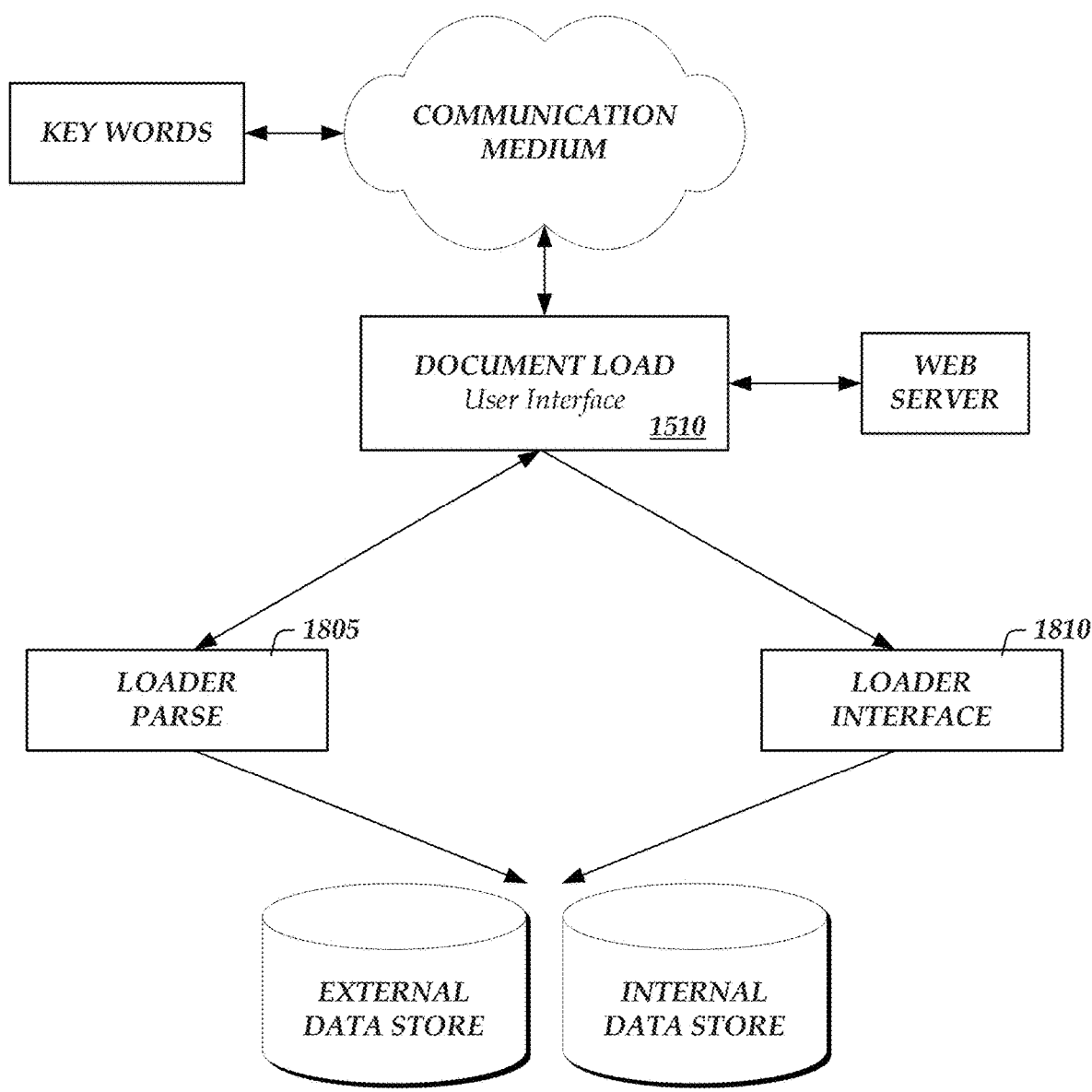
FIG. 18 illustrates the Document Load module of FIG. 15 that comprises a Loader Parse function and a Loader Interface function.

The SS Engine module 1405 includes the Document Load module 1510 that can be configured to query and to search an external data store based at least in part on document identifiers (e.g., a document name, title, filename, etc.). The Document Load module 1510 can include a Loader Parse function 1805 and a Loader Interface function 1810, as illustrated in FIG. 18.

Figures 19A, 19B:
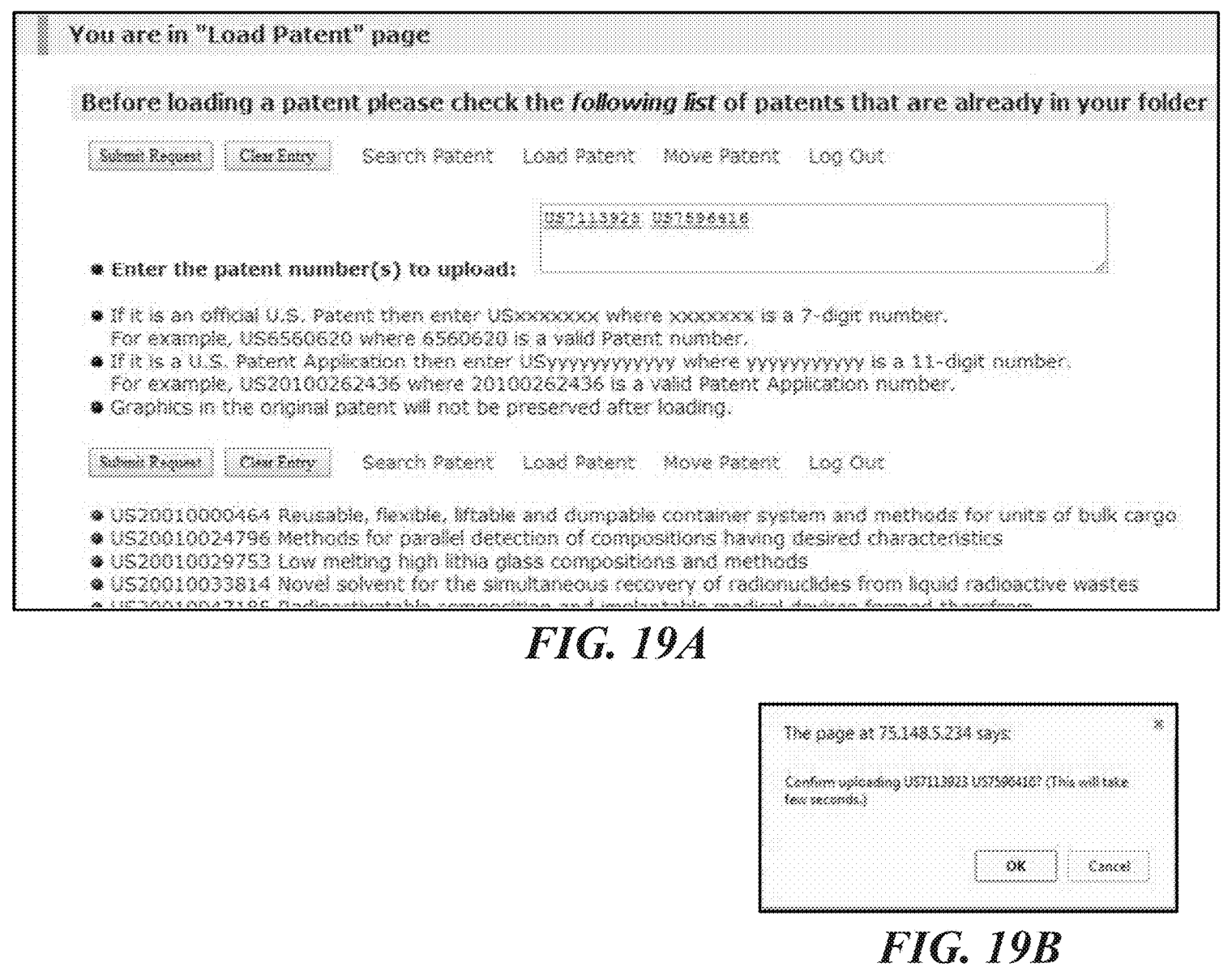

The Document Load module 1510 includes the Loader Parse function 1805 that can be configured to parse and to process user input of the document identifiers. The Loader Parse function 1805 can be configured to query an external data store for the documents based at least in part on the document identifiers. If the query is successful, the Loader Parse function 1805 can retrieve the documents from the external data store and deposit the retrieved documents in an internal data store, an example of which is illustrated in FIG. 19A.

The Document Load module 1510 includes the Loader Interface function 1810 that can be configured to interface with the user on the state of a current loading session and to provide interface messages. The Loader Interface function 1810 can be configured to display a current document list (e.g., a list of documents after retrieving or loading documents) in a current folder, an example of which is illustrated in FIG. 19B.

Figure 20:
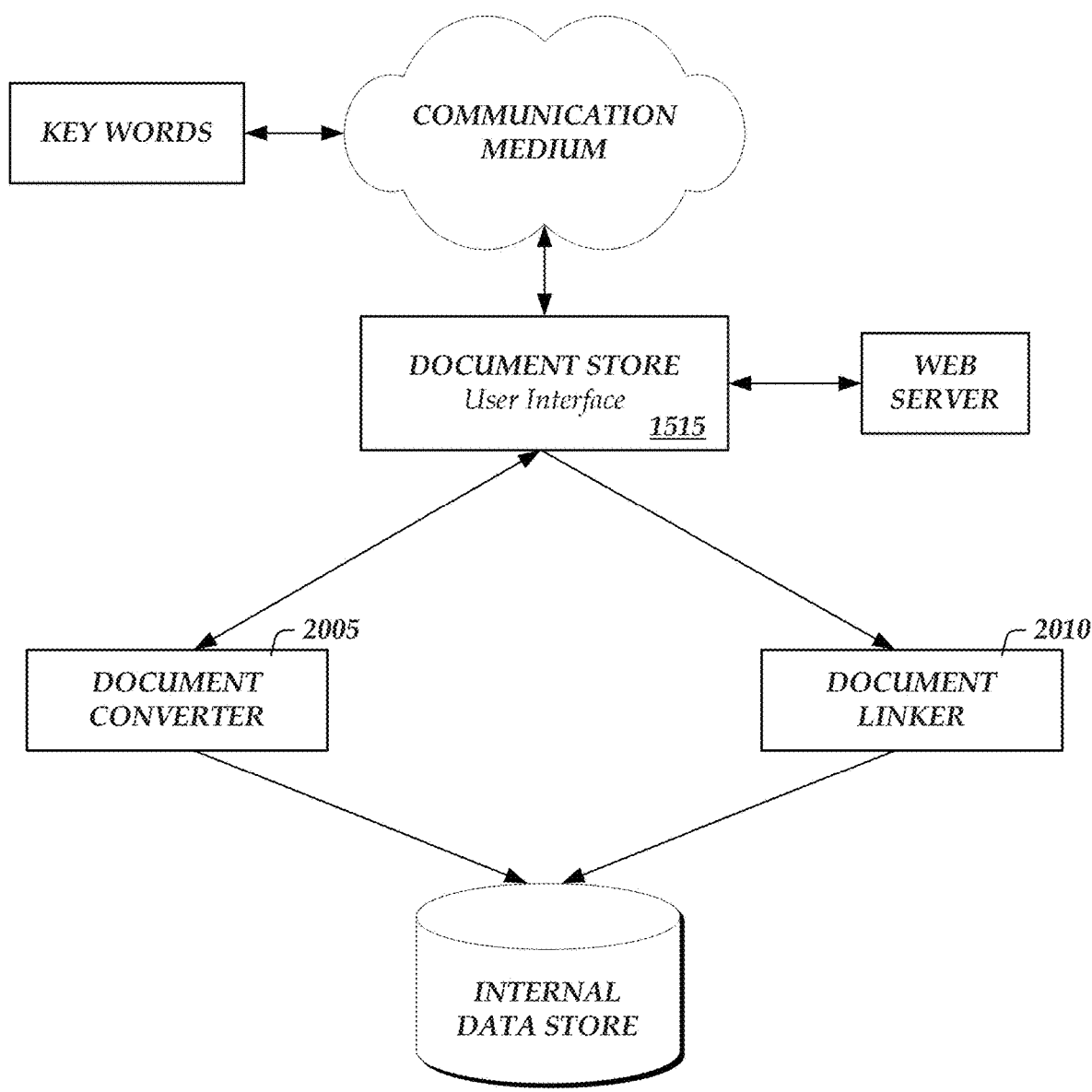
FIG. 20 illustrates the Document Store module of FIG. 15 that includes a Document Converter function configured to convert retrieved documents to an internal data structure and a Document Linker function configured to process and to organize the retrieved and converted documents and to store them in an internal data store.

The SS Engine module 1405 includes the Document Store module 1515 that can be configured to convert retrieved documents to an internal document format. The Document Store module 1515 can include a Document Converter function 2005 and a Document Linker function 2010, as illustrated in FIG. 20.

The Document Store module 1515 includes the Document Converter function 2005 that can be configured to convert the retrieved documents to an internal format to be further used by an Analysis Engine module 1410.

The Document Store module 1515 includes the Document Linker function 2010 that can be configured to organize the converted documents to the internal format or internal data structure and to store the converted documents in an internal data store.

Figure 21:
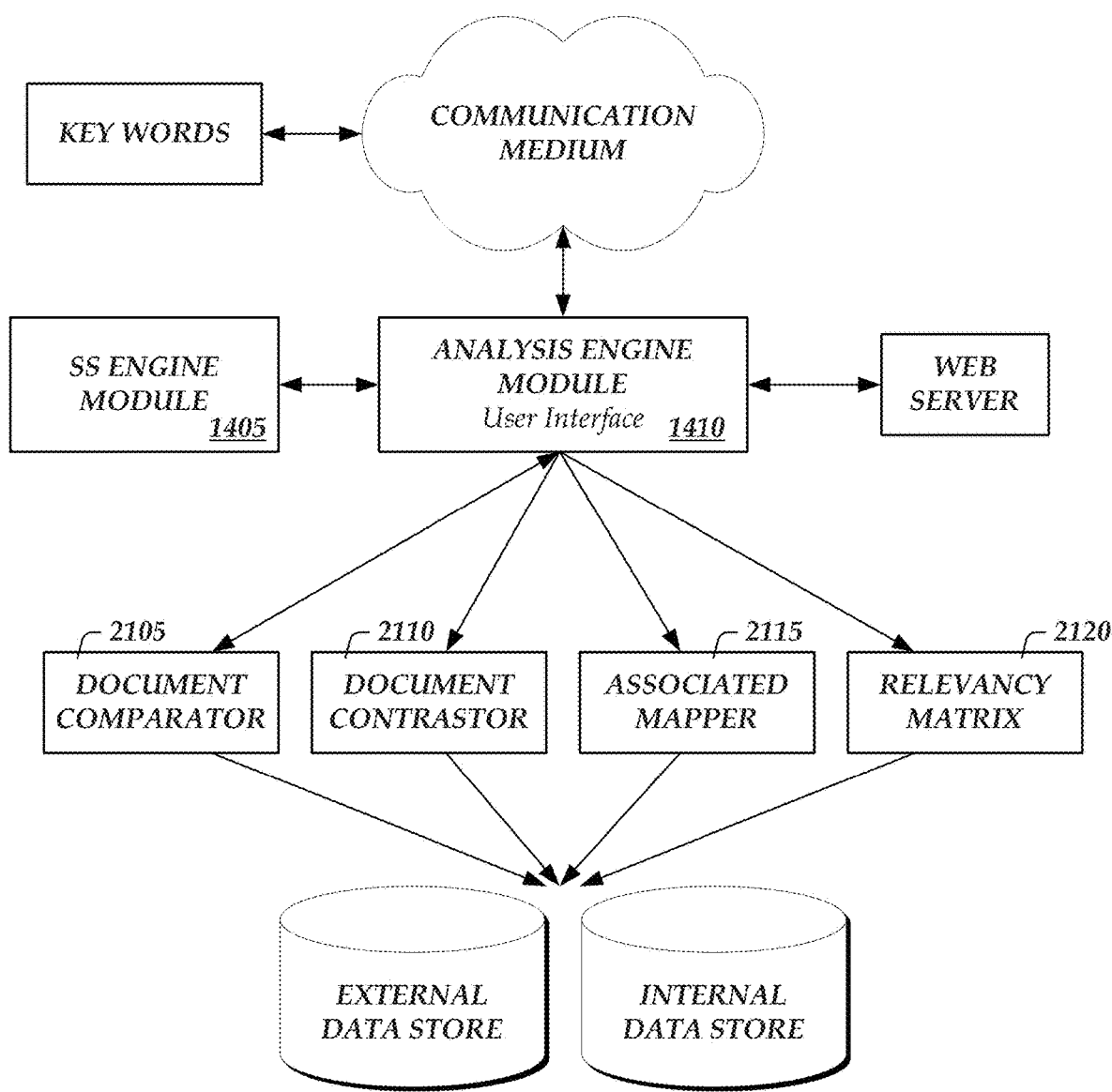
FIG. 21 illustrates modules of the document analysis system including an Analysis Engine module that comprises several sub-modules including Document Comparator, Document Contrastor, Associated Mapper, and Dynamic Relevancy Matrix modules.

The system 1300 includes an Analysis Engine module 1410 that can be configured to analyze the retrieved documents from operation of the SS Engine module 1405. The Analysis Engine module 1410 can include a Document Comparator module 2105, a Document Contrastor module 2110, an Associated Mapper module 2115, and a Dynamic Relevancy Matrix module 2120, as illustrated in FIG. 21.

Figure 22:
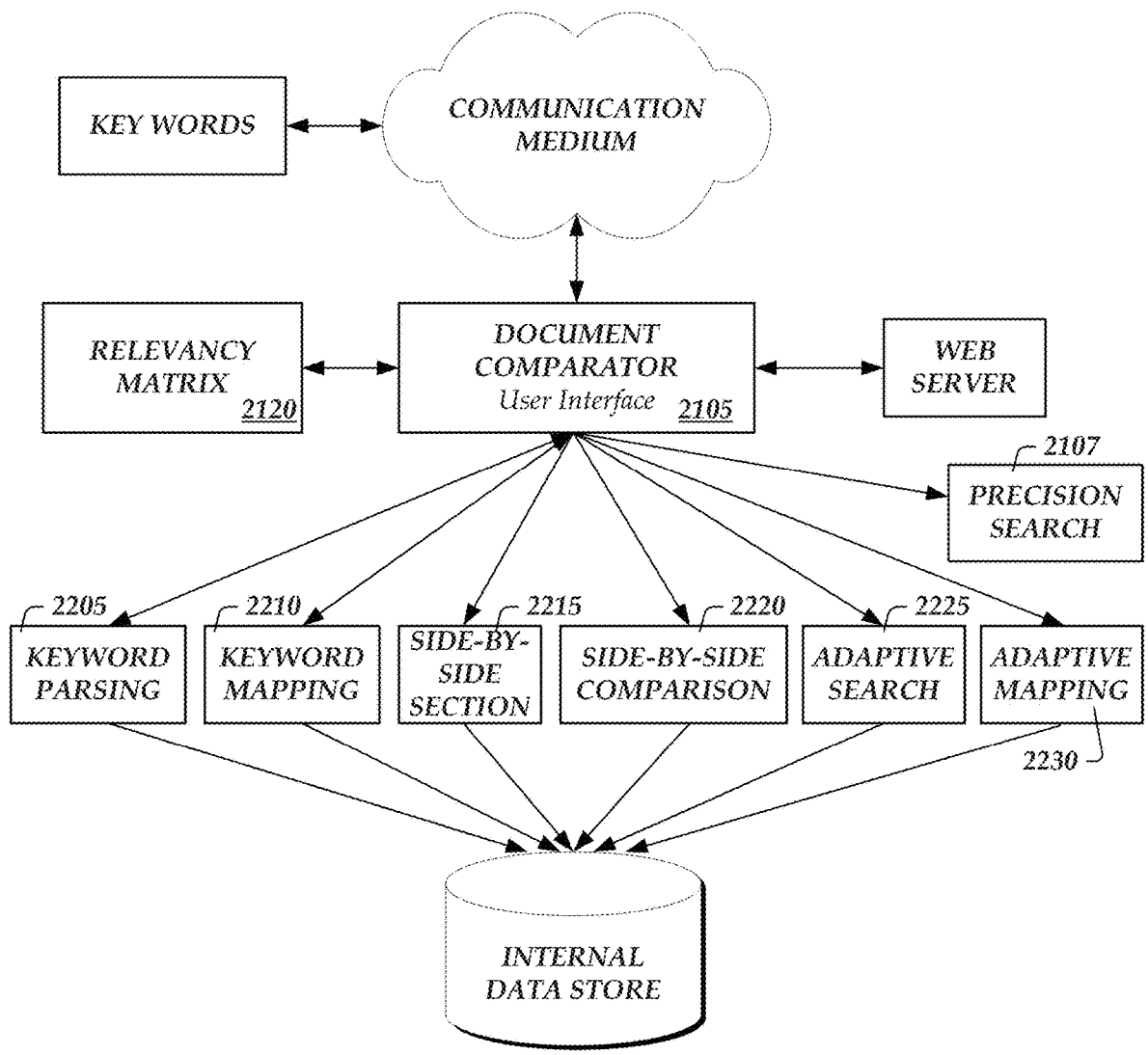
FIG. 22 illustrates the Document Comparator module of FIG. 21 that includes Keyword Parsing, Keyword Mapping, Side-by-side Section, Side-by-Side Comparison, Adaptive Search, and Adaptive Mapping functions.

The Analysis Engine module 1410 includes the Document Comparator module 2105 that can be configured to compare multiple documents side-by-side. The Document Comparator module 2105 includes a Keyword Parsing function 2205, a Keyword Mapping function 2210, a Side-by-side Section function 2215, a Side-by-Side Comparison function 2220, an Adaptive Search function 2225, and an Adaptive Mapping function 2230, as illustrated in FIG. 22.

Figure 23A:
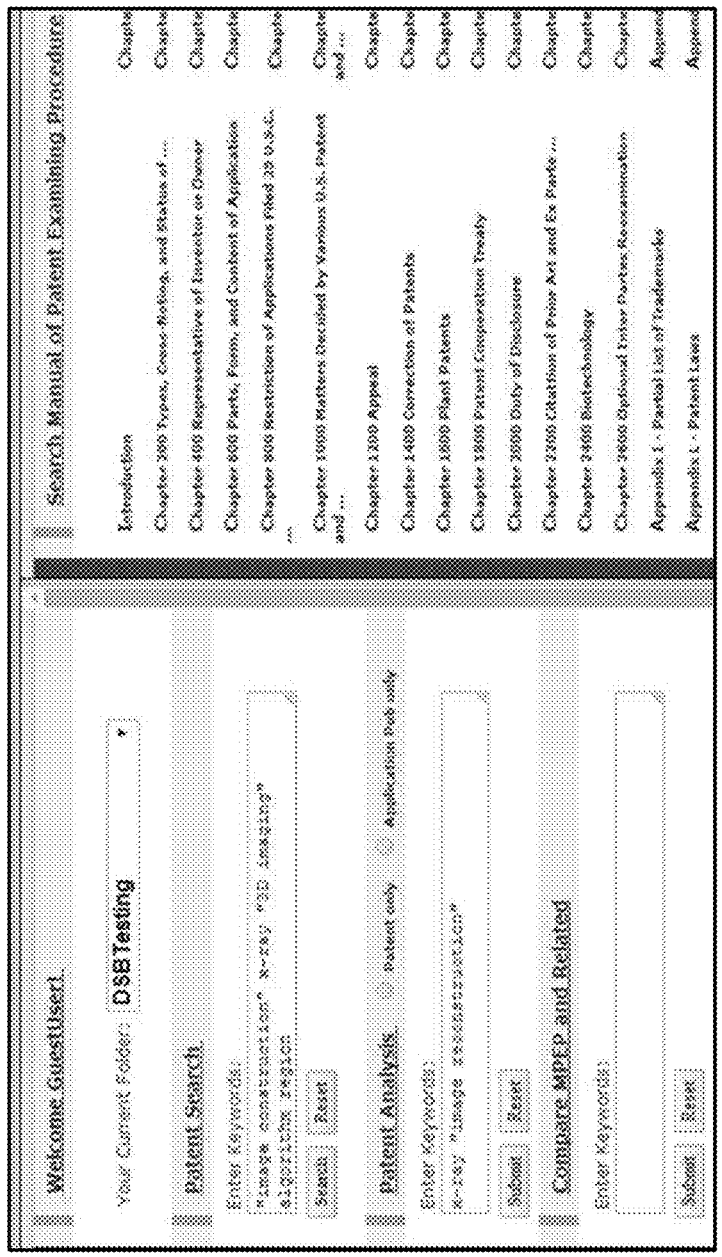
FIG. 23A illustrates the Keyword Parsing function of FIG. 22 configured to process and to accept a user-input keyword string.

The Document Comparator module 2105 includes the Keyword Parsing function 2205 that can be configured to parse and to process a user input keyword string, an example of which is illustrated in FIG. 23A. In some embodiments, the Keyword Parsing function 2205 can be configured to parse the keyword string based at least in part on an expected format. This may advantageously result in an increase in the accuracy of search results where the user input meets the expected format.

Figure 23B:
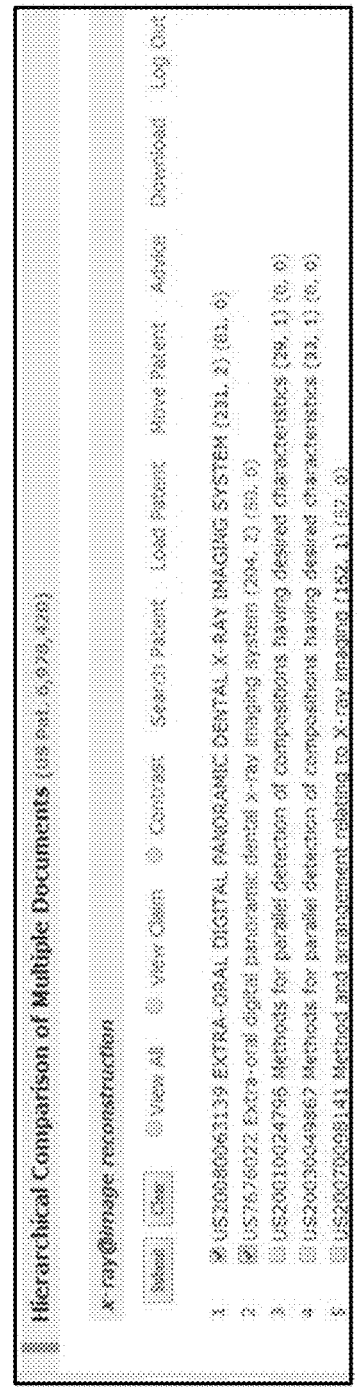
FIG. 23B illustrates the Keyword Mapping function of FIG. 22 configured to accept and to process a user input keyword string for keyword mapping to multiple documents, the function allowing a user to make a selection for further analysis of the documents.

The Document Comparator module 2105 includes the Keyword Mapping function 2210 that can be configured to search the internal data store and to provide a list of document identifiers (e.g., document names, titles, etc.) that sufficiently match the keyword string. In some embodiments, each document identifier is preceded by a selectable checkbox. The Keyword Mapping function 2210 can be configured to provide a number of matches for each keyword in the keyword string and to attach the number of matches to the end of the document identifier with a distinct color. The checkbox allows the user to make a selection of the document for further analysis of the documents, an example of which is illustrated in FIG. 23B. The Keyword Mapping function 2210 can be configured to interface with the Associated Mapper module 2115 to trigger multiple threads of executions by calling functions within the Associated Mapper module 2115 that compute associated keywords corresponding to each of the keywords and that further provide a number of matches for each associated keyword.

Figures 23C, 23D:
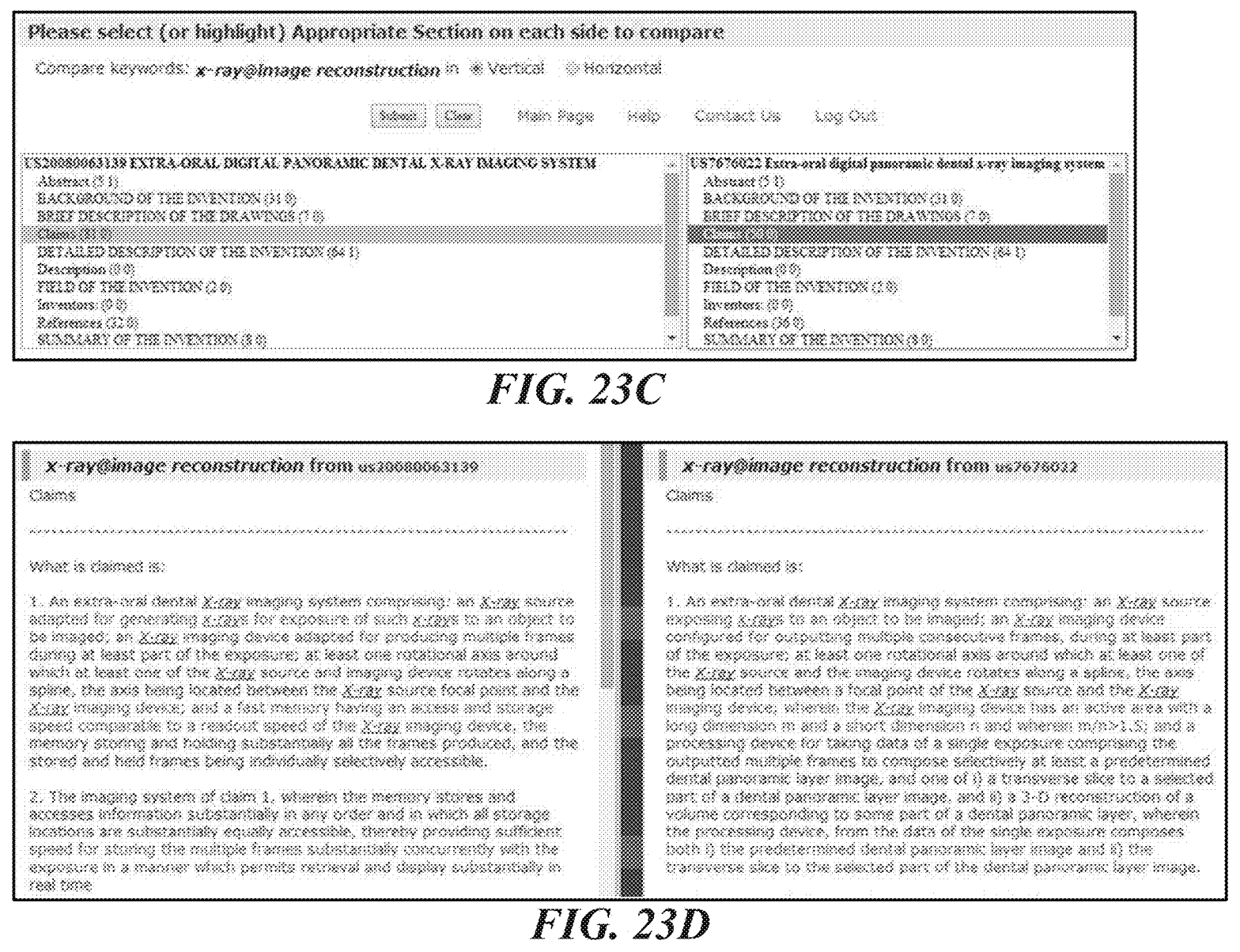

The Document Comparator module 2105 includes the Side-by-Side Section function 2215 that can be configured to display a list of sections from each of a number of selected documents. The list of sections for each document can provide a number of matches in each section with respect to each keyword, each keyword using a distinct color, for example. The user can select a section form this list for each selected document for further analysis, an example of which is illustrated in FIG. 23C.

The Document Comparator module 2105 includes the Side-by-Side Comparison function 2220 that can be configured to display side-by-side the relevant portions (e.g., paragraphs, sentences, etc.) from the selected sections, where the relevant portions may be determined with respect to the keywords and/or associated keywords. The Side-by-Side Comparison function 2220 can be configured to indicate each keyword and/or associated keyword using distinct fonts, typeface, colors, etc. to enable a user to identify the keywords and to analyze more easily the targeted documents. This may advantageously allow the user to detect potential inconsistence between multiple documents, an example of which is illustrated in FIG. 23D.

Figure 23E:
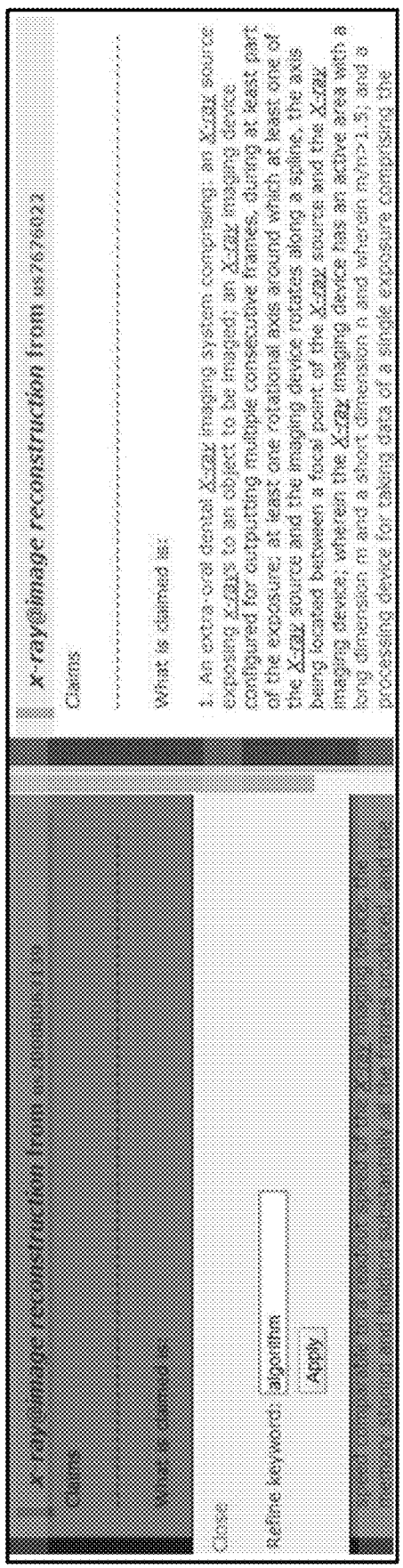
FIG. 23E illustrates the Adaptive Search function of FIG. 22 configured to provide an adaptive search capability, wherein if a user clicks a highlighted keyword the system is configured to provide a way for the user to refine the current keyword string.

The Document Comparator module 2105 includes the Adaptive Search function 2225 that can be configured to provide additional search capabilities. For example, a user can select (e.g., through a click or tap on the keyword) a keyword. The Adaptive Search function 2225 can then a way (e.g., a pop up text box) for the user to input a new keyword to the keyword string. The Adaptive Search function 2225 can be configured to process and to accept the new keyword to refine the current keyword string for further search and analysis of the targeted documents, an example of which is illustrated in FIG. 23E.

Figure 23F:
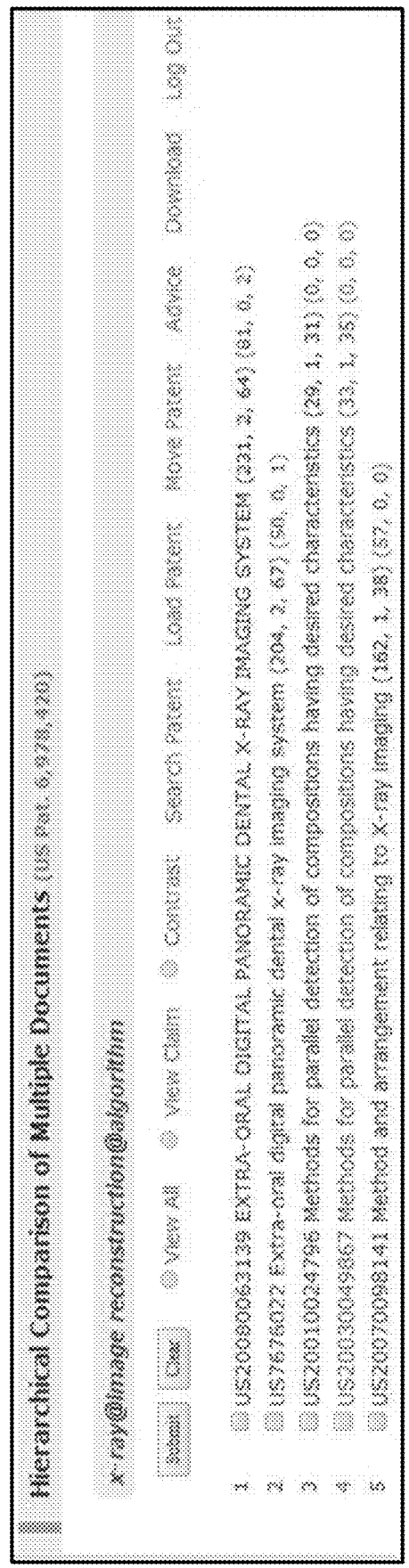
FIG. 23F illustrates the Adaptive Mapping function of FIG. 22 configured, upon a user providing a refined keyword, to process and to generate an updated keyword mapping for a set of multiple documents based at least in part on the refined keyword string.

The Document Comparator module 2105 includes the Adaptive Mapping function 2230 that can be configured to update keyword mappings upon receiving the refined keyword. The updated keyword mappings can be based at least in part on the refined keyword string, an example of which is illustrated in FIG. 23F. The user can select the documents provided by the Adaptive Search function 2225 to get a side-by-side display of multiple sections of documents. By repeating steps described herein with reference to FIGS. 23C to 23F, the user can adaptively refine keywords and search documents based on the refined keywords, improving the quality and efficiency of document analysis.

Figure 24:
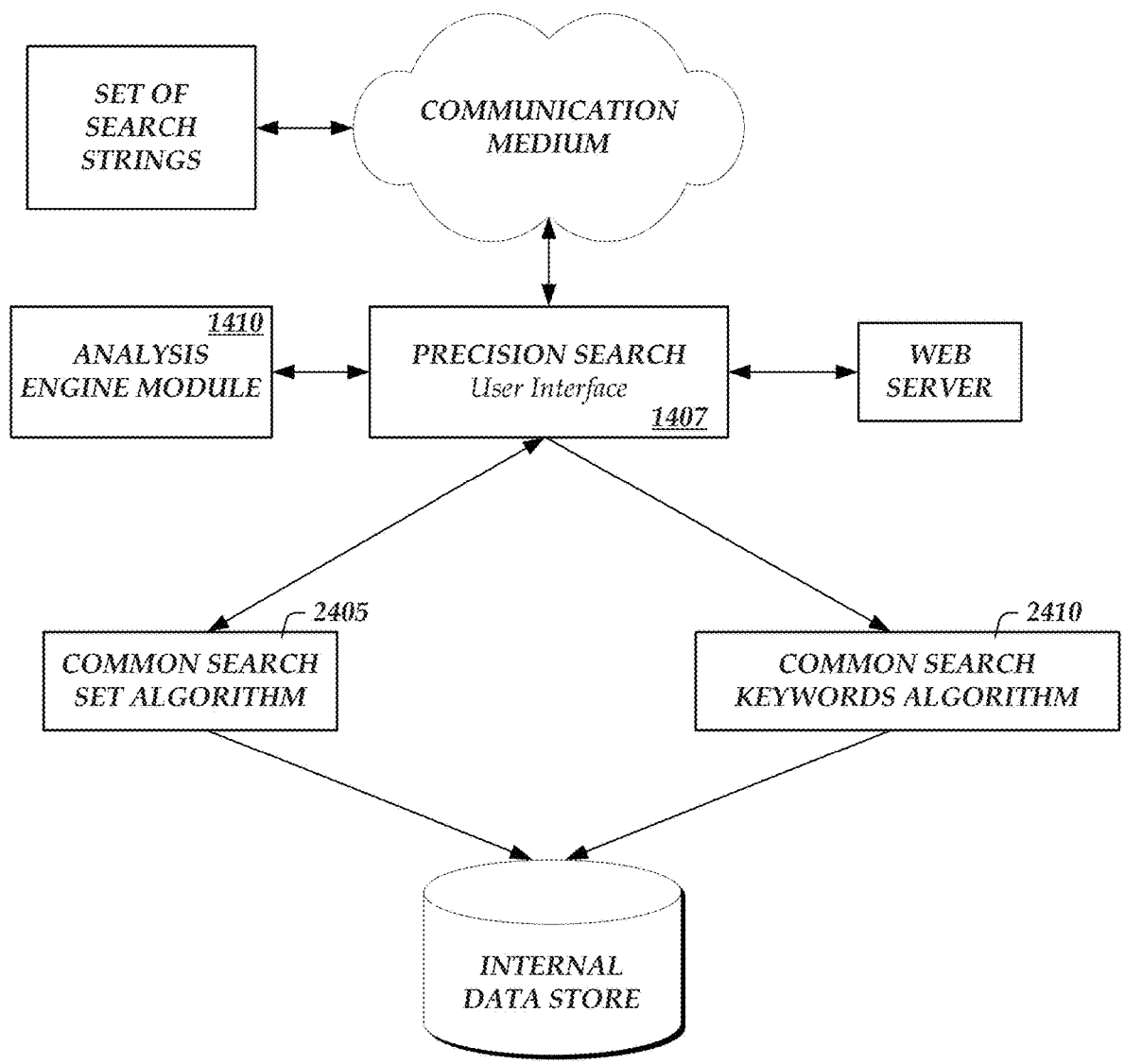
FIG. 24 illustrates a Precision Search Algorithm module.

The Analysis Engine module 1410 includes a Precision Search module 2107 that can be configured to derive a precision search result from a finite number of searches, each search based on a search string, as illustrated in FIG. 24. The Precision Search module 2107 derives a common search set utilizing a Common Search Set Algorithm function 2405. The Precision Search module 2107 derives common search keywords utilizing a Common Search Keywords Algorithm function 2410.

The Precision Search module 2107 includes the Common Search Set Algorithm function 2405 that can be configured to derive the common search set. For a finite number of searches, the common search set can be the intersection of the sets of documents returned for each search. In other words, it is the set of documents common to each of the finite searches.

The Precision Search module 2107 includes the Common Search Keywords Algorithm function 2410 that can be configured to derive common search keywords. For the finite number of searches, the common search keywords can be determined by first finding the intersection of the keywords for each of the finite number of search strings. Second, the set of all keywords used in the finite number of searches can be defined as the union of the finite number of search strings, the union resulting in a list of each keyword used in the finite number of searches. Third, a set of unique keywords can be determined by finding keywords that exist in the set of all keywords but not in the set of intersecting keywords. Fourth, a search can be performed to identify documents using the set of unique keywords.

The Precision Search module 2107 can return a result of a list of documents based at least in part on the documents returned by the Common Search Set Algorithm function 2405 and the Common Search Keywords Algorithm function 2410. The list of documents can be the intersection of the set of documents returned by the Common Search Set Algorithm function 2405 and the set of documents returned by the Common Search Keywords Algorithm function 2410.

Figure 25:
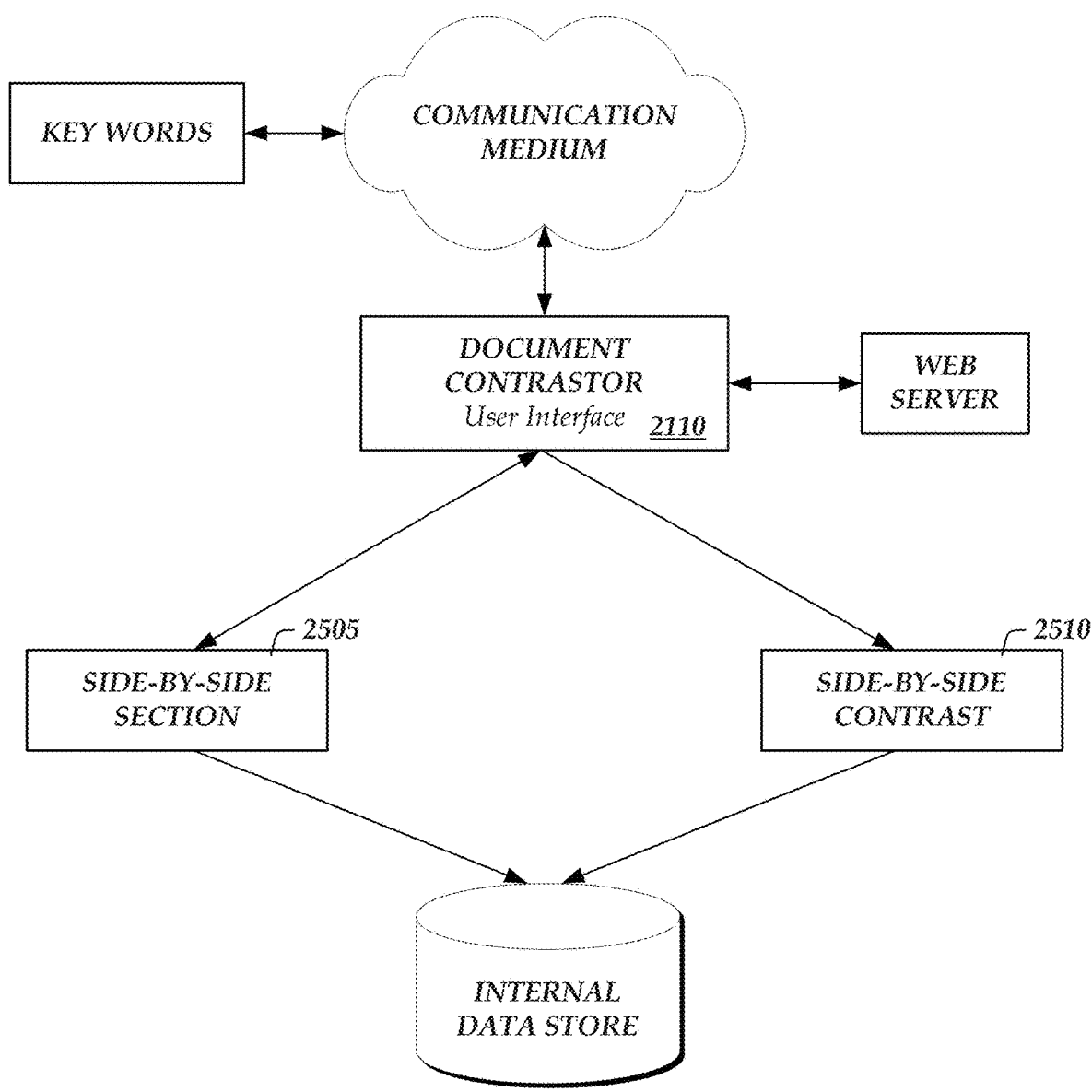
FIG. 25 illustrates the Document Contrastor module of FIG. 21 configured to allow a user to select documents and to contrast the selected documents side-by-side, the module including a Side-by-Side Section function and a Side-by-Side Contrast function.
Figures 26A, 26B:
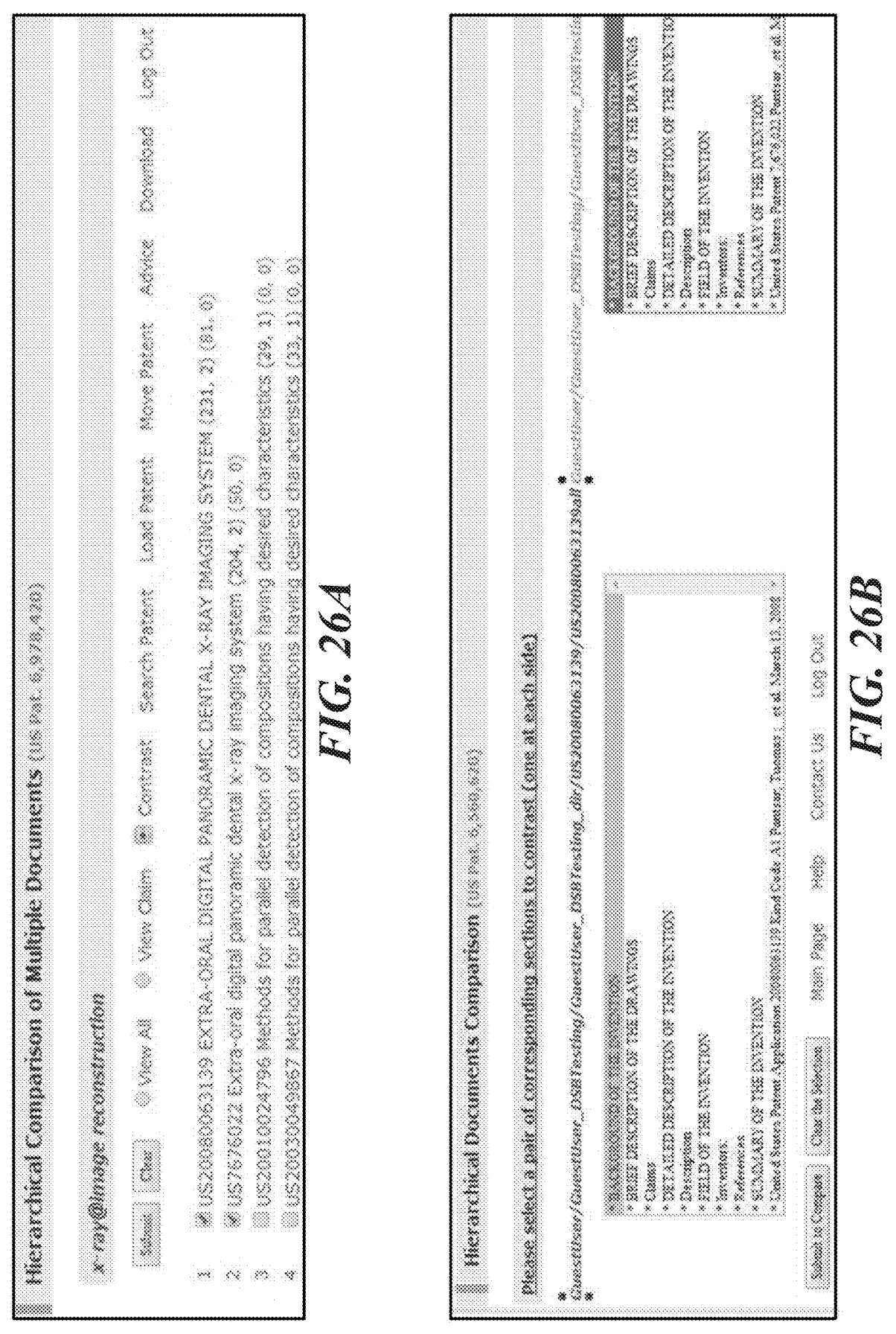

The Analysis Engine module 1410 includes a Document Contrastor module 2110 that can be configured to allow a user to select documents and display them side-by-side to detect differences between the documents. An example interface is illustrated in FIG. 26A that shows the selection of two documents via checkboxes to request a side-by-side contrast, which mode is selected via a radio button. The Document Contrastor module 2110 includes a Side-by-Side Section function 2505 and a Side-by-Side Contrast function 2510, as illustrated in in FIG. 25.

The Document Contrastor module 2110 includes the Side-by-Side Section function 2505 that can be configured to display side-by-side a list of multiple sections from current searched documents. The user can select a section from each side to contrast, an example of which is illustrated in FIG. 26B.

Figure 26C:
FIG. 26C illustrates the Side-by-Side Contrast function of FIG. 25 configured to display side-by-side those portions of the selected documents that are added, modified, and/or deleted.

The Document Contrastor module 2110 includes the Side-by-Side Contrast function 2510 that can be configured to display side-by-side the selected sections. The Side-by-Side Contrast function 2510 can be configured to highlight (e.g., with distinguished colors) portions of the document (e.g., paragraphs, sentences, words, etc.) that are added, modified, or deleted, an example of which is illustrated in FIG. 26C.

Figure 27:
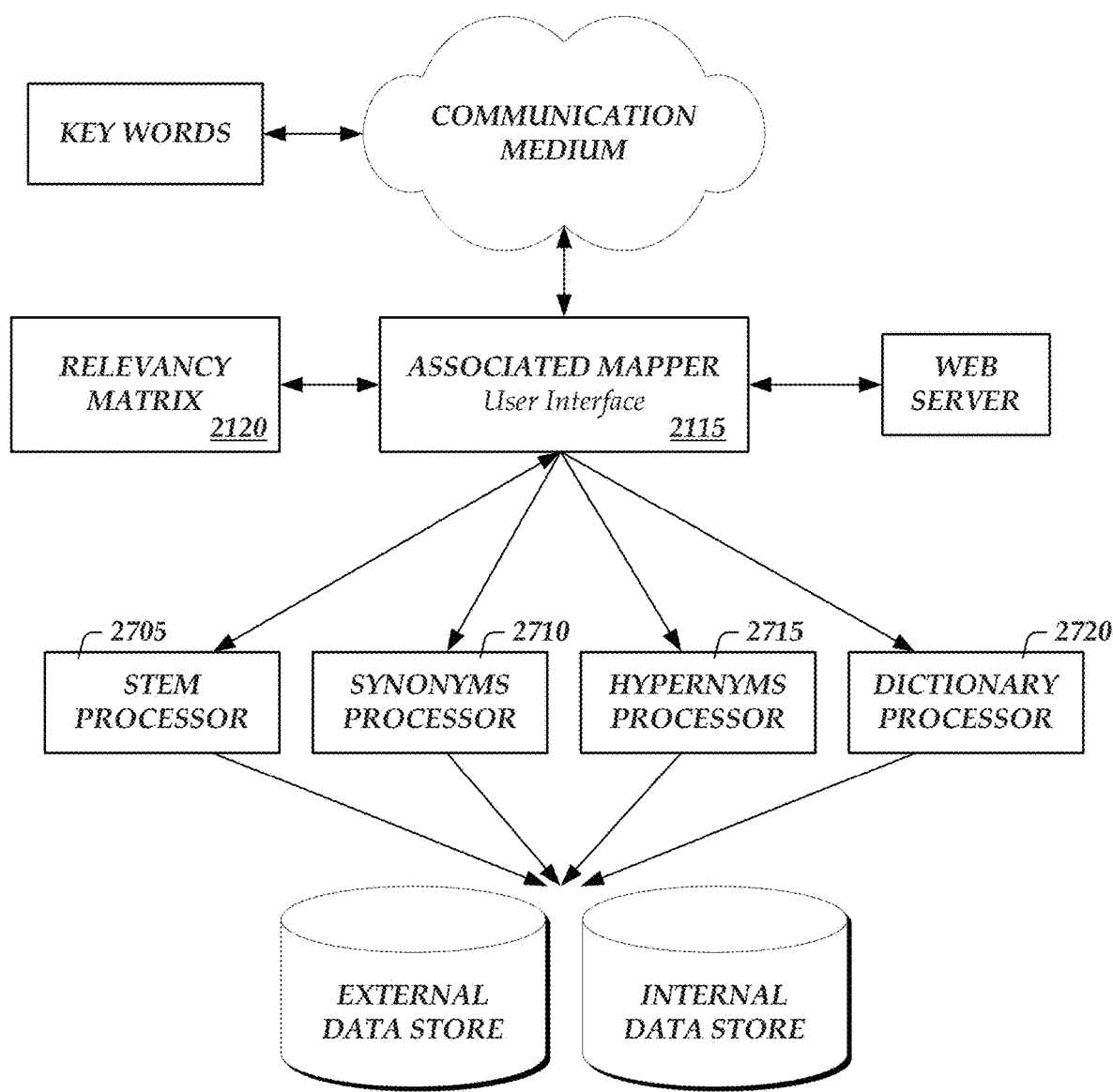
FIG. 27 illustrates the Associated Mapper module of FIG. 21 that includes Stem Processor, Synonym Processor, Hypernym Processor, and Dictionary Processor functions.

The Analysis Engine module 1410 includes the Associated Mapper module 2115 that can be configured to process and to map associated keywords to the documents. The Associated Mapper module 2115 includes a Stem Processor function 2705, a Synonyms Processor function 2710, a Hypernyms Processor function 2715, and a Dictionary Processor 2720, as illustrated in FIG. 27. The Associated Mapper module 2115 can be configured to interface with the Dynamic Relevancy Matrix module 2120, wherein functions of the Dynamic Relevancy Matrix module 2120 can be implemented by a respective function in the Associated Mapper module 2115.

Figure 28:
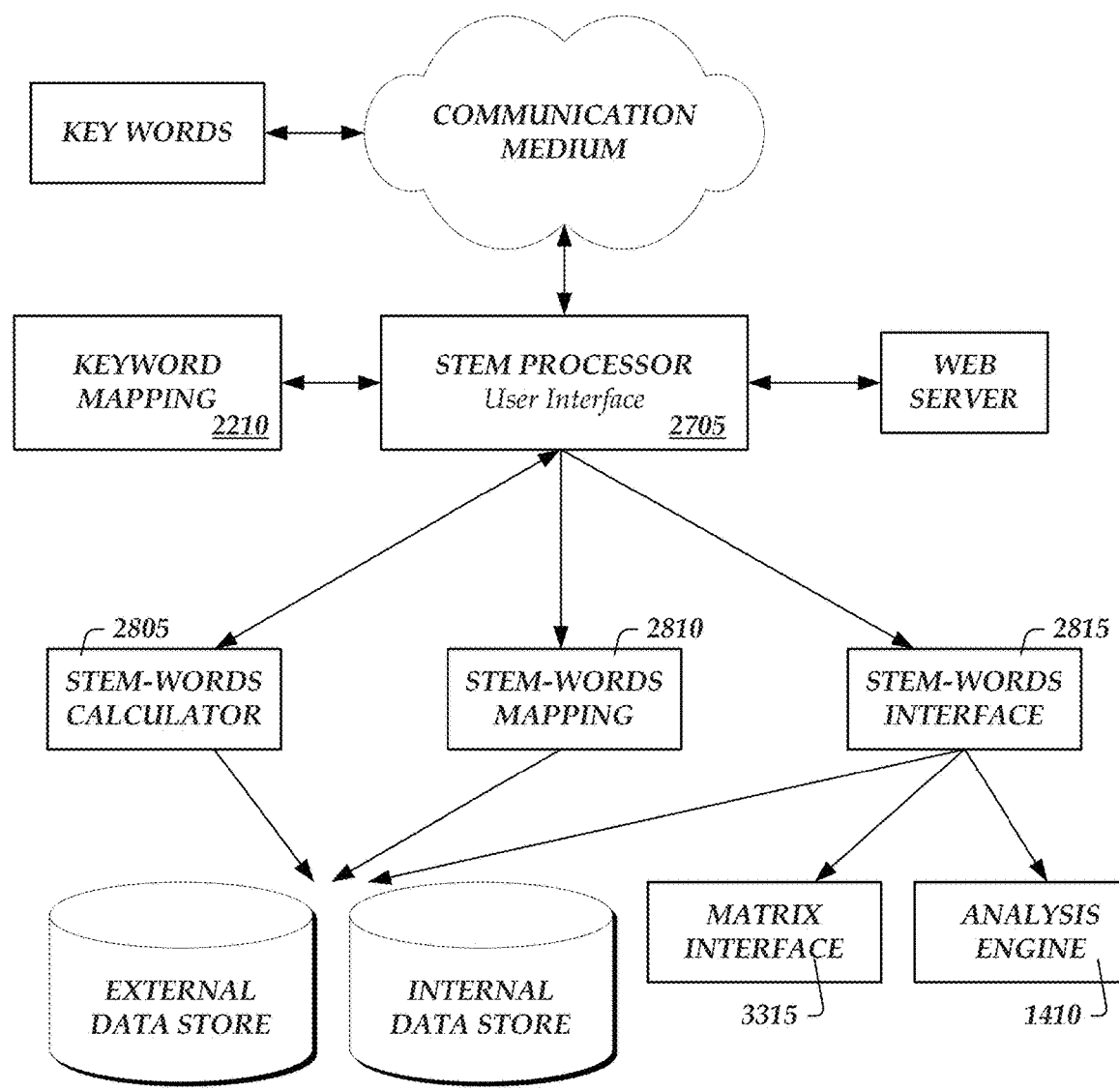
FIG. 28 illustrates the Stem Processor function of FIG. 27 configured to compute associated stems, to provide a mapping of associated stems to multiple documents, to calculate statistics of the counting of each associated stem, and to interface with the Dynamic Relevancy Matrix.

As illustrated in FIG. 28, the Associated Mapper module 2115 includes the Stem Processor function 2705 that can be configured to compute associated stems using a Stem-Words Calculator function 2805 and map the associated stems to the currently searched and/or retrieved documents using a Stem-Words Mapping function 2810. A stem-word of a word can be a word that is related to the given word by a common stem that is the main part of the word. An associated stem word can be a stem word that appears at least once in a retrieved document. The Stem Processor function 2705 can be configured to provide a statistical count of the number of matches of each associated stem in each document. The Stem Processor function 2705 can be configured to provide the matching counts on multiple levels or sections within each document, wherein the levels can be paragraphs, sections, chapters or the like within a document. The Stem Processor function 2705 can be configured to provide a distinct color for the matching count using a Stem-Words Interface function 2815.

Figure 29A:
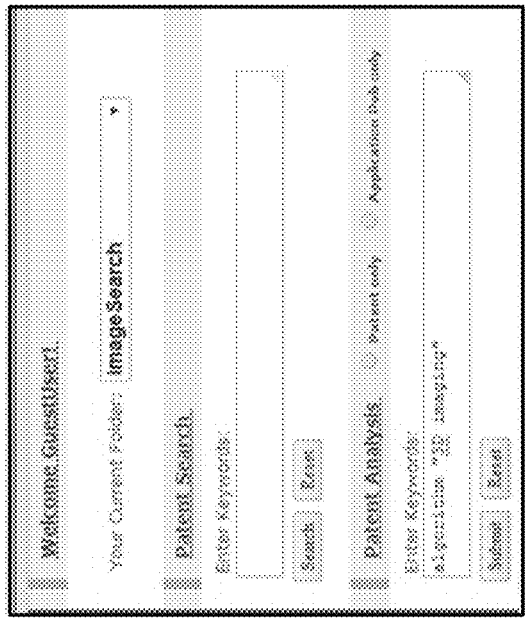
Figure 29B:
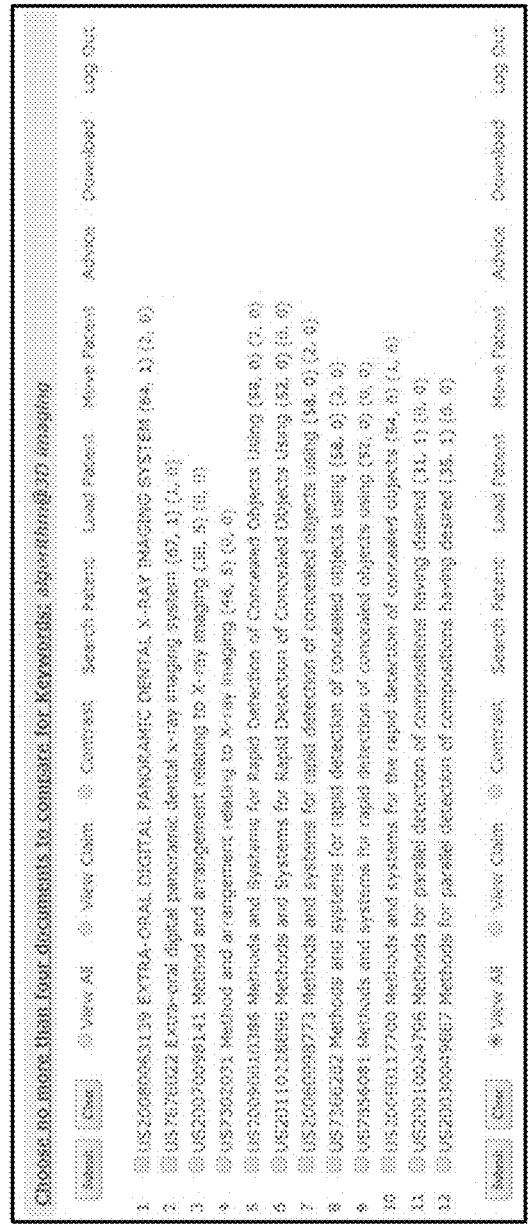
Figures 29C, 29D:
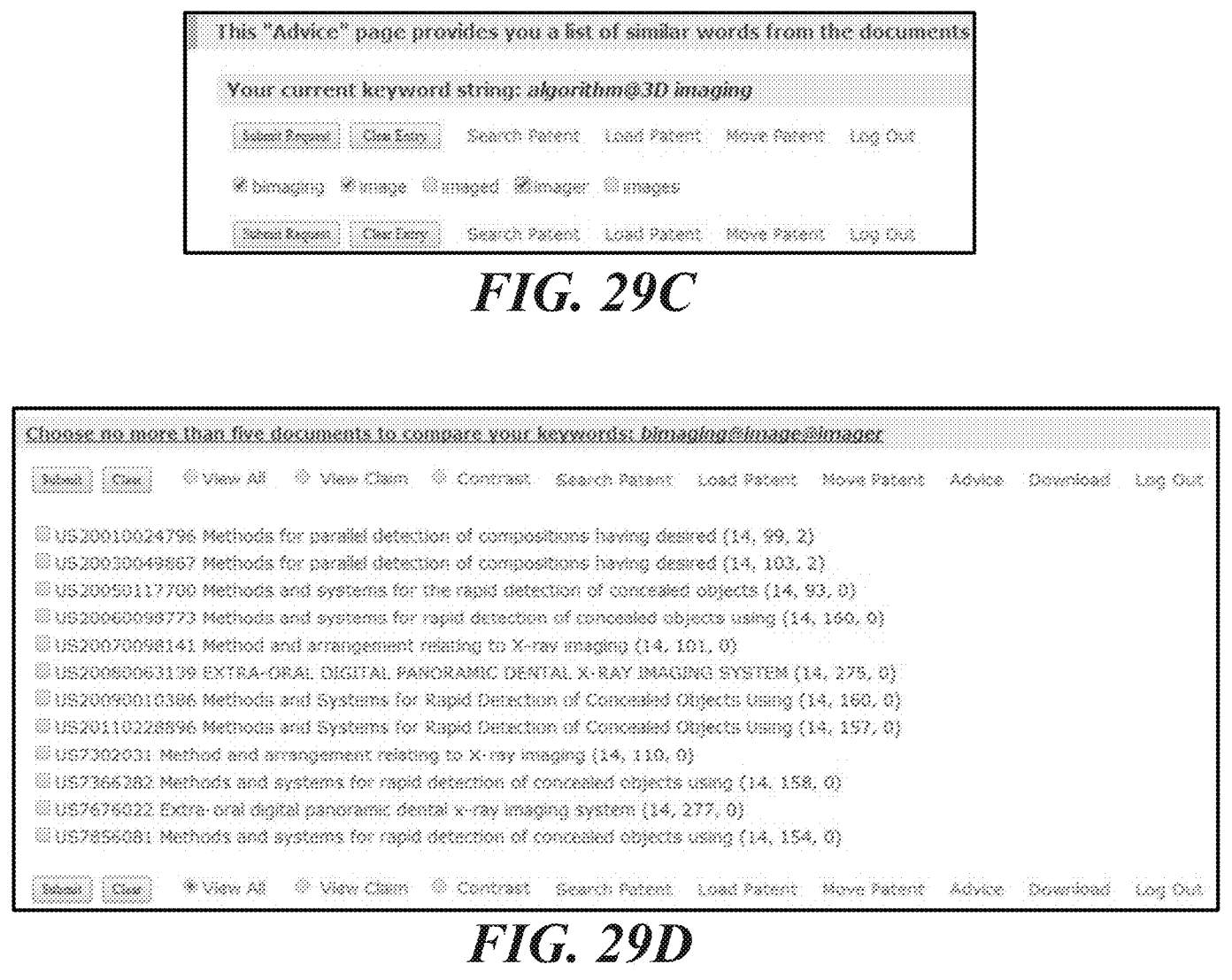

An example of a process of entering a keyword string, receiving a list of documents with keyword mapping indicated, computing associated stem words in response to a request, and displaying keyword mapping for the documents using the computed associated stem words is illustrated in FIGS. 29A-29D. FIG. 29A illustrates a text box configured to receive a keyword string for document analysis. FIG. 29B illustrates an interface displaying a list of documents returned in response to the keyword string, with numbers listed after the document titles to indicate respective keyword statistical counts in the document, the two sets of numbers corresponding respectively to matches in the document as a whole and matches within a particular section of the document. A user can select the "Stem" link to request the Stem Processor function 2705 to determine associated stem words. FIG. 29C illustrates a response to the request to determine associated stem words, where each associated stem word includes a checkbox that allows a user to select the word for inclusion in further analysis. FIG. 29D illustrates a display showing keyword mappings for the documents where the keyword mappings include results for the associated stem words.

In some embodiments, the Stem Processor function 2705 includes an algorithm for determining associated stem words. The algorithm can be described with the following pseudo-code, which returns $stem when given a keyword:
$word=keyword;
$stem=NULL if ($word.length<=2); //reject $word
$stem=$word−1 if (2<$word.length<=4); //remove last character
$stem=$word−2 if ($word.length>4); //remove last 2 characters
$stem=$base if ($word=$base. $end)
where $end is one of ["ing", "tion", "sion", "ed", "ly", "es", "le"], e.g., strip off the string of characters $end if $word ends with those characters. For example, the stem of the keyword "draining" becomes "drain" by stripping of the final "ing" from the keyword.

Figure 30:
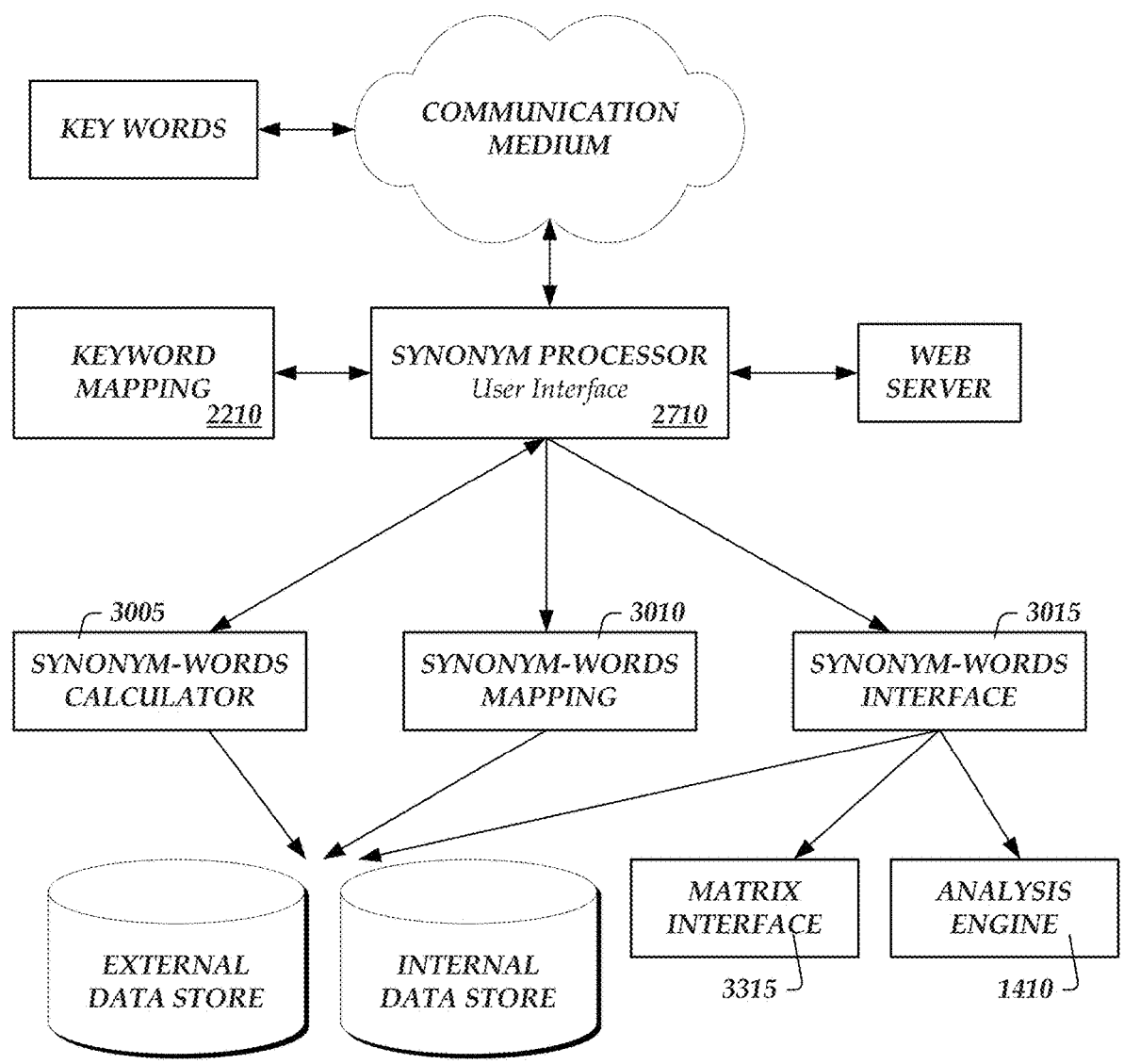
FIG. 30 illustrates the Synonym Processor function of FIG. 27 configured to compute associated synonyms, to provide a mapping of associated synonyms to multiple documents, to calculate statistics of the counting of each associated synonym, and to interface with the Dynamic Relevancy Matrix.

As illustrated in FIG. 30, the Associated Mapper module 2115 includes the Synonym Processor function 2710 that can be configured to compute associated synonyms using a Synonym-Words Calculator function 3005 and map the associated synonyms to the currently searched and/or retrieved documents using a Synonym-Words Mapping function 3010. A synonym word can be a word that has a similar meaning in the context of a given word. An associated synonym word can be a synonym word that appears at least once in a retrieved document. The Synonym Processor function 2710 can be configured to provide a statistical count of the number of matches of each associated synonym in each document. The Synonym Processor function 2710 can be configured to provide the matching counts on multiple levels or sections within each document, wherein the levels can be paragraphs, sections, chapters or the like within a document. The Synonym Processor function 2710 can be configured to provide a distinct color for the matching count using a Synonym-Words Interface function 3015.

Figure 31:
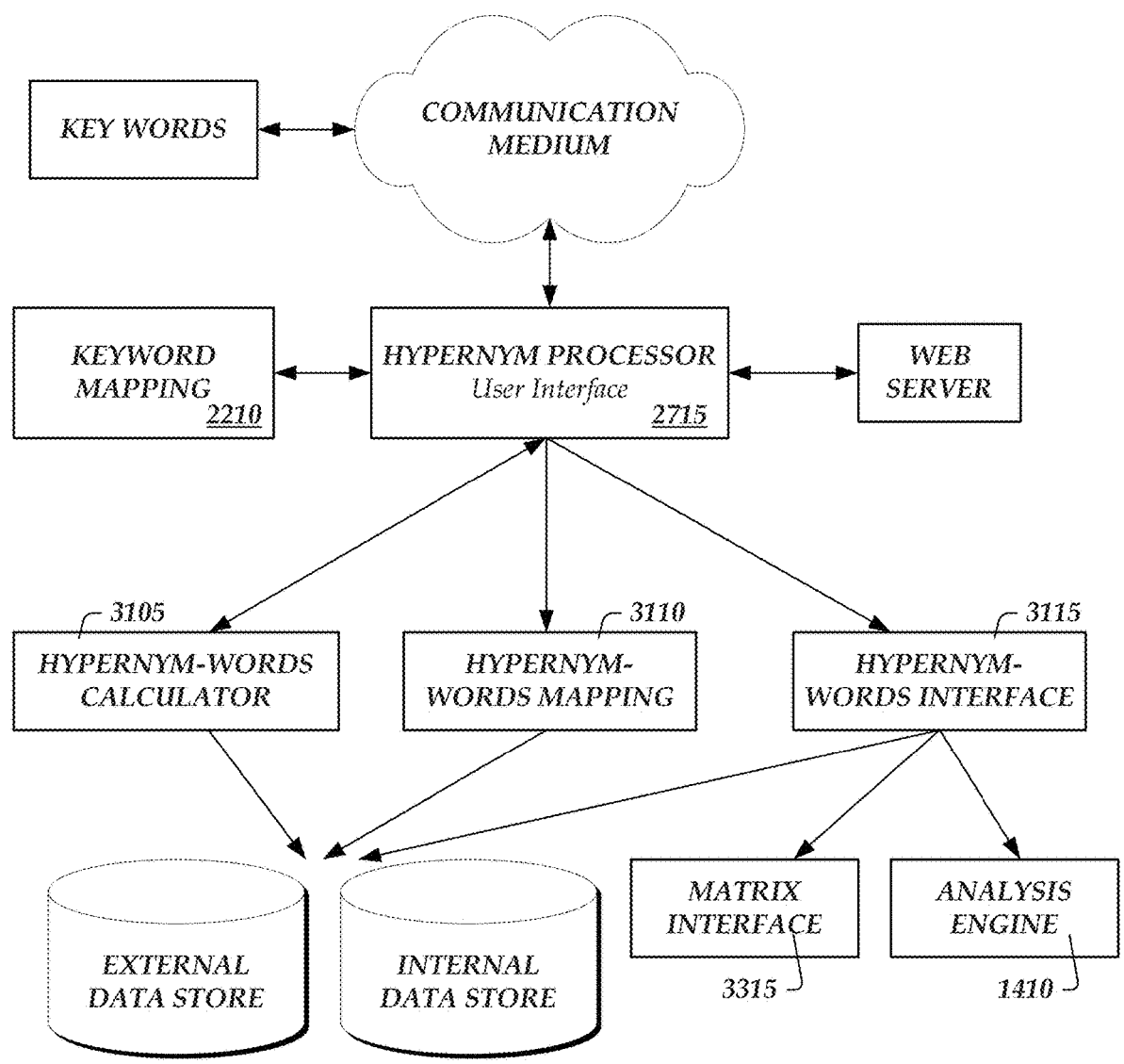
FIG. 31 illustrates the Hypernym Processor function of FIG. 27 configured to compute associated hypernyms, to provide a mapping of associated hypernyms to multiple documents, to calculate statistics of the counting of each associated hypernym, and to interface with the Dynamic Relevancy Matrix.

As illustrated in FIG. 31, the Associated Mapper module 2115 includes the Hypernym Processor function 2715 that can be configured to compute associated hypernyms using a Hypernym-Words Calculator function 3105 and map the associated hypernyms to the currently searched and/or retrieved documents using a Hypernym-Words Mapping function 3110. A hypernym word can be a word that has a more general meaning than a given word. An associated hypernym word can be a hypernym word that appears at least once in a retrieved document. The Hypernym Processor function 2715 can be configured to provide a statistical count of the number of matches of each associated hypernym in each document. The Hypernym Processor function 2715 can be configured to provide the matching counts on multiple levels or sections within each document, wherein the levels can be paragraphs, sections, chapters or the like within a document. The Hypernym Processor function 2715 can be configured to provide a distinct color for the matching count using a Hypernym-Words Interface function 3115.

Figure 32:
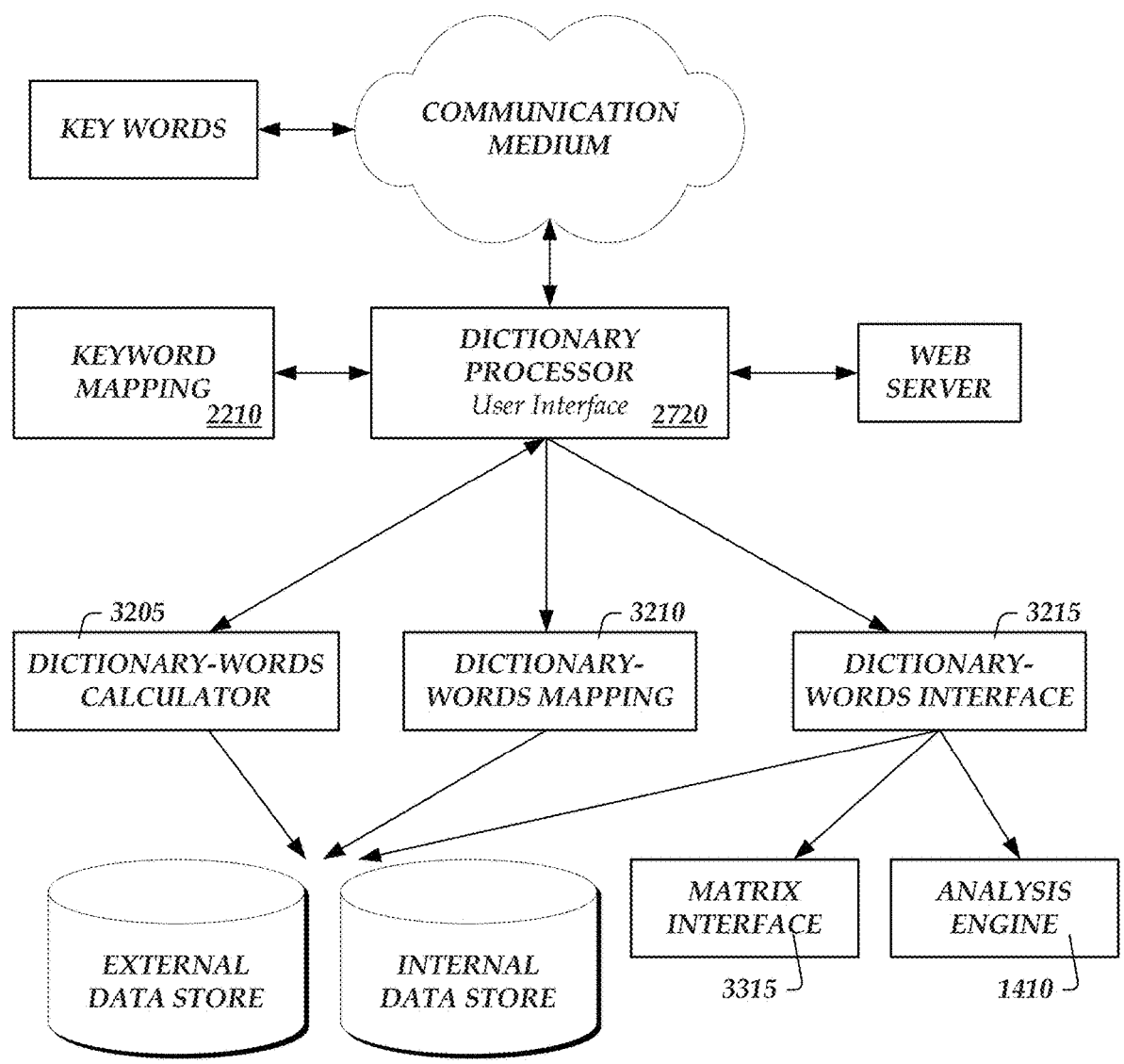
FIG. 32 illustrates the Dictionary Processor function of FIG. 27 configured to compute associated dictionary words, to provide a mapping of associated dictionary words to multiple documents, to calculate statistics of the counting of each associated dictionary word, and to interface with the Dynamic Relevancy Matrix.

As illustrated in FIG. 32, the Associated Mapper module 2115 includes the Dictionary Processor function 2720 that can be configured to compute associated dictionary words using a Dictionary-Words Calculator function 3205 and map the associated dictionary words to the currently searched and/or retrieved documents using a Dictionary-Words Mapping function 3210. A dictionary word can be a word that belongs to the technical dictionary of a given word. An associated dictionary word can be a dictionary word that appears at least once in a retrieved document. The Dictionary Processor function 2720 can be configured to provide a statistical count of the number of matches of each associated dictionary word in each document. The Dictionary Processor function 2720 can be configured to provide the matching counts on multiple levels or sections within each document, wherein the levels can be paragraphs, sections, chapters or the like within a document. The Dictionary Processor function 2720 can be configured to provide a distinct color for the matching count using a Dictionary-Words Interface 3215.

Figure 33:
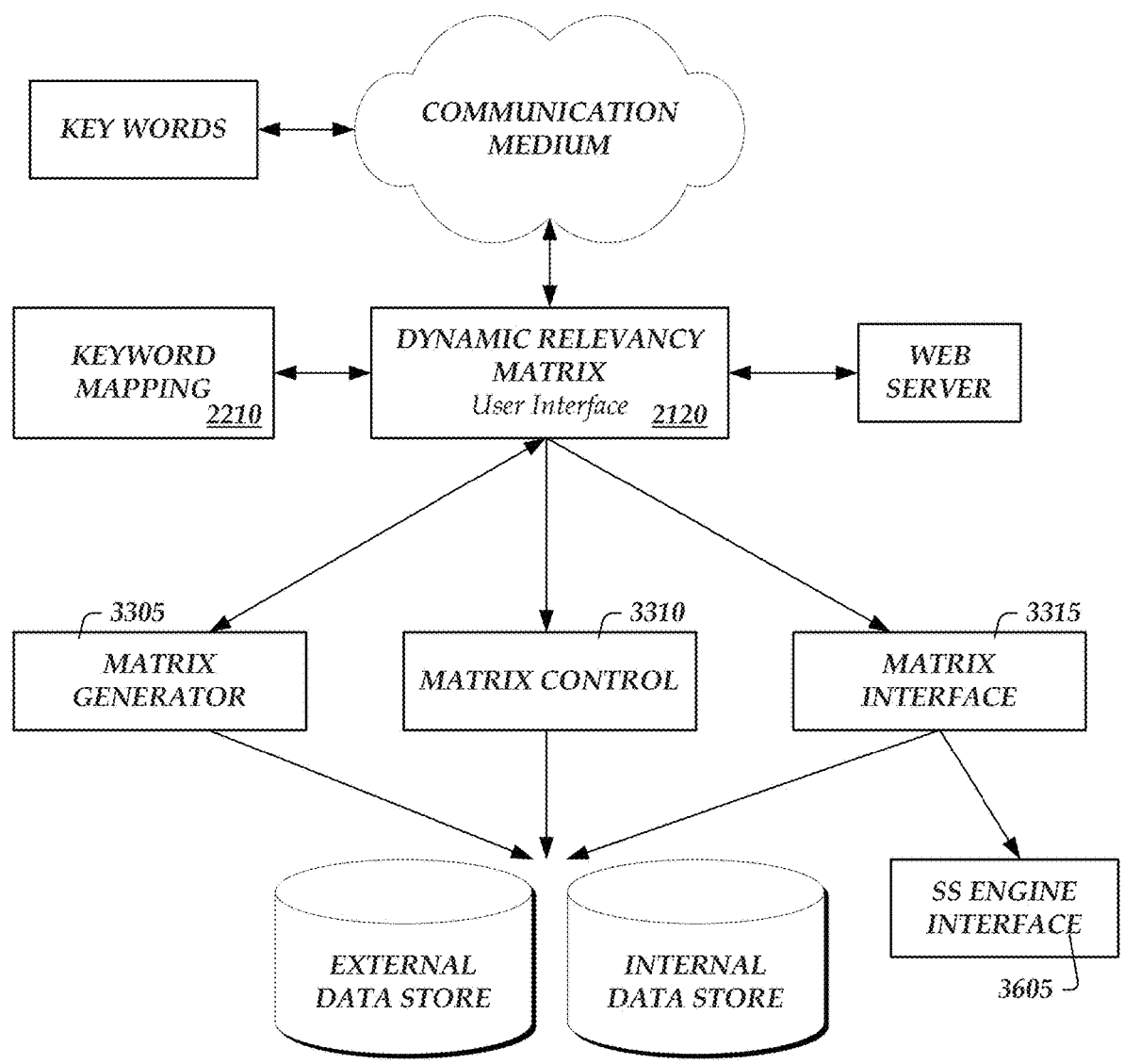
FIG. 33 illustrates the Dynamic Relevancy Matrix module of FIG. 21 that includes Matrix Interface, Matrix Control, and Matrix Generator functions.

The Analysis Engine module 1410 includes the Dynamic Relevancy Matrix module 2120 that includes a Matrix Generator function 3305, a Matrix Control function 3310, and a Matrix Interface function 3315, as illustrated in FIG. 33.

The Dynamic Relevancy Matrix module 2120 can be configured to generate a matrix comprising rows and columns, an example of which is illustrated in FIG. 34. In the matrix, the first column can include document identifiers (e.g., document titles). For each document in the first column, a checkbox may be included in the matrix element to allow a user selection of the document. The first row of the matrix can include the heading "Keyword String," followed by its associated keyword headings "Stem String," "Synonyms String," "Hypernym String," and "Dictionary Word String." Other entries in the matrix include numerical values, where each numerical value indicates a number of hits of an associated search item (e.g., keyword, synonym word, hypernym word, dictionary word, etc.) in the document indicated by the identifier in the first column of that row. For example, the entry Sn2 indicates the number of matches (or hits) of the stem word in the Document (identified as Document n) which is located at row n and column 2.

Figure 35:
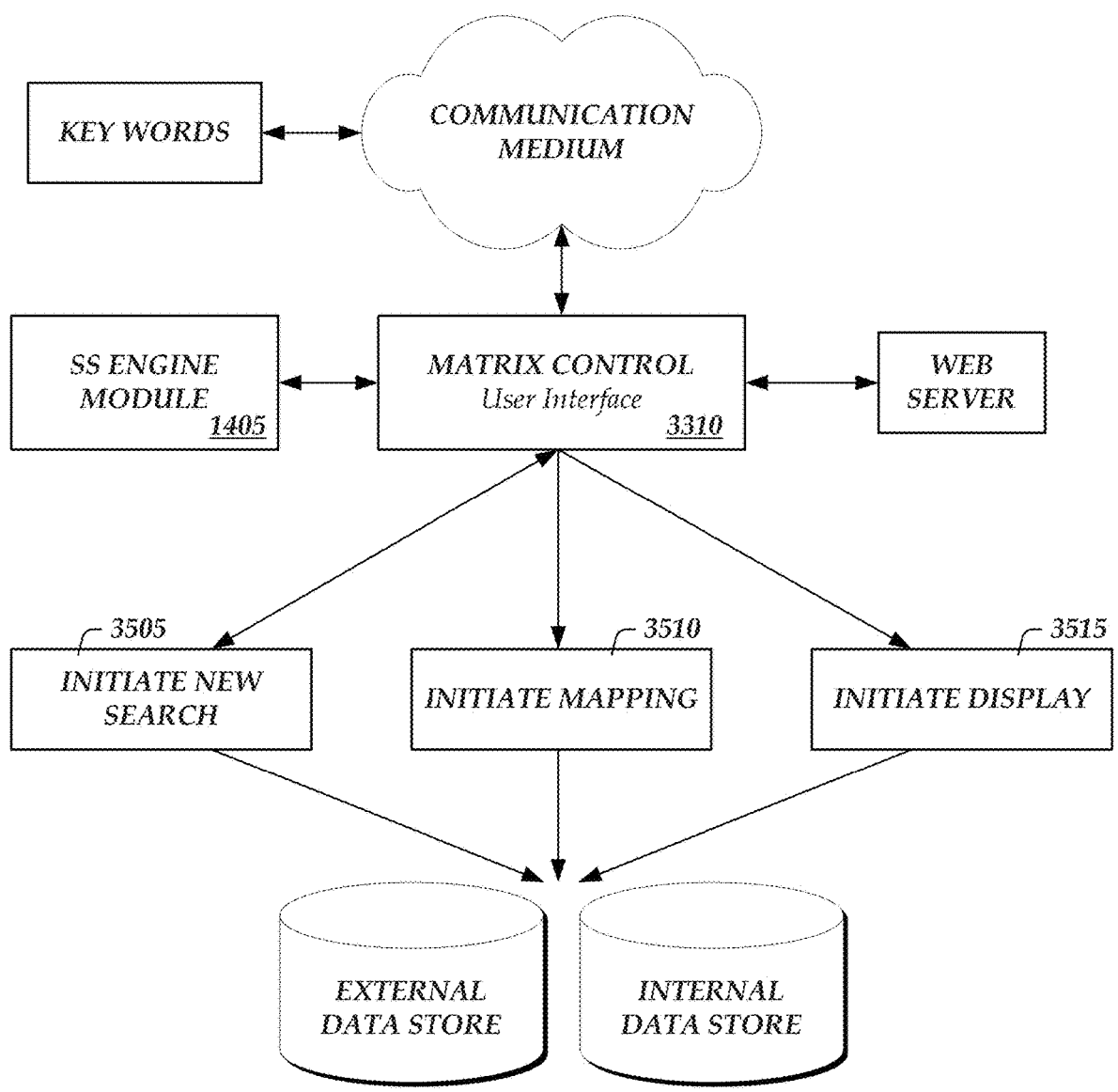
FIG. 35 illustrates the Matrix Control function of FIG. 33 that includes Initiate New Search, Initiate Mapping, and Initiate Display functions.

The Dynamic Relevancy Matrix module 2120 includes the Matrix Control function 3310 that includes an Initiate Search function 3505, an Initiate Mapping function 3510, and an Initiate Display function 3515, as illustrated in FIG. 35. If a user clicks the "DOCUMENT TITLE" heading of the first column in the matrix, each checkbox in the matrix can be reset. If this action is followed by another click on the "STEM STRING" heading, for example, a new search session can be initiated using the Document Search module 1505 in the SS Engine module 1405. With a new session initiated, the user can conduct document searching that includes the functionality described herein with reference to the SS Engine module 1405.

Figure 36:
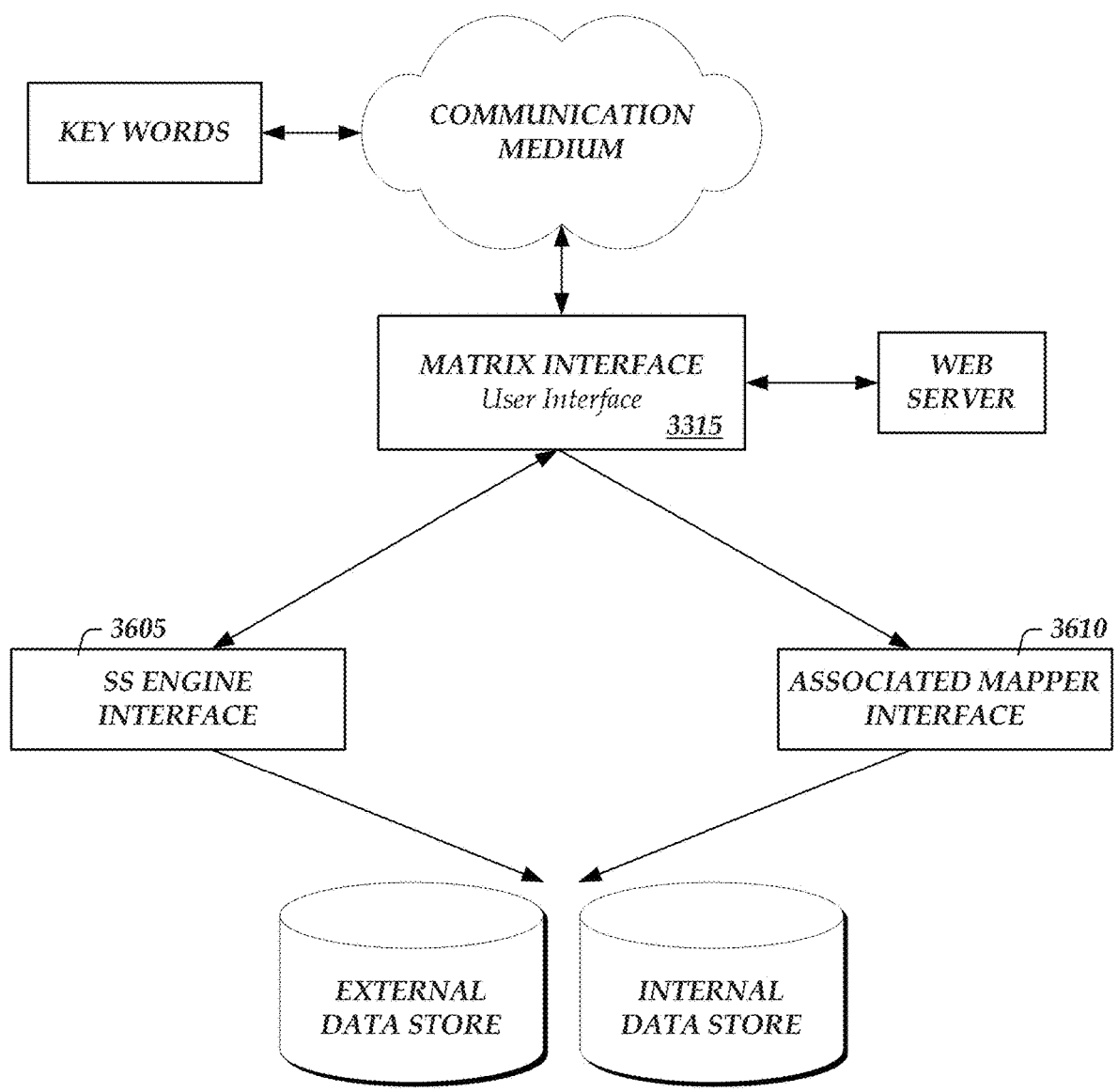
FIG. 36 illustrates the Matrix Interface function of FIG. 33 that includes SS Engine Interface, Control Interface, and Mapping Interface functions.

The Dynamic Relevancy Matrix module 2120 includes the Matrix Interface function 3315 that includes a SS Engine Interface function 3605 and a Mapping Interface function 3610, as illustrated in FIG. 36. The Matrix Interface function 3315 can be configured to interface with the Document Comparator module 2105 and the Associated Mapper module 2115, wherein functions in the Dynamic Relevancy Matrix module 2120 can be invoked or called by respective functions in the Document Comparator module 2105 and the Associated Mapper module 2115.

Figure 37:
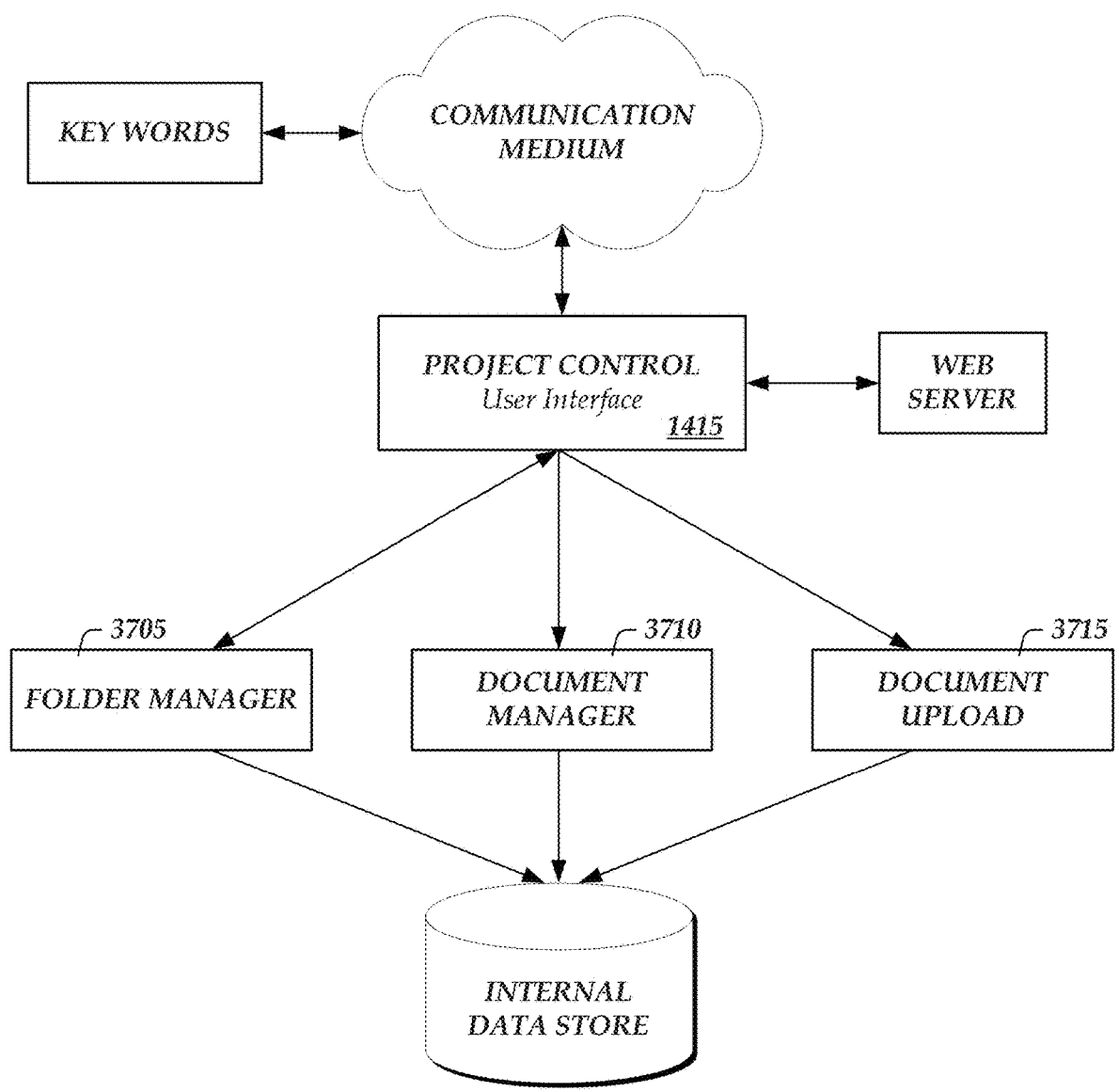
FIG. 37 illustrates modules of the document analysis system including a Project Control module that includes Folder Manager, Document Manager, and Document Upload modules.

The system 1300 includes a Project Control module 1415 that can be configured to treat each search action as a separate and/or dedicated project. The Project Control module 1415 includes a Folder Manager module 3705, a Document Manager module 3710, and a Document Upload module 3715, as illustrated in FIG. 37.

Figure 38:
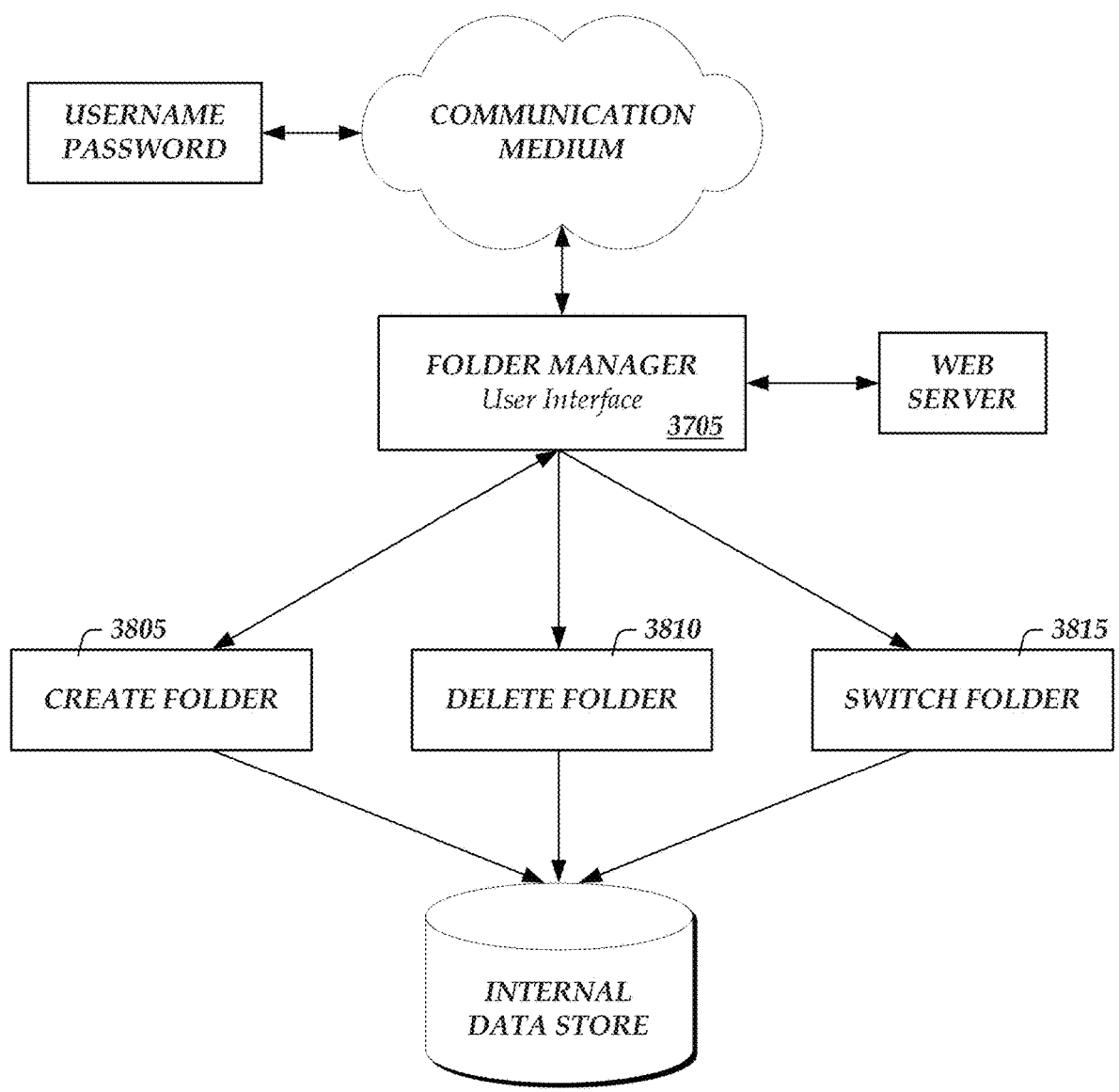
FIG. 38 illustrates the Folder Manager module of FIG. 37 that includes Create Project Folder, Delete Project Folder and Switch Folder functions.

The Project Control module 1415 includes the Folder Manager module 3705 configured to manage a user's project folders. The Folder Manager module 3705 includes a Create Project Folder function 3805, a Delete Project Folder function 3810, and a Switch Project Folder function 3815, as illustrated in FIG. 38.

The Folder Manager module 3705 includes the Create Project Folder function 3805 can be configured to check to see if a user's maximum number of project folders has been reached. If it is not reached, the Create Project Folder function 3805 can be configured to prompt the user for a name of a new folder and internally set up its associated data structure. The Create Project Folder function 3805 can be configured to check for name resolution for any duplication of the name within the user's existing folders.

The Folder Manager module 3705 includes the Delete Project Folder function 3810 that can be configured to delete an entire folder with its contents. The user can receive a confirmation message to allow the deletion to continue.

The Folder Manager module 3705 includes the Switch Project Folder function 3815 that can be configured to allow the user to switch from one project folder to another project folder. Once a new project folder is selected, the Switch Project Folder function 3815 can be configured to switch the current working folder to be the selected project folder. The Switch Project Folder function 3815 can be configured to ignore the selection if the user selects the same project folder.

Figure 39C:
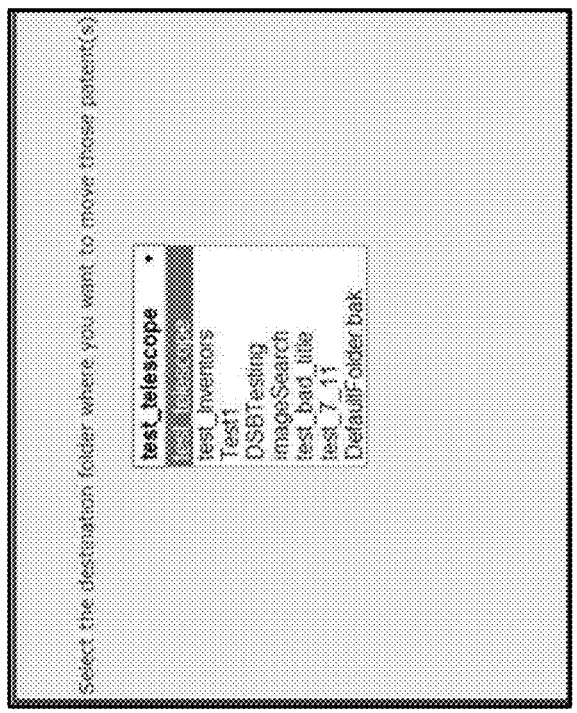
FIGS. 39B-39C illustrates an example of the Folder Manager module configured to allow a user to move a document to a new project folder.
Figure 39A:
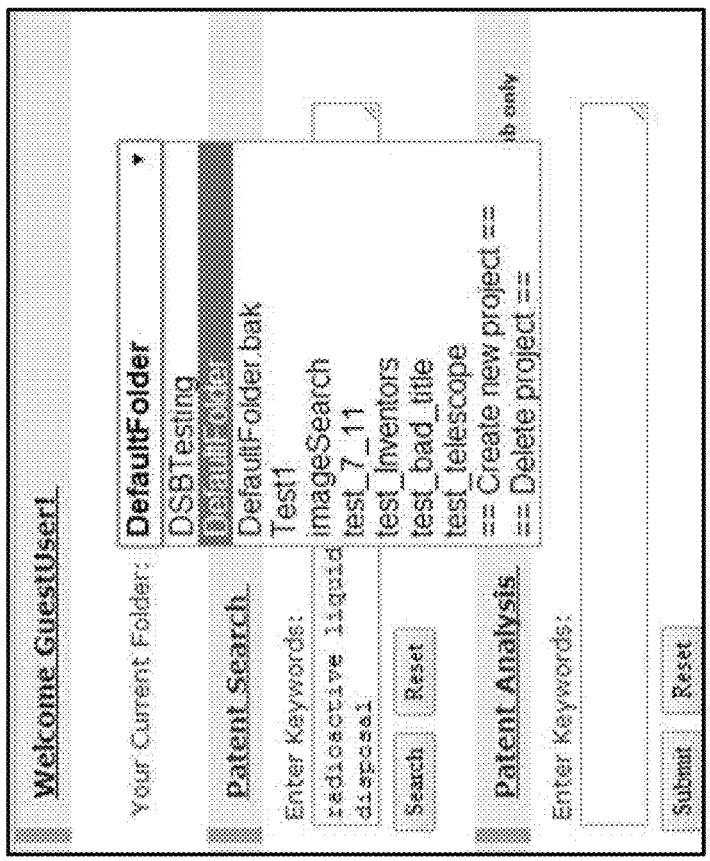
FIG. 39A illustrates an example of the Folder Manager module configured to provide a list that allows a user to create, delete, or switch the project folder.
Figure 39B:
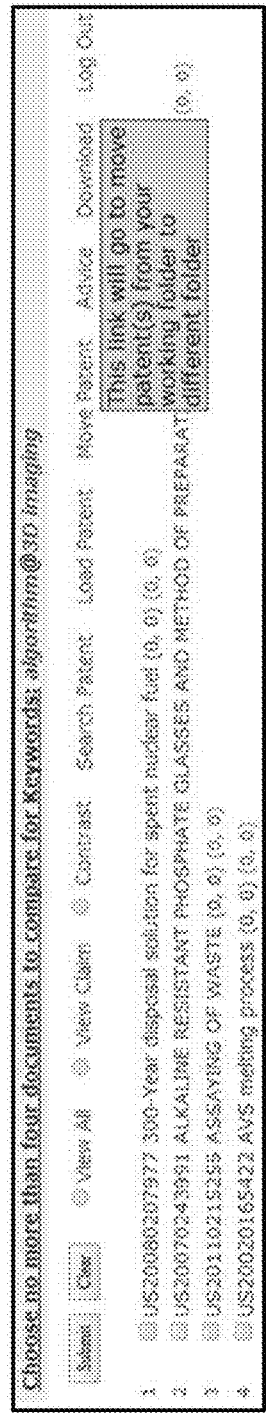

FIG. 39A illustrates an example of the Folder Manager module 3705 to create or to delete a folder. FIG. 39B illustrates an example user interface that allows the user to select a document to move the document to another folder by clicking on a link labeled "Move Document" or "Move Patent." FIG. 39C illustrates an example of the Folder Manager module 3705 responding to a request to move a document by providing a list of potential folders for moving the document. For example, a user can select a number of documents using checkboxes and click on the "Move Document" link which will provide the user a number of folders that can receive the selected documents. This can allow a user to create a folder with a smaller number of references, allowing the user to refine manually search and analysis results, storing relevant references in a different folder for analysis later.

Figure 40:
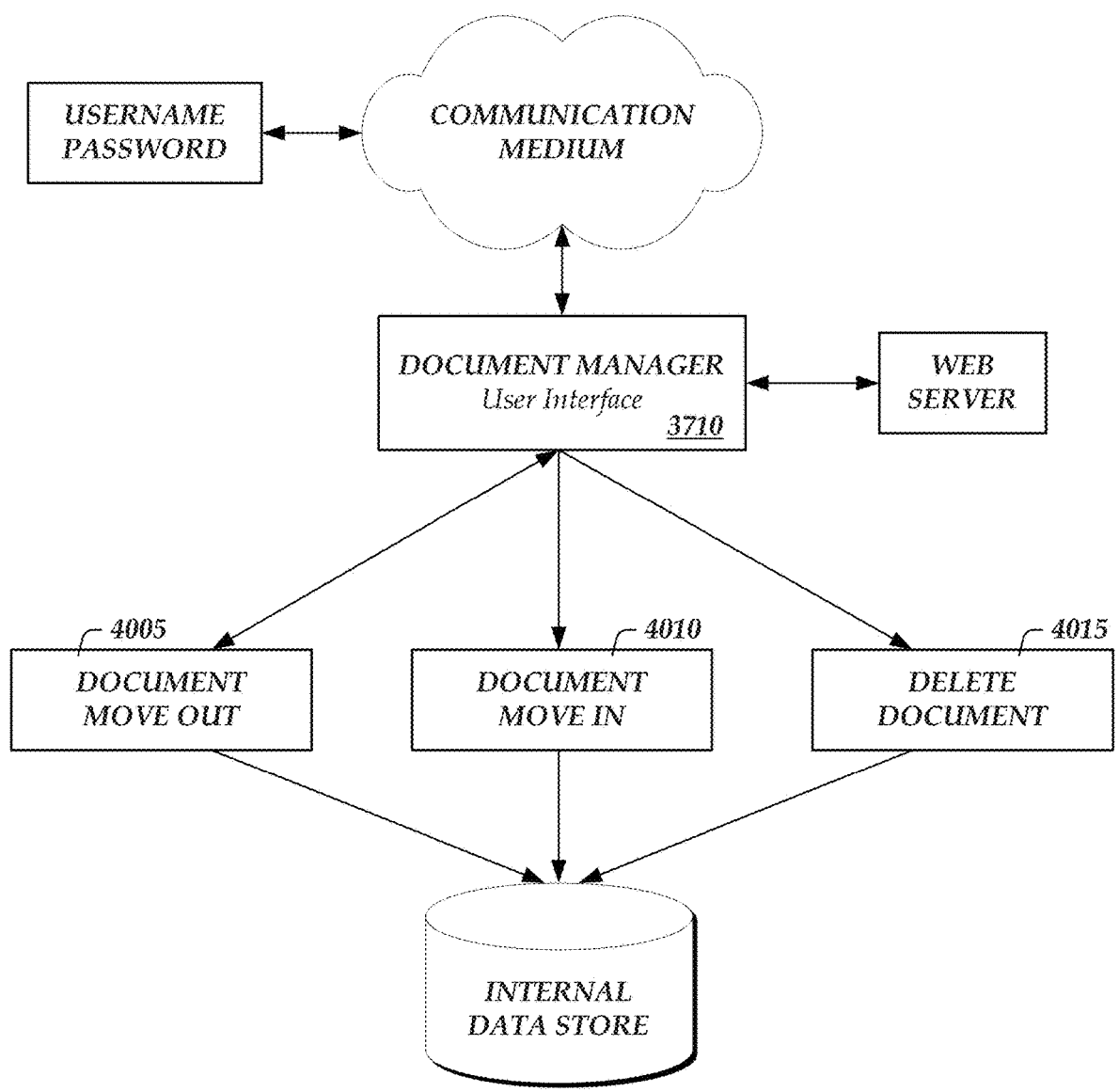
FIG. 40 illustrates the Document Manager module of FIG. 37 that includes a Document Move Out function that moves the document out of the working folder, a Document Move In function that moves the documents back to the working folder, and a Delete Document function that deletes the documents from the working folder.

The Project Control module 1415 includes the Document Manager module 3710 that can be configured to relocate documents to another project folder. The Document Manager module 3710 includes a Document Move Out function 4005 that can be configured to move the document out of the current folder, a Document Move In function 4010 configured to move documents back to the current folder, and a Document Delete function 4015 configured to delete documents in the folder, as illustrated in FIG. 40.

The Document Manager module 3710 includes the Document Move Out function 4005 that can be configured to move documents out of the current project folder, at the discretion of the user, to another project folder. The user can move one or more documents based at least in part on a pre-defined list of documents. In some embodiments, the user can move one or more documents based at least in part on associated search statistics of the documents.

The Document Manager module 3710 includes the Document Move In function 4010 that can be configured to move one or more documents from another project folder into the current project folder based at least in part on a pre-defined list of documents.

The Document Manager module 3710 includes the Document Delete function 4015 that can be configured to delete one or more documents from a secondary project folder. In some embodiments, a deleted document cannot be restored. The user can receive a confirmation message before the execution of the deletion. The Document Delete function 4015 can be configured to not delete documents from the current project folder.

Figure 41:
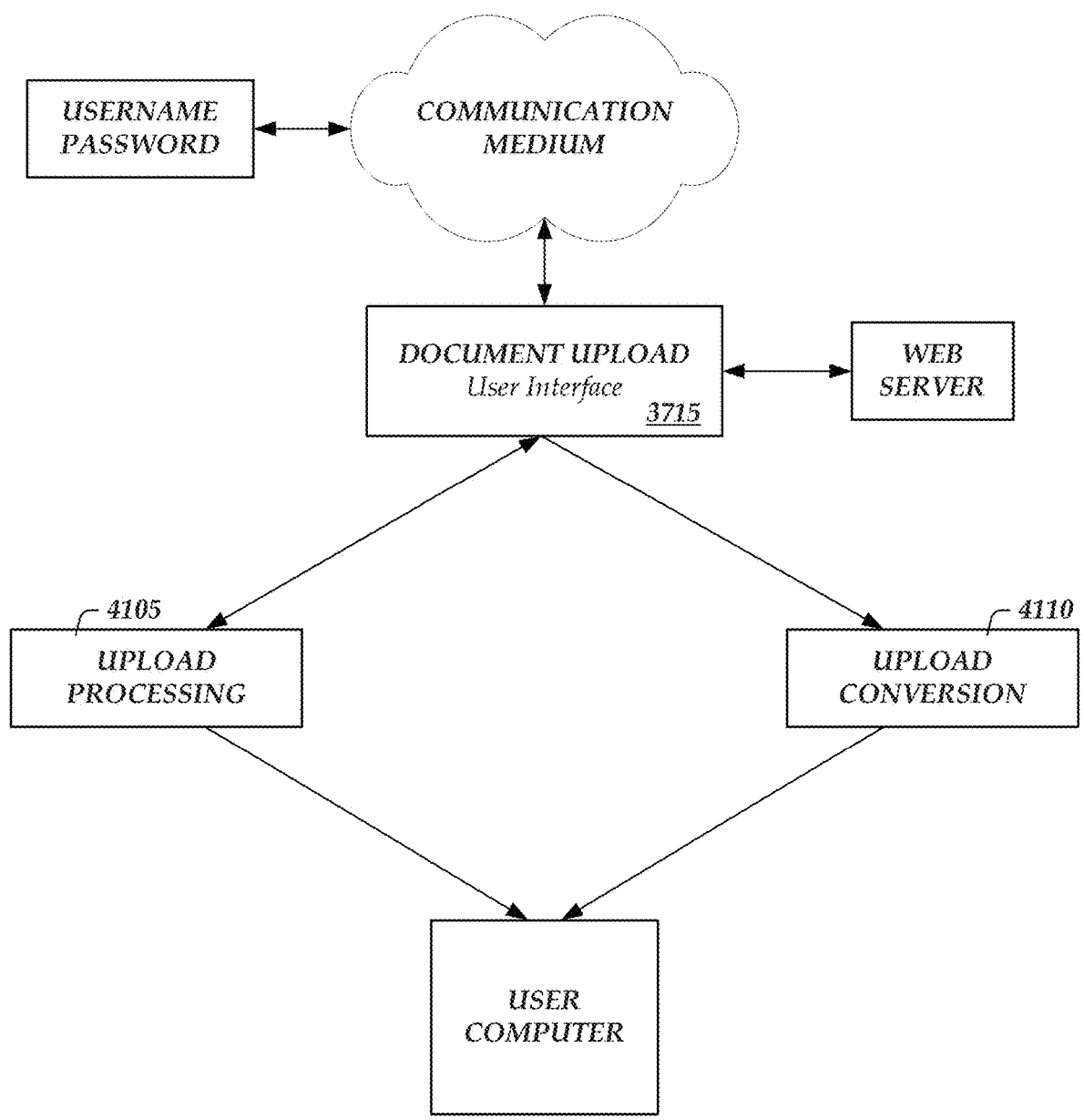
FIG. 41 illustrates the Document Upload module that includes an Upload Processing function and an Upload Conversion function.

The Project Control module 1415 includes the Document Upload module 3715 that includes an Upload Processing function 4105 and an Upload Conversion function 4110, as illustrated in FIG. 41.

The Document Upload module 3715 includes the Upload Processing function 4105 that can be configured to interface with the user via the user's computing device. The Upload Processing function 4105 can be configured to parse and to verify user credentials. The Upload Processing function 4105 can be configured to parse user input for acceptable syntax.

The Document Upload module 3715 includes the Upload Conversion function 4110 that can be configured to verify and to convert a document provided by a user for acceptable document type and document format. The Upload Conversion function 4110 can be configured to deposit the document in the current project folder.

Figure 42:
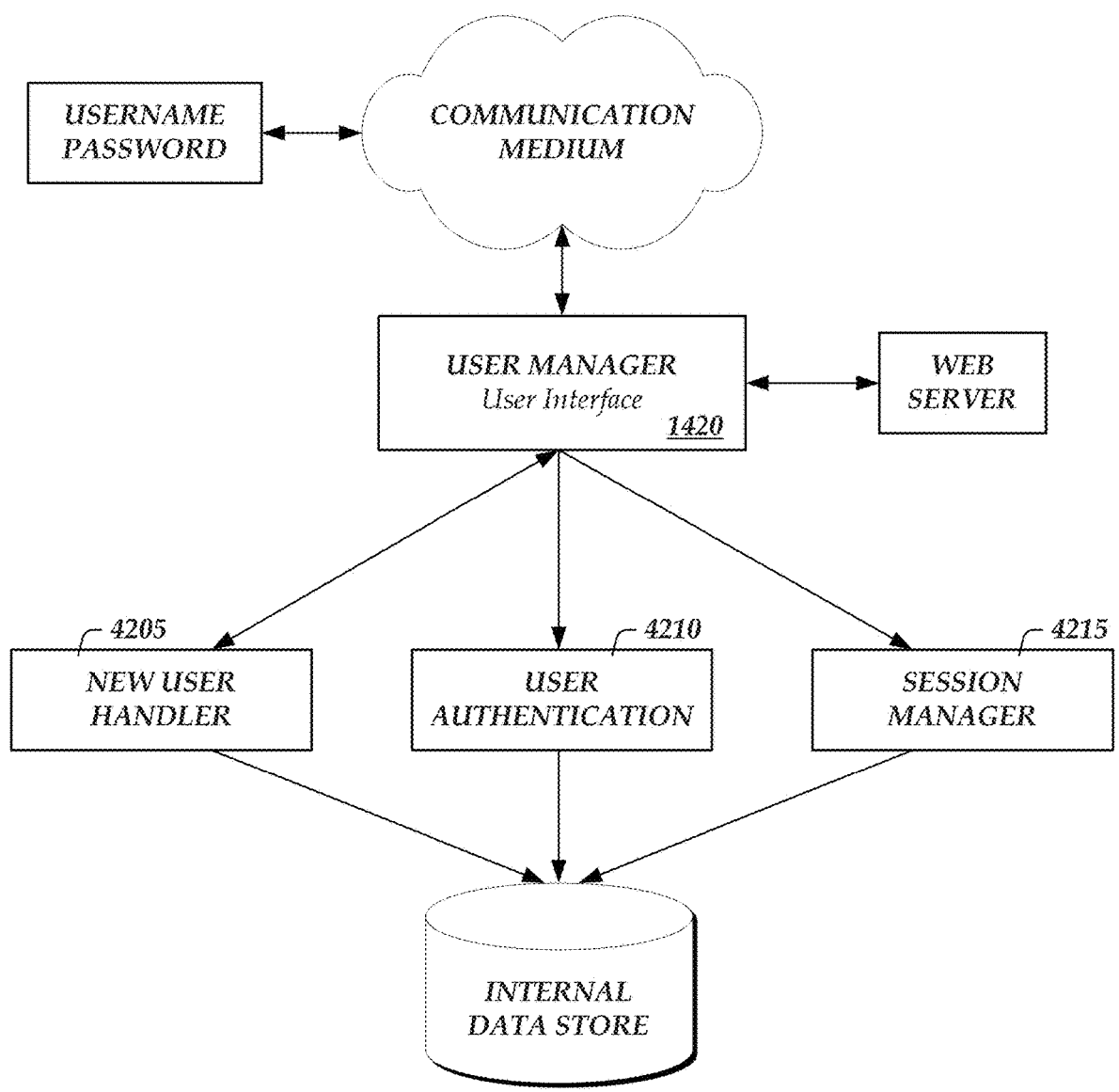
FIG. 42 illustrates modules of the document analysis system including a User Manager module that includes New User Handler, User Authentication, and Session Manager functions.

The system 1300 includes a User Manager module 1420 configured to manage user accounts. The User Manager module 1420 includes a New User Handler module 4205, a User Authentication module 4210, and a Session Manager module 4215, as illustrated in FIG. 42.

The User Manager module 1420 includes the New User Handler module 4205 that can be configured to process new user applications. The New User Handler module 4205 can be configured to accept and to create a new account for a user, an example of which is illustrated in FIG. 43.

Figure 43:
FIG. 43 illustrates the New User Handler and the User Authentication function of FIG. 42 configured to process new user applications, to accept create a new account for the new user, and to authenticate a user (based on user credentials on the system) each time a user signs into the system.

The User Manager module 1420 includes the User Authentication module 4210 configured to authenticate a user (e.g., based at least in part on user credentials stored in a data store) each time a user signs into the system, an example of which is illustrated in FIG. 43.

Figure 44:
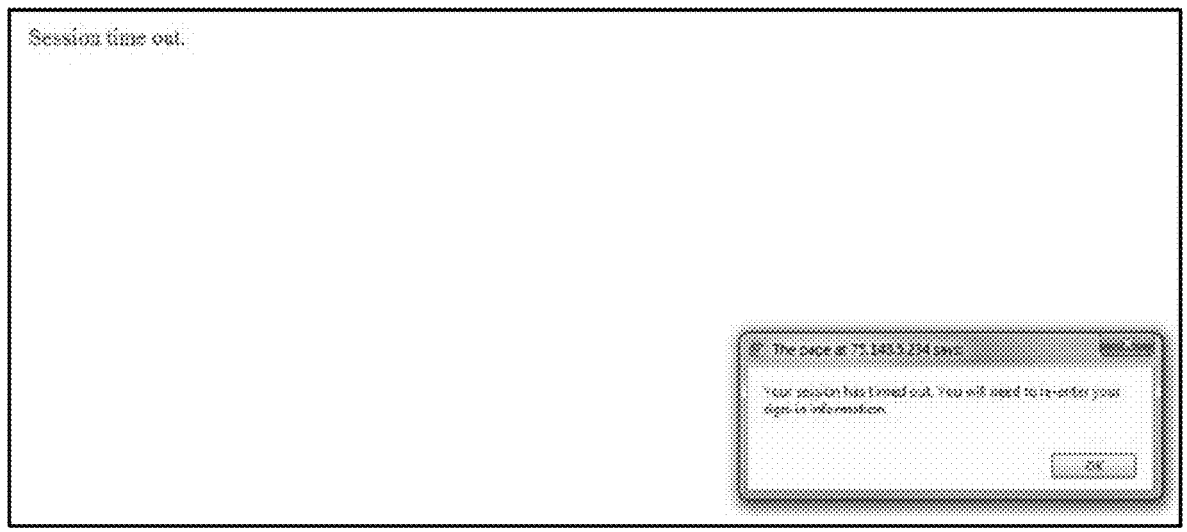
FIG. 44 illustrates the Session Manager function of FIG. 42 configured to control the user search session and to log search activities.

The User Manager module 1420 includes the Session Manager module 4215 that can be configured to manage user login sessions. The Session Manager module 4215 includes a User Account Initialization function and a User Account Activities function. User account activities can be configured to control attributes of a user session including, for example, time stamps, which can be used to impose timing limitations, and a user's network identification. FIG. 44 illustrates an example of a session timeout message where the User Manager module 1420 ends a user session after a period of time that exceeds an allowable user session time, where the period of time can be a measure of time when the user has been idle.

Figure 45:
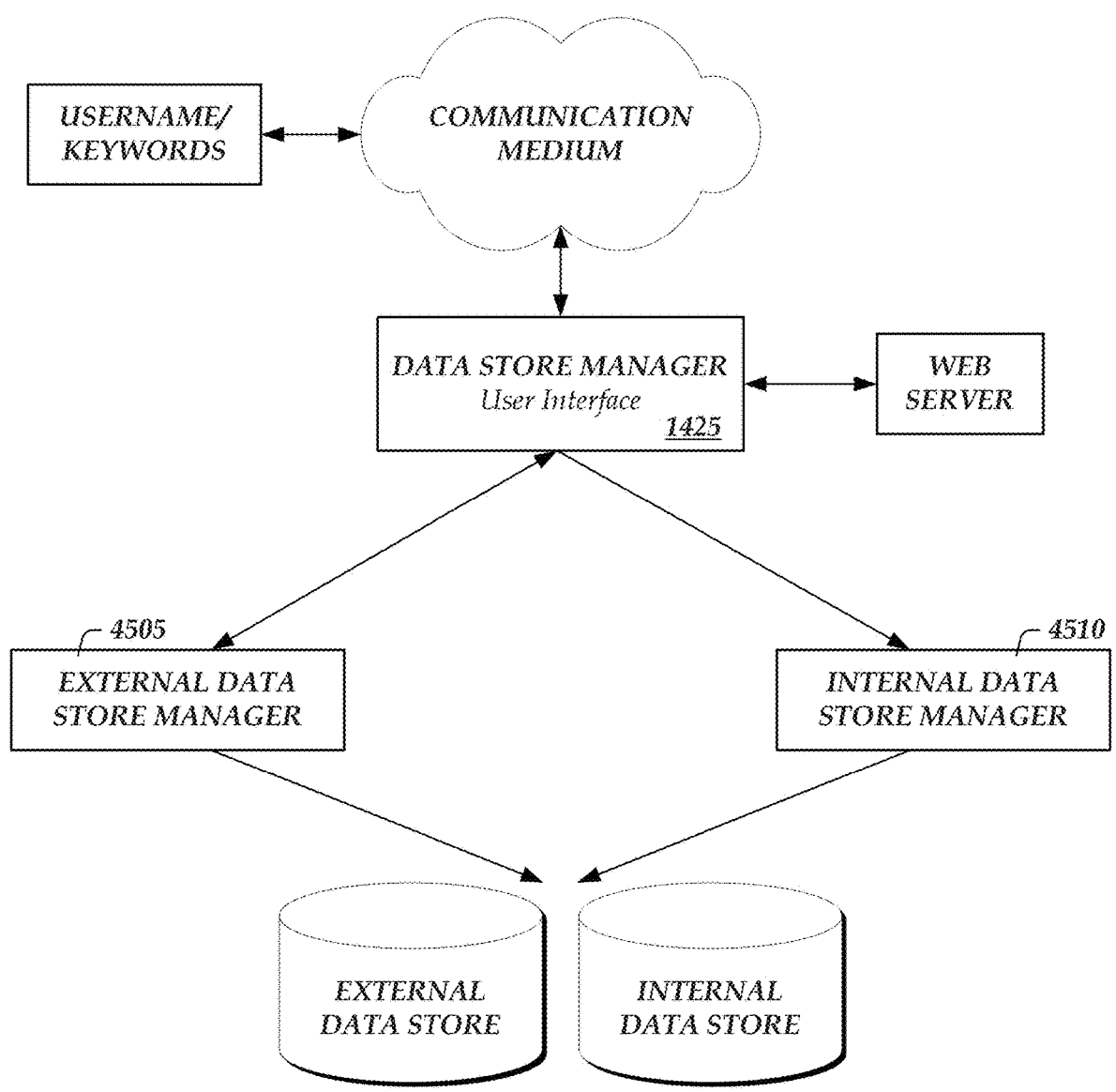
FIG. 45 illustrates modules of the document analysis system including a Data Store Manager module that includes External Data Store Manager and Internal Data Store Manager functions.

The system 1300 includes a Data Store Manager module 1425 that includes an External Data Store Manager module 4505 and an Internal Data Store Manager module 4510, as illustrated in FIG. 45.

Figure 46:
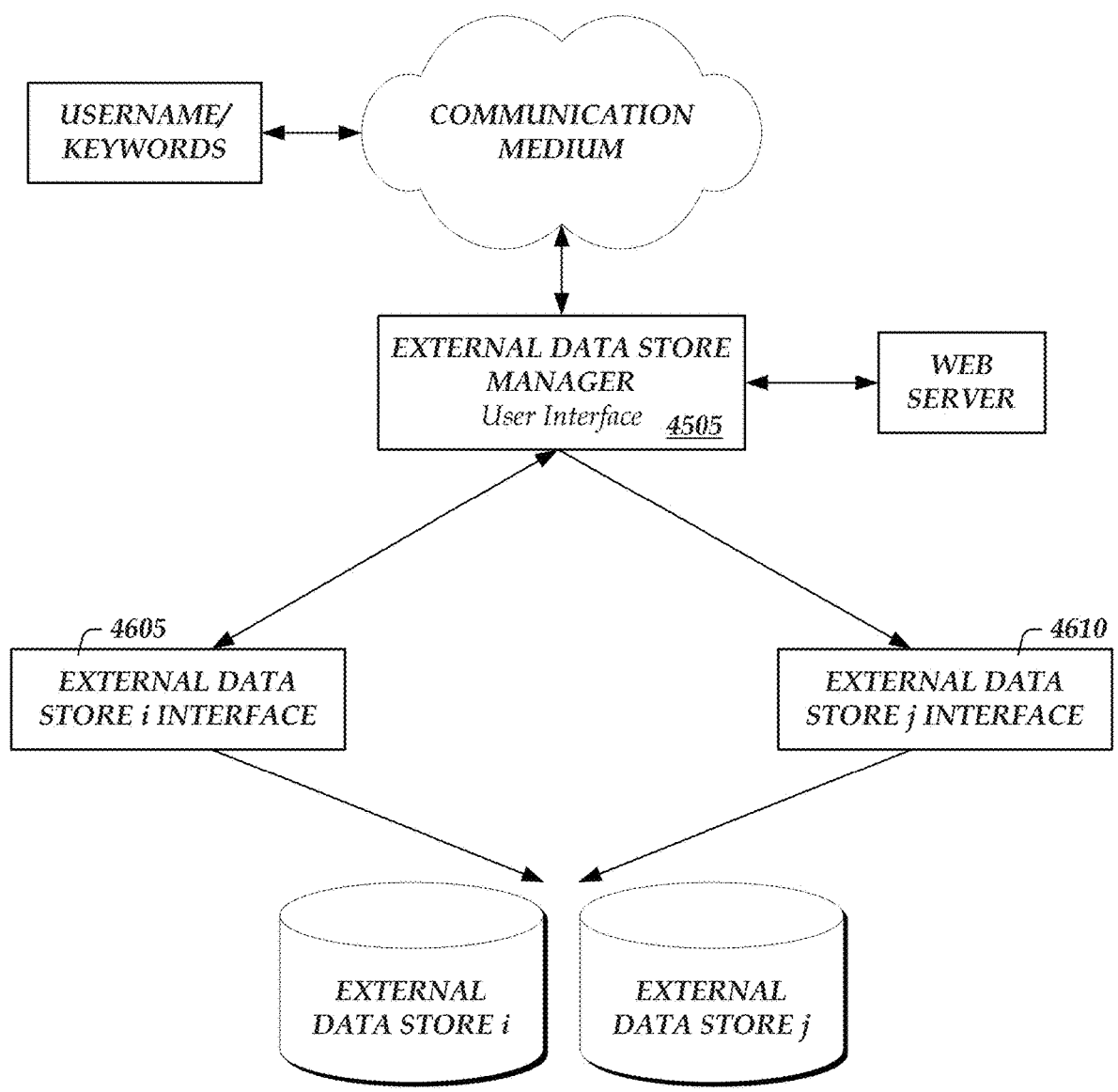
FIG. 46 illustrates the External Data Store Manager function of FIG. 45 configured to interface with one or more external data stores, the function including an External Data Store i Interface function and an External Data Store j Interface function.

The Data Store Manager module 1425 includes the External Data Store Manager module 4505 that can be configured to interface with one or more external data stores or databases. The External Data Store Manager module 4505 includes an External Data Store i Interface function 4605 and an External Data Store j Interface function 4610, as illustrated in FIG. 46.

Figure 47:
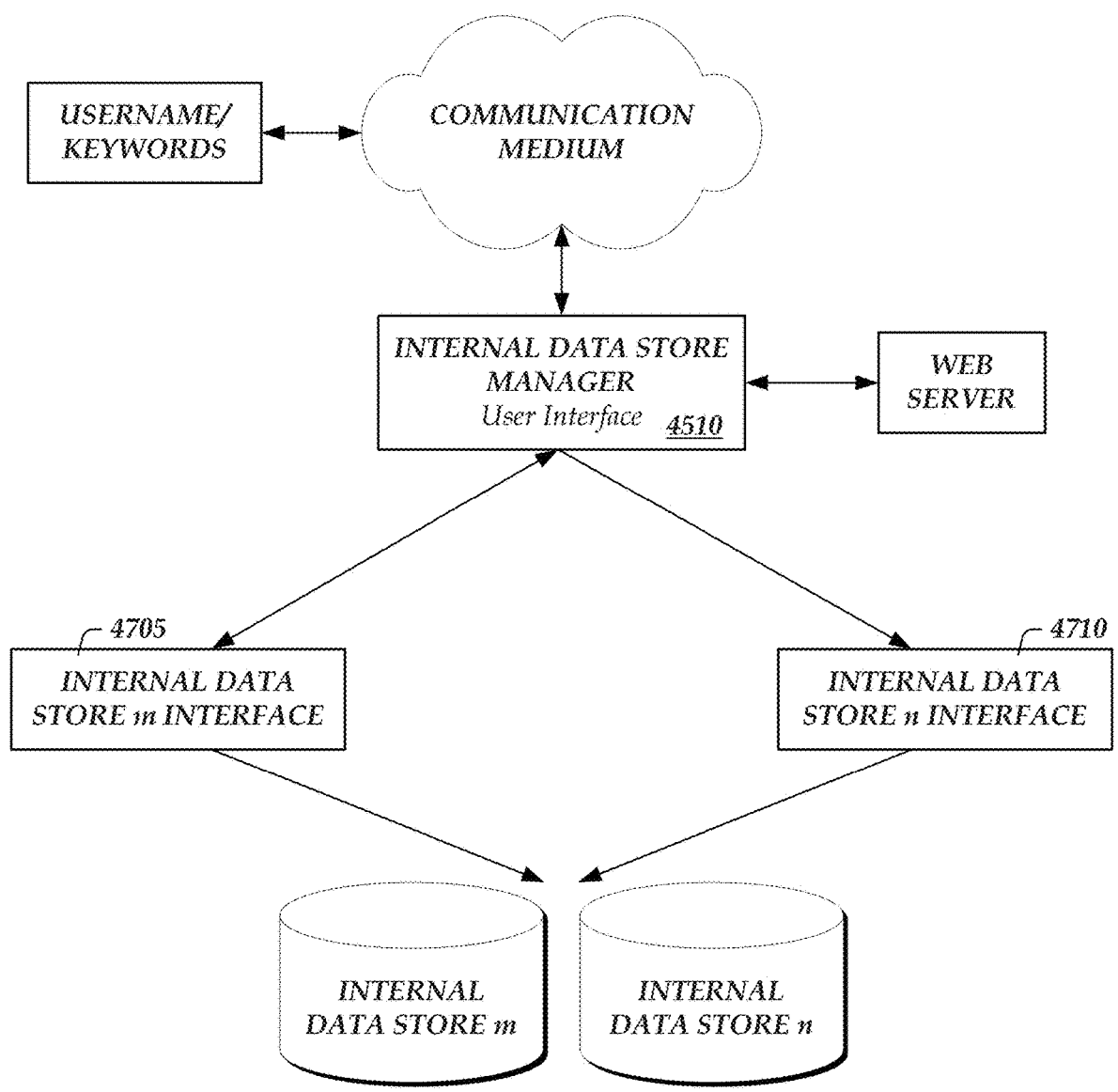
FIG. 47 illustrates the Internal Data Store Manager function of FIG. 45 configured to interface with one or more internal data stores, the function including an Internal Data Store m Interface function and an Internal Data Store n Interface function.

The Data Store Manager module 1425 includes the Internal Data Store Manager module 4510 that can be configured to interface with one or more internal data stores or databases. The Internal Data Store Manager module 4510 includes a Search String Data Store Interface function 4710, a Keyword Stem Data Store Interface function 4715, a Synonyms Data Store Interface function 4720, a Hypernyms Data Store Interface function 4725, and a Dictionary Data Store Interface function 4730, as illustrated in FIG. 47.

Figure 48:
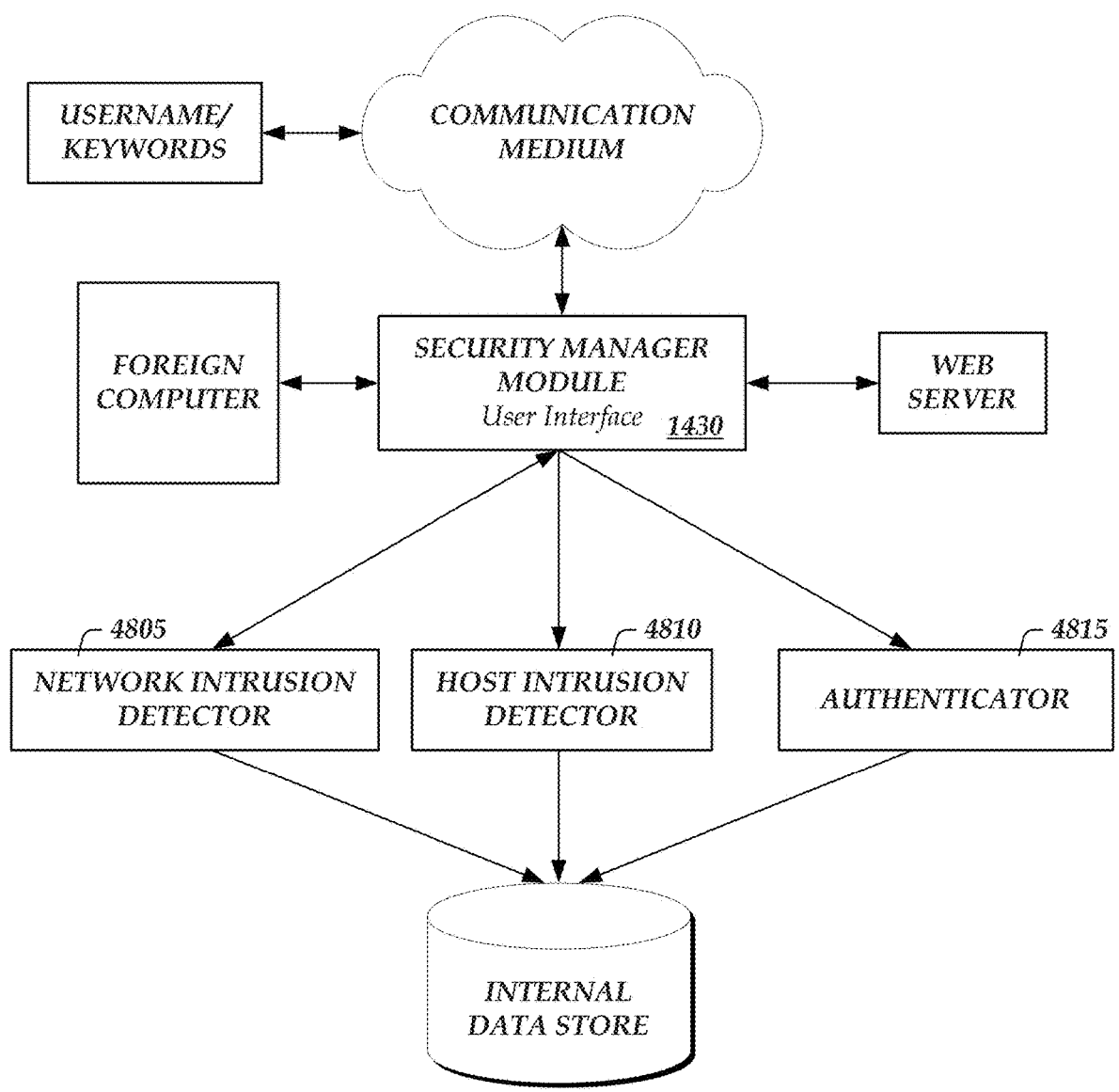
FIG. 48 illustrates modules of the document analysis system including a Security Manager module that includes Network Intrusion Detector, Host Intrusion Detector, and Authenticator functions.

The system 1300 includes a Security Manager module 1430. The Security Manager module 1430 includes a Network Intrusion Detector module 4805, a Host Intrusion Detector module 4810, and an Authenticator module 4815, as illustrated in FIG. 48.

Figure 49:
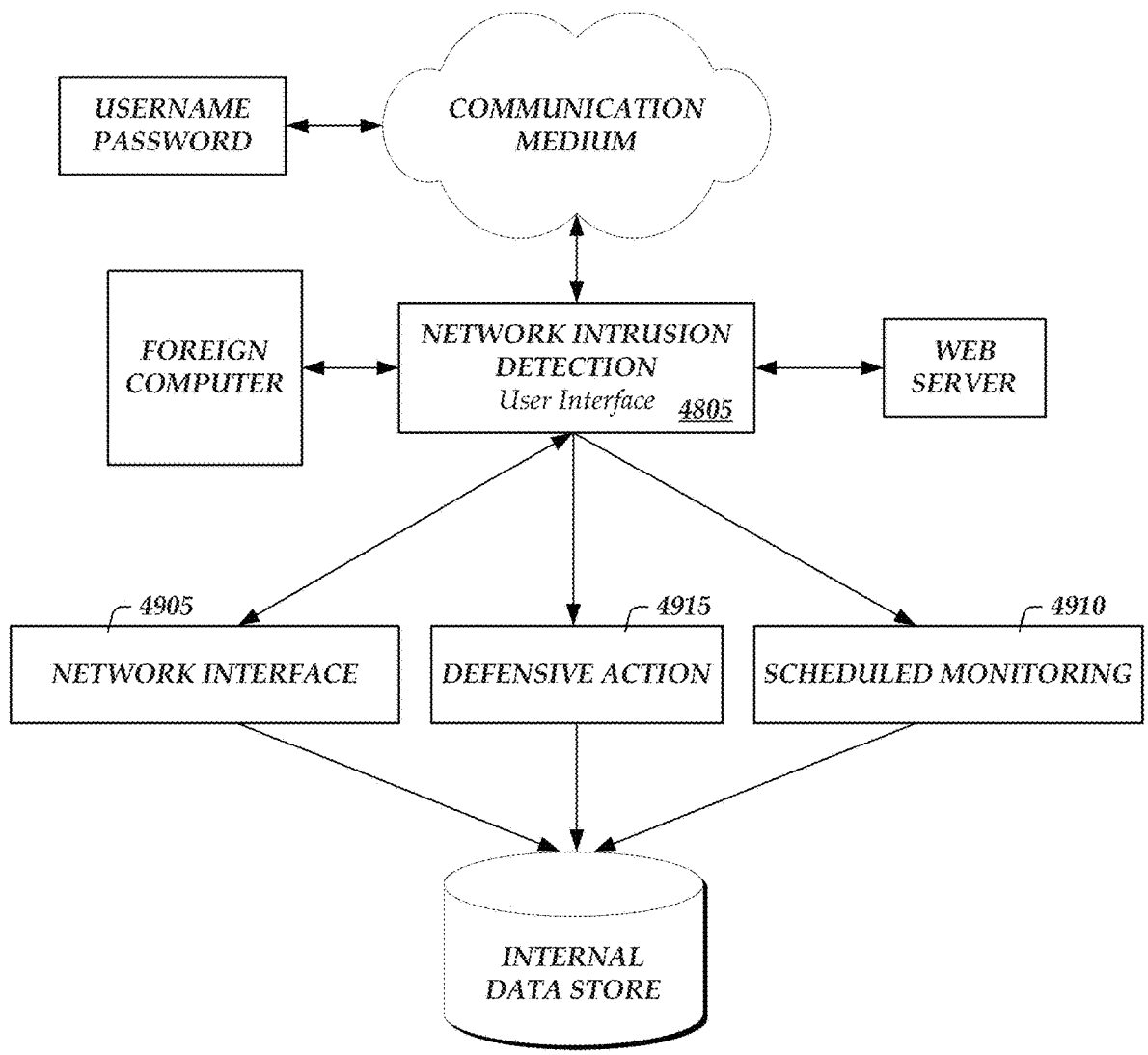
FIG. 49 illustrates the Network Intrusion Detector function of FIG. 48 configured to ensure the server computer is secure in a network environment, the function includes Network Interface, Scheduled Monitoring, and Defensive Action functions.

The Security Manager module 1430 includes the Network Intrusion Detector module 4805 configured to ensure the server computer is secure in the network environment. The Network Intrusion Detector module 4805 includes a Network Interface function 4905, a Scheduled Monitoring function 4910, and a Defensive Action function 4915, as illustrated in FIG. 49.

Figure 50:
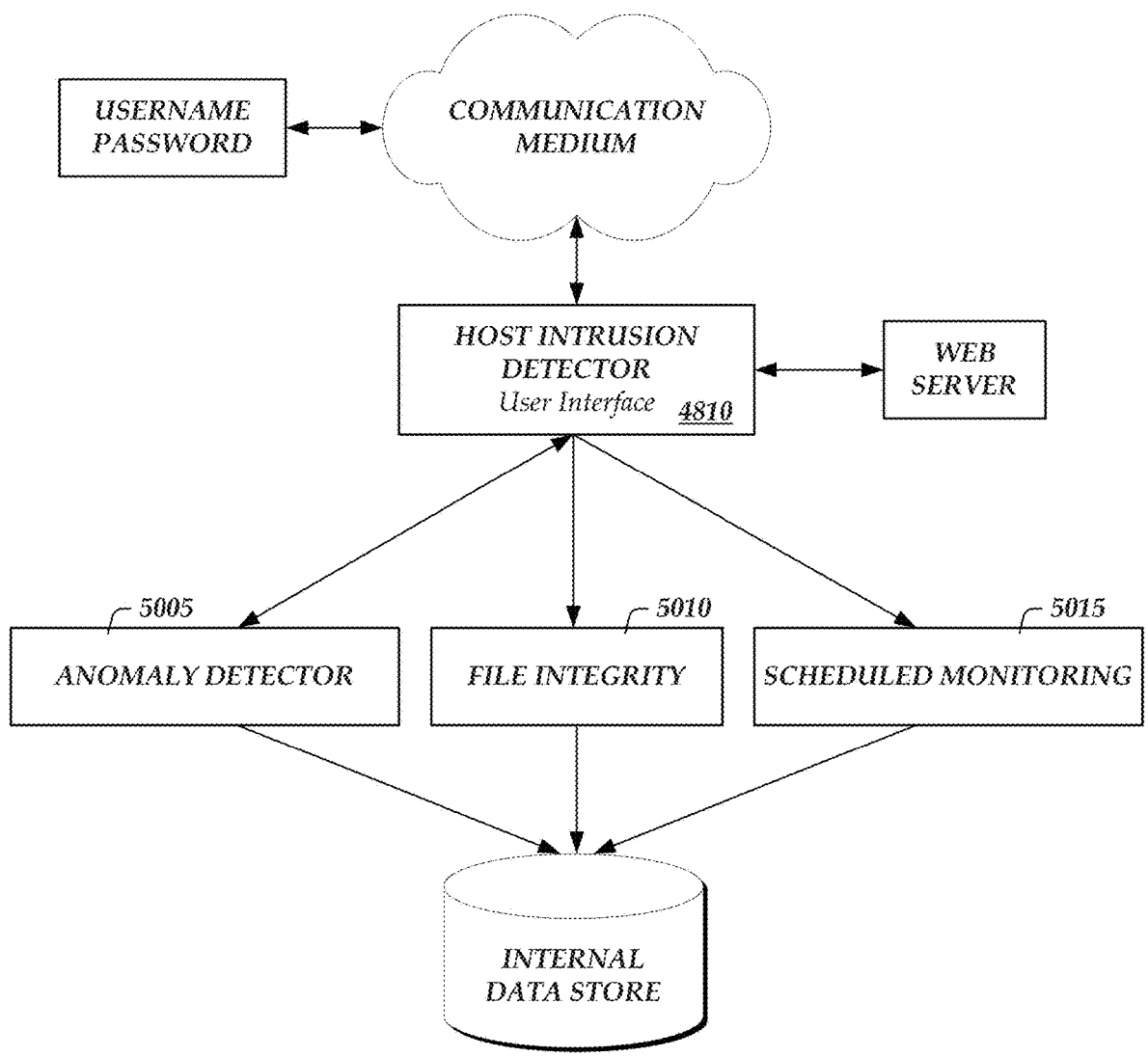
FIG. 50 illustrates the Host Intrusion Detector function of FIG. 48 configured to monitor the security of the server computer for anomalies, the function including Anomaly Detector, File Integrity, and Scheduled Monitoring functions.

The Security Manager module 1430 includes the Host Intrusion Detector module 4810 configured to monitor the security of the server computer for any possible anomalies. The Host Intrusion Detector module 4810 includes an Anomaly Detector function 5005, a File Integrity function 5010, and a Scheduled Monitoring function 5015, as illustrated in FIG. 50.

The following represents numbered embodiments of the systems and methods described herein. The numbered embodiments provide examples of configurations of the systems described herein. Nothing in the following numbered embodiments is intended to limit the scope of any claimed subject matter or to limit the scope of the disclosure provided herein.

1. A system with networked data stores for document processing comprising:
   (a) said networked data store is further comprising:
      (1) at least one external data store
      (2) at least one internal data store
   (b) said system to execute desired functions for search, download, store, convert, and analysis of documents is comprising the following:
      (1) a module called SS Engine which will search documents in an external data store. The said module comprises several sub-modules:
         (i) the sub-module Document Search will search documents in an external data store based on a combination of keywords (or combination of associated keywords). The said sub-module comprises several functions:
            A. The Keyword Parse function parses and processes user input keyword string for a search session and conducts a search for the documents. It downloads the relevant documents from an external data store.
            B. The Search Interface function interfaces with user by providing interface messages on the result of the search session. The Search Advice function interfaces with user via advice messages.
         (ii) The sub-module Document Load will query and search an external data store based on document names. The said sub-module comprises several functions:
            A. The Loader Parse function will parse and process user input of the document names. It will query an external data store for the documents based on document names. If the query is successful it will load the documents from an external data store and deposited them in an internal data store.
            B. The Loader Interface function will interface with user on the state of current loading session and provide interface messages. It will display the current document list (after the loading) in the current folder. The SS Engine has a sub-module called Document Store which will convert external documents to internal format. The said sub-module comprises several functions as described in Document Converter and Document Linker. The Document Converter function will convert the downloaded to internal format to be further used by the module Analysis Engine. The Document Linker function will organize the converted documents to internal data structure and to be stored in an internal data store.
      (2) a module called Analysis Engine which will analyze the downloaded documents from the operation of the SS Engine. The said module comprises several sub-modules:
         (i) The sub-module called Document Comparator which will compare multiple documents side-by-side. The said sub-module comprises several functions:
            A. The Keyword Parsing function will parse and process user input keyword string. In order to focus on the accuracy of the search result user input must meet required format.
            B. The Keyword Mapping function will search the internal data store and provide a list of document titles that matches the keyword string. Each document title is prefixed by a checkbox. The said function provides number of matches for each keyword in the keyword string and attaches the count with a distinct color to the end of the document title. The checkbox allows the user to make selection of the document for further analyzing of the searched documents. The said function will interface with the Associated Engine and trigger multiple threads of executions by calling functions in the Associated Engine to compute the corresponding associated keywords.
            C. The Side-by-Side Section function will displays a dropdown list of sections from each selected documents. The list further provides number of matches in each section with respect to each keyword using a distinct color. User can select a section form this dropdown list from each side for next step of analyzing these targeted documents.
            D. The Side-by-Side Comparison function displays side-by-side the relevant sentences from selected sections (with respect to the keywords string). The function highlights each keyword in distinct colors for user to pin point and analyze the targeted documents. This allows the user to detect potential inconsistence between multiple documents.
            E. The Adaptive Search function provides additional Search capability, wherein if user clicks a highlighted keyword this function will provide a pop up text box for user to input a new keyword to the keyword string. This function will process and accept the new keyword to refine the current keyword string for further search and analysis of the targeted documents.
            F. The Adaptive Mapping function will, upon user clicking the refined keyword, process and follow up with an updated Keyword Mapping to a set of multiple documents based on the keyword string just refined by the user. User can select the documents to get side-by-side display of multiple sections. By repeating the same steps user can adaptively refine and search in conducting document analysis.

(ii) The a sub-module Document Contrastor allows user to select documents and contrast them side-by-side for any changes. The said sub-module comprises several functions:

A. The Side-by-Side Section function will display side-by-side a dropdown list of multiple sections from current searched documents. User can select a section from each side for next step of contrasting Figure. The Side-by-Side Contrast function will display side-by-side those selected sections. The function will highlight with distinguished colors those sentences and words that are either added, modified or deleted.

(iii) The sub-module Associated Mapper will process and map associated keywords to the said documents. It interfaces with Dynamic Relevancy Matrix, wherein each function in this said sub-module can be called by a respective function in the Associated Mapper. The said sub-module comprises several functions:

A. The Stem Processor function will compute the associated stems and map the computed stems to the multiple currently searched and downloaded documents (called them the said documents). It provides a statistical count of the matching of each associated stem with respect to each said document. It also provides the matching counts on multiple levels within each said document, wherein the said levels can be paragraphs, sections or chapters within the said document. The said function provides a distinct color for the statistical count.

B. The Synonym Processor function will compute the associated synonyms and map the computed synonyms to the multiple currently searched and downloaded documents (called them the said documents). It provides a statistical count of the matching of each associated synonym with respect to each said document. It also provides the matching counts on multiple levels within each said document, wherein the said levels can be paragraphs, sections or chapters within the said document. The said function provides a distinct color for the statistical count.

C. The Hypernym Processor function will compute the associated hypernyms and map the computed hypernyms to the multiple currently searched and downloaded documents (called them the said documents). It provides a statistical count of the matching of each associated hypernym with respect to each said document. It also provides the matching counts on multiple levels within each said document, wherein the said levels can be paragraphs, sections or chapters within the said document. The said function provides a distinct color for the statistical count.

D. The Dictionary Processor function will compute the associated dictionary words and map the computed dictionary words to the multiple currently searched and downloaded documents (called them the said documents). It provides a statistical count of the matching of each associated dictionary word with respect to each said document. It also provides the matching counts on multiple levels within each said document, wherein the said levels can be paragraphs, sections or chapters within the said document. The said function provides a distinct color for the statistical count.

(iv) The sub-module Dynamic Relevancy Matrix comprises several functions:

A. The Dynamic Relevancy Matrix comprises of rows and columns. The first column comprises identified document titles. Each document title is prefixed with a checkbox. The first row comprises Keyword String followed by its associated Stem String, Synonyms String, Hypernym String and Dictionary Word String. Other entries in the matrix are numerical values each indicating the number of hits of an associated search item in the document on the left of that row. For example, the entry Sn2 indicates the number of matches (or hits) of the stem item in the Document (titled Document n) which is located at row n and column 2.

B. The Matrix Control function comprises several sub-functions as described in Initiate Search, Initiate Mapping, and Initiate Display. Click the DOCUMENT TITLE (the first column header) will reset all checkboxes. If this action is followed by another click on the STEM STRING, for example, the system will initiate a new search session via Document Search in the SS Engine. From this point on user can conduct the same steps for document search as described in the SS Engine.

C. The Matrix Interface function comprises several sub-functions as described in SS Engine Interface, Control Interface, and Mapping Interface. The said module interfaces with the sub-module Document Comparator and the sub-module Associated Mapper, wherein functions in the Relevancy Matrix sub-module can be concurrently invoked or called by a respective function in the sub-module Document Comparator.

(3) a module called Project Control which treats each search action as a dedicated project. The said module comprises several sub-modules:

(i) The sub-module called Folder Manager which will manage user's project folders. The said sub-module comprises several functions:

A. The Create Project Folder function first checks to see if user's maximum number of project folders has not been reached. If it is not reached it will prompt the user for the name of this new folder and internally setup its associated named data structure. The said sub-module will also check for name resolution for any duplication of the name with user's existing folders. The Delete Project Folder function will delete the entire folder with its content. User will receive a confirmation message to allow the execution of deletion to continue. The Switch Project Folder function allows the user to switch from project folder to another project folder. Once a new project folder is selected the said sub-module will switch the current working folder to be the selected project folder. The said sub-module will ignore if user selects to switch to the same project folder.

(ii) The sub-module called Document Mover which will relocate documents to another folder (or directory). The said sub-module comprises several functions as described in Document Move Out which moves the document out of the current folder, Document Move In which moves the documents back to the current folder, Document Delete which deletes the documents in the folder.

A. The Document Move Out function moves documents out of the current project folder, at the discretion of the user, to another project folder. User can move one or more documents based on a predefined list of documents. At one instance, user can move one or more documents based on the associated search statistics of the documents.

B. The Document Move In function moves one or more documents from another project folder into the current project folder based on a predefined list of documents.

C. The Document Delete function deletes one or more documents from a secondary project folder. Once a document is deleted it cannot be restored. User will receive a confirmation message before the execution of the actual deletion. The said function will not delete documents from the current project folder.

(iii) The sub-module Document Upload comprises several functions:

A. The Upload Processing function interfaces with the user via the user's computing device. It parses verifies user credential and parses user input for acceptable syntax.

B. The Upload Conversion function will verify and convert user's document for acceptable document type and document format. It will deposit the document to user current folder.

(4) a module called User Manager which manages the user accounts. The said module comprises several sub-modules:

(i) The sub-module New User Handler which will process new user application, accept and create a new account for the user.

(ii) The sub-module User Session Manager which will manage user login sessions. The said sub-module comprises several functions as described in User Account Initialization and User Account Activities. User account activities controls the attributes of user session like time stamps, imposes timing limitation and user's network identification.

(iii) The User Manager has a sub-module called User Authentication. The said sub-module will authenticate the user (based on user credential on the user data store in the system) each time when user signs into the system.

(5) a module called Data Store Manager which comprises several sub-modules:

(i) The sub-module called External Data Store Manager which will interface with several external data stores. The said sub-module comprises several functions as described in External Data Store i Interface and External Data Store j Interface.

(ii) The sub-module Internal Data Store Manager which will interface with several internal data stores. The said sub-module comprises several functions as described in the Search String Data Store Interface, Stem Data Store Interface, Synonyms Data Store Interface, Hypernyms Data Store Interface, and Dictionary Data Store Interface.

(6) a module called Security Manager which comprises several sub-modules:

(i) The sub-module Anomaly Detector will detect any system level anomalies and provides alerts to the respective authorities.

(ii) The Intrusion Detector will detect any intrusion to ensure the integrity of user documents in the system.

2. A method for search, download, store, convert, and analysis of documents comprising the following procedures:

(a) A procedure of direct search, download, store, and convert documents from a remote data store.

(b) A procedure of side-by-side display of documents hierarchically by phrases, sentences, and paragraphs to pin point the relevant information.

(c) A procedure of dynamically adaptive search with respect to a search string and its associated search string to narrow down the relevancy of the documents.

(d) A procedure of providing and displaying relevancy index by a dynamic relevancy matrix to determine the relevancy of the documents.

(e) A procedure of dynamically adaptively filtering search to narrow down the relevant documents.

(f) A continuous and perpetual procedure that ensures the integrity of user searched and downloaded documents in the folder.

(g) A continuous and perpetual procedure that monitors the anomalies of the system to ensure the security of the server computer system.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions that cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C #, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes that come within the meaning and range of equivalency of the claims are to be embraced within their scope.

What is claimed is:

1. A system for mapping one or more keywords in a plurality of documents, the system comprising:
   one or more hardware processors; and
   a memory storing instructions that, when executed by the one or more hardware processors, cause the one or more hardware processors to perform operations comprising:
   obtaining a search string;
   parsing, using a search engine or an analysis engine, the search string to determine one or more search keywords;
   searching, using the search engine or the analysis engine, one or more data stores based on the one or more search keywords for identifying a plurality of matching documents, wherein a matching document contains at least one of the one or more search keywords;
   defining, using the search engine or the analysis engine, a uniform format for the plurality of matching documents;
   for each of the plurality of matching documents, converting, using the search engine or the analysis engine, the matching document into a document data structure according to the defined uniform format, the document data structure comprising:
   a matching document identifier for identifying the matching document;
   one or more document section identifiers corresponding to one or more document sections within the document;
   a document content object for each of the one or more document sections, the document content object including content from the corresponding document section; and
   a document content identifier for each document content object, the document content identifier relating the associated document content object to an associated document section identifier;
   storing in a database each document data structure for use by the analysis engine;
   obtaining an analysis string;
   parsing, using the analysis engine, the analysis string to determine one or more analysis keywords;
   determining, using the analysis engine, a grouping of analysis documents, wherein an analysis document contains at least one of the one or more analysis keywords;
   for each analysis document in the grouping of analysis documents, providing, using the analysis engine, an analysis document identifier, an array of total match numbers, and an array of section match numbers, wherein the array of total match numbers comprises a total matching number for each of the one or more analysis keywords, the total matching number corresponding to a number of times the corresponding analysis keyword is referenced in the analysis document corresponding to the matching document identifier, wherein the array of section match numbers comprises a section matching number for each of the one or more analysis keywords, the section matching number corresponding to a number of times the corresponding analysis keyword is referenced in a section of the analysis document corresponding to the matching document identifier;

generating, using the analysis engine, a dynamic relevancy matrix including a plurality of entries to link each analysis document in the grouping of analysis documents to the one or more analysis keywords;

wherein the plurality of entries of the dynamic relevancy matrix includes, for each analysis document, data corresponding to at least the analysis document identifier, the array of total match numbers, the array of section match numbers, and the one or more analysis keywords;

sorting and indexing the data into the plurality of entries of the dynamic relevancy matrix, using the analysis engine, by providing an initial ranking order of the plurality of entries in the dynamic relevancy matrix based on the analysis document identifier;

displaying on a display device the dynamic relevancy matrix including the data sorted and indexed therein;

providing an interactive element that allows:
re-initialization of the dynamic relevancy matrix, using the analysis engine, to rearrange the initial ranking order of the plurality of entries in the dynamic relevancy matrix without initiating a new search; and selection of two or more of the analysis documents displayed in the dynamic relevancy matrix for comparison or contrasting of the selected analysis documents based at least in part on one or more locations where the one or more analysis keyword is referenced in the selected analysis documents; and generating on the display device, in response to obtaining a selection of two or more of the analysis documents, a side-by-side display of the two or more selected analysis documents based at least in part on the one or more locations where the one or more analysis keyword is referenced in the selected analysis documents.

2. The system of claim 1, wherein the matching document identifier corresponds to a title of the matching document.

3. The system of claim 1, wherein obtaining the search string comprises receiving text input from a user.

4. The system of claim 1, wherein obtaining the analysis string comprises receiving text input from a user.

5. The system of claim 1 further comprising, for each of the one or more analysis keywords, determining one or more associated keywords.

6. The system of claim 5, wherein the one or more associated keywords comprise at least one of an associated stem word, an associated synonym word, an associated hypernym word, or an associated dictionary word.

7. The system of claim 5, wherein generating the dynamic relevancy matrix further comprises generating the dynamic relevancy matrix such that:
a first column of the dynamic relevancy matrix comprises a list of analysis document identifiers corresponding to the group of analysis documents;
a second column of the dynamic relevancy matrix comprises arrays of total match numbers, each entry in the second column including an array of total match numbers corresponding to the analysis document identifier in the first column; and
a third column of the dynamic relevancy matrix comprises arrays of associated keyword match numbers, each entry in the third column including an array of associated keyword match numbers corresponding to the document identifier in the first column, wherein the array of associated keyword match numbers comprises a total associated matching number for each of the one or more associated keywords, the total associated matching number corresponding to a number of times the corresponding associated keyword is referenced in the analysis document corresponding to the matching document identifier.

8. The system of claim 1, wherein generating on the display device, in response to obtaining the selection of two or more analysis documents from the grouping of analysis documents further comprises:
for each of the two or more analysis documents, obtaining an indication of a document section identifier in the analysis document; and
for each of the two or more analysis documents, providing a document content object corresponding to the indicated document section identifier,
wherein the document content object is modified to indicate the location of the one or more analysis keywords within the document content object.

9. The system of claim 1, wherein generating on the display device, in response to obtaining the selection of two analysis documents from the grouping of analysis documents further comprises:
for each of the two analysis documents, obtaining an indication of a document section identifier in the analysis document;
determining differences between the document content objects corresponding to the indicated document section identifiers of the two analysis documents; and
for each of the two analysis documents, providing a document content object corresponding to the indicated document section identifier,
wherein the document content object is modified to indicate the location of differences between the document content objects of the two analysis documents.

10. A system for generating a dynamic relevancy matrix, the system comprising:
one or more hardware processors; and
a memory storing instructions that, when executed by the one or more hardware processors, cause the one or more hardware processors to perform operations comprising:
obtaining a grouping of analysis documents, each of the analysis documents comprising a document identifier;
determining, using an analysis engine, for each analysis document an array of total match numbers, the array of total match numbers comprising a total matching number for each of one or more analysis keywords, the total matching number corresponding to a number of times the corresponding analysis keyword appears in the analysis document;

generating, using the analysis engine, one or more associated keywords using the one or more analysis keywords;

determining, using the analysis engine, for each analysis document an array of total associated numbers, the array of total associated numbers comprising a total associated number for each of the one or more associated keywords, the total associated number corresponding to a number of times the corresponding associated keyword appears in the analysis document;

providing a first row of a dynamic relevancy matrix, the first row comprising:
- a first interactive element in a first row of a first column, the first interactive element configured to select or de-select all elements in the first column;
- a second interactive element in a first row of a second column, the second interactive element configured to initiate a procedure to sort the grouping of analysis documents based at least in part on the arrays of total match numbers; and
- a third interactive element in a first row of a third column, the third interactive element configured to initiate a procedure to sort the grouping of analysis documents based at least in part on the arrays of total associated numbers;

adding to the first column a list of document identifiers corresponding to the grouping of analysis documents, wherein each element of the first column includes one document identifier from the list of document identifiers;

adding to the second column the arrays of total match numbers, wherein each element of the second column includes one array of total match numbers for the analysis document that corresponds to the document identifier in the same row of the first column; and adding to the third column the arrays of total associated numbers, wherein each element of the third column includes one array of total associated numbers for the analysis document that corresponds to the document identifier in the same row of the first column.

11. The system of claim 10, further comprising determining for each analysis document an array of section match numbers, the array of section match numbers comprising a section matching number for each of the one or more analysis keywords, the section matching number corresponding to a number of times the corresponding analysis keyword appears in a section of the analysis document.

12. The system of claim 11, wherein each element in the second column includes an interactive element configured to provide the array of section match numbers for the corresponding analysis document.

13. The system of claim 11, further comprising determining for each analysis document an array of section associated numbers, the array of section associated numbers comprising a section associated number for each of the one or more associated keywords, the section associated number corresponding to a number of times the corresponding associated keyword appears in a section of the analysis document.

14. The system of claim 13, wherein each element in the third column includes an interactive element configured to provide the array of section associated numbers for the corresponding analysis document.

15. The system of claim 11, wherein each document identifier in the first column includes an interactive element that allows the corresponding analysis document to be selected for a side-by-side comparison of selected documents.

16. The system of claim 10, wherein the one or more associated keywords comprise at least one of an associated stem word, an associated synonym word, an associated hypernym word, or an associated dictionary word.

* * * * *